(12) United States Patent
Kakutani

(10) Patent No.: US 7,961,350 B2
(45) Date of Patent: Jun. 14, 2011

(54) HALFTONE FOR REDUCING DOT CONTACT BETWEEN DIFFERENT COLORS

(75) Inventor: Toshiaki Kakutani, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 976 days.

(21) Appl. No.: 11/823,424

(22) Filed: Jun. 26, 2007

(65) Prior Publication Data

US 2007/0296990 A1 Dec. 27, 2007

(30) Foreign Application Priority Data

Jun. 27, 2006 (JP) .................................. 2006-176361
Dec. 26, 2006 (JP) .................................. 2006-349829

(51) Int. Cl.
*G06F 15/00* (2006.01)

(52) U.S. Cl. ........ 358/1.9; 358/1.8; 358/3.06; 358/3.13; 358/534

(58) Field of Classification Search .................. 358/1.1, 358/1.8, 1.9, 3.01, 3.03, 3.06, 3.13, 3.16, 358/3.18, 534, 535, 536

See application file for complete search history.

(56) References Cited

U.S. PATENT DOCUMENTS

| | | | | |
|---|---|---|---|---|
| 5,768,411 A | * | 6/1998 | Shu et al. | 382/162 |
| 5,812,744 A | * | 9/1998 | Allebach et al. | 358/1.9 |
| 6,439,682 B1 | * | 8/2002 | Kakutani | 347/15 |
| 2006/0279789 A1 | | 12/2006 | Yamazaki et al. | |

FOREIGN PATENT DOCUMENTS

| | | |
|---|---|---|
| JP | 07-177351 | 7/1995 |
| JP | 10-157167 | 6/1998 |
| JP | 2005-236768 | 9/2005 |
| JP | 2005-269527 | 9/2005 |
| JP | 2007-015359 | 1/2007 |
| JP | 2007-049443 | 2/2007 |
| JP | 2007-053714 | 3/2007 |

OTHER PUBLICATIONS

Abstract of Japanese Patent Publication No. 07-177351 Pub. Date: Jul. 14, 1995, Patent Abstracts of Japan.

(Continued)

*Primary Examiner* — Thomas D Lee
(74) *Attorney, Agent, or Firm* — Martine Penilla & Gencarella, LLP

(57) ABSTRACT

The invention provides printing method of printing on a printing medium. The method includes: generating dot data representing a status of dot formation on each of print pixels of a print image to be formed on the print medium, by performing a halftone process on image data representing, a input tone value of each of pixels constituting an original image; providing a print head having a plurality of nozzle groups that eject inks of mutually different colors; and generating the print image by mutually combining dot groups of multiple colors formed in at least one scan in a common print area, by forming each dot group with each of the plurality of nozzle groups during each scan of the print head in response to the dot data, the each of the dot groups being mutually different in color. The generating dot data comprise setting a condition for the halftone process for reducing contact between the dot groups of the at least two specific colors within at least part of tone values, for at least two specific colors of dot groups among the dot groups of multiple colors.

18 Claims, 48 Drawing Sheets

OTHER PUBLICATIONS

Abstract of Japanese Patent Publication No. 10-157167 Pub. Date: Jun. 16, 1998, Patent Abstracts of Japan.
Abstract of Japanese Patent Publication No. 2005-236768 Pub. Date: Sep. 2, 2005, Patent Abstracts of Japan.
Abstract of Japanese Patent Publication No. 2005-269527 Pub. Date: Sep. 29, 2005, Patent Abstracts of Japan.
Abstract of Japanese Patent Publication No. 2007-015359 Pub. Date: Jan. 25, 2007, Patent Abstracts of Japan.
Abstract of Japanese Patent Publication No. 2007-049443 Pub. Date: Feb. 22, 2007, Patent Abstracts of Japan.
Abstract of Japanese Patent Publication No. 2007-053714 Pub. Date: Mar. 1, 2007, Patent Abstracts of Japan.
Abstract of Japanese Patent Publication No. 07-177351, Pub. Date: Jul. 14, 1995, Patent Abstracts of Japan.
Abstract of Japanese Patent Publication No. 10-157167, Pub. Date: Jun. 16, 1998, Patent Abstracts of Japan.
Abstract of Japanese Patent Publication No. 2005-236768, Pub. Date: Sep. 2, 2005, Patent Abstracts of Japan.
Abstract of Japanese Patent Publication No. 2005-269527, Pub. Date: Sep. 29, 2005, Patent Abstracts of Japan.
Abstract of Japanese Patent Publication No. 2007-015359, Pub. Date: Jan. 25, 2007, Patent Abstracts of Japan.
Abstract of Japanese Patent Publication No. 2007-049443, Pub. Date: Feb. 22, 2007, Patent Abstracts of Japan.

* cited by examiner $$VTF(u) = 5.05 \cdot \exp\left(\frac{-0.138\,\pi\,L\cdot u}{180}\right)$$
$$\cdot \left\{1-\exp\left(\frac{-0.1\,\pi\,L\cdot u}{180}\right)\right\}$$

$$\text{GRAININESS INDEX} = K\int FS(u)\cdot VTF(u)\,du$$

Fig.11

|  | COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|---|
| ROW 1 | 1 | 3 | 1 | 3 | 1 | 3 | 1 | 3 |
| ROW 2 | 2 | 4 | 2 | 4 | 2 | 4 | 2 | 4 |
| ROW 3 | 1 | 3 | 1 | 3 | 1 | 3 | 1 | 3 |
| ROW 4 | 2 | 4 | 2 | 4 | 2 | 4 | 2 | 4 |
| ROW 5 | 1 | 3 | 1 | 3 | 1 | 3 | 1 | 3 |
| ROW 6 | 2 | 4 | 2 | 4 | 2 | 4 | 2 | 4 |
| ROW 7 | 1 | 3 | 1 | 3 | 1 | 3 | 1 | 3 |
| ROW 8 | 2 | 4 | 2 | 4 | 2 | 4 | 2 | 4 |

~M

MAIN SCAN DIRECTION →

SUB-SCAN DIRECTION ↓

|  | 1 | 2 | 3 | 4 | 5 | 6 | 7 | 8 |
|---|---|---|---|---|---|---|---|---|
| 1 | 1 |   | 1 |   | 1 |   | 1 |   |
| 2 |   |   |   |   |   |   |   |   |
| 3 | 1 |   | 1 |   | 1 |   | 1 |   |
| 4 |   |   |   |   |   |   |   |   |
| 5 | 1 |   | 1 |   | 1 |   | 1 |   |
| 6 |   |   |   |   |   |   |   |   |
| 7 | 1 |   | 1 |   | 1 |   | 1 |   |
| 8 |   |   |   |   |   |   |   |   |

M3:

|  | 1 | 2 | 3 | 4 | 5 | 6 | 7 | 8 |
|---|---|---|---|---|---|---|---|---|
| 1 |   | 3 |   | 3 |   | 3 |   | 3 |
| 2 |   |   |   |   |   |   |   |   |
| 3 |   | 3 |   | 3 |   | 3 |   | 3 |
| 4 |   |   |   |   |   |   |   |   |
| 5 |   | 3 |   | 3 |   | 3 |   | 3 |
| 6 |   |   |   |   |   |   |   |   |
| 7 |   | 3 |   | 3 |   | 3 |   | 3 |
| 8 |   |   |   |   |   |   |   |   |

M2:

|  | 1 | 2 | 3 | 4 | 5 | 6 | 7 | 8 |
|---|---|---|---|---|---|---|---|---|
| 1 |   |   |   |   |   |   |   |   |
| 2 | 2 |   | 2 |   | 2 |   | 2 |   |
| 3 |   |   |   |   |   |   |   |   |
| 4 | 2 |   | 2 |   | 2 |   | 2 |   |
| 5 |   |   |   |   |   |   |   |   |
| 6 | 2 |   | 2 |   | 2 |   | 2 |   |
| 7 |   |   |   |   |   |   |   |   |
| 8 | 2 |   | 2 |   | 2 |   | 2 |   |

M4:

|  | 1 | 2 | 3 | 4 | 5 | 6 | 7 | 8 |
|---|---|---|---|---|---|---|---|---|
| 1 |   |   |   |   |   |   |   |   |
| 2 |   | 4 |   | 4 |   | 4 |   | 4 |
| 3 |   |   |   |   |   |   |   |   |
| 4 |   | 4 |   | 4 |   | 4 |   | 4 |
| 5 |   |   |   |   |   |   |   |   |
| 6 |   | 4 |   | 4 |   | 4 |   | 4 |
| 7 |   |   |   |   |   |   |   |   |
| 8 |   | 4 |   | 4 |   | 4 |   | 4 |

Fig.13

FIRST CONSECUTIVE PIXEL GROUP

|   | 1 | 2 | 3 | 4 | 5 | 6 | 7 | 8 |
|---|---|---|---|---|---|---|---|---|
| 1 | 1 |   | 1 |   | 1 |   | 1 |   |
| 2 | 2 |   | 2 |   | 2 |   | 2 |   |
| 3 | 1 |   | 1 |   | 1 |   | 1 |   |
| 4 | 2 |   | 2 |   | 2 |   | 2 |   |
| 5 | 1 |   | 1 |   | 1 |   | 1 |   |
| 6 | 2 |   | 2 |   | 2 |   | 2 |   |
| 7 | 1 |   | 1 |   | 1 |   | 1 |   |
| 8 | 2 |   | 2 |   | 2 |   | 2 |   |

~M1_2

SECOND CONSECUTIVE PIXEL GROUP

|   | 1 | 2 | 3 | 4 | 5 | 6 | 7 | 8 |
|---|---|---|---|---|---|---|---|---|
| 1 |   | 3 |   | 3 |   | 3 |   | 3 |
| 2 | 2 |   | 2 |   | 2 |   | 2 |   |
| 3 |   | 3 |   | 3 |   | 3 |   | 3 |
| 4 | 2 |   | 2 |   | 2 |   | 2 |   |
| 5 |   | 3 |   | 3 |   | 3 |   | 3 |
| 6 | 2 |   | 2 |   | 2 |   | 2 |   |
| 7 |   | 3 |   | 3 |   | 3 |   | 3 |
| 8 | 2 |   | 2 |   | 2 |   | 2 |   |

~M2_3

THIRD CONSECUTIVE PIXEL GROUP

|   | 1 | 2 | 3 | 4 | 5 | 6 | 7 | 8 |
|---|---|---|---|---|---|---|---|---|
| 1 |   | 3 |   | 3 |   | 3 |   | 3 |
| 2 |   | 4 |   | 4 |   | 4 |   | 4 |
| 3 |   | 3 |   | 3 |   | 3 |   | 3 |
| 4 |   | 4 |   | 4 |   | 4 |   | 4 |
| 5 |   | 3 |   | 3 |   | 3 |   | 3 |
| 6 |   | 4 |   | 4 |   | 4 |   | 4 |
| 7 |   | 3 |   | 3 |   | 3 |   | 3 |
| 8 |   | 4 |   | 4 |   | 4 |   | 4 |

~M3_4

FOURTH CONSECUTIVE PIXEL GROUP

|   | 1 | 2 | 3 | 4 | 5 | 6 | 7 | 8 |
|---|---|---|---|---|---|---|---|---|
| 1 | 1 |   | 1 |   | 1 |   | 1 |   |
| 2 |   | 4 |   | 4 |   | 4 |   | 4 |
| 3 | 1 |   | 1 |   | 1 |   | 1 |   |
| 4 |   | 4 |   | 4 |   | 4 |   | 4 |
| 5 | 1 |   | 1 |   | 1 |   | 1 |   |
| 6 |   | 4 |   | 4 |   | 4 |   | 4 |
| 7 | 1 |   | 1 |   | 1 |   | 1 |   |
| 8 |   | 4 |   | 4 |   | 4 |   | 4 |

FORMATION OF CORRESPONDING DOTS OF
ALREADY-DETERMINED THRESHOLD
VALUE STORAGE ELEMENTS (ALL PIXELS)

|  | COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|---|
| ROW 1 | * |  |  |  | ● |  |  |  |
| ROW 2 |  | ● |  |  |  |  |  |  |
| ROW 3 |  |  |  |  |  | ● |  |  |
| ROW 4 |  |  |  |  |  |  |  |  |
| ROW 5 |  |  | ● |  |  |  |  |  |
| ROW 6 |  |  |  |  |  |  |  | ● |
| ROW 7 |  |  |  | ● |  |  |  |  |
| ROW 8 | ● |  |  |  |  |  | ● |  |

Dpa

● : CORRESPONDS TO ALREADY-DETERMINED
　　THRESHOLD VALUE STORAGE ELEMENT

* : CORRESPONDS TO CANDIDATE
　　STORAGE ELEMENT

Fig.16

DIGITIZED DOT FORMATION (ALL PIXELS)

|  | COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|---|
| ROW 1 | 1 | 0 | 0 | 0 | 1 | 0 | 0 | 0 |
| ROW 2 | 0 | 1 | 0 | 0 | 0 | 0 | 0 | 0 |
| ROW 3 | 0 | 0 | 0 | 0 | 0 | 1 | 0 | 0 |
| ROW 4 | 0 | 0 | 0 | 0 | 0 | 0 | 0 | 0 |
| ROW 5 | 0 | 0 | 1 | 0 | 0 | 0 | 0 | 0 |
| ROW 6 | 0 | 0 | 0 | 0 | 0 | 0 | 0 | 1 |
| ROW 7 | 0 | 0 | 0 | 1 | 0 | 0 | 0 | 0 |
| ROW 8 | 1 | 0 | 0 | 0 | 0 | 0 | 1 | 0 |

Dda

Fig.17

FORMATION OF CORRESPONDING DOTS OF ALREADY-DETERMINED
THRESHOLD VALUE STORAGE ELEMENTS
(CONSECUTIVE PIXEL GROUPS)

|   | 1 | 2 | 3 | 4 | 5 | 6 | 7 | 8 |
|---|---|---|---|---|---|---|---|---|
| 1 | * |   | 1 |   | ● |   | 1 |   |
| 2 | 2 |   | 2 |   | 2 |   | 2 |   |
| 3 | 1 |   | 1 |   | 1 |   | 1 |   |
| 4 | 2 |   | 2 |   | 2 |   | 2 |   |
| 5 | 1 |   | ● |   | 1 |   | 1 |   |
| 6 | 2 |   | 2 |   | 2 |   | 2 |   |
| 7 | 1 |   | 1 |   | 1 |   | 1 |   |
| 8 | ● |   | 2 |   | 2 |   | ● |   |

∿Dp1_2

|   | 1 | 2 | 3 | 4 | 5 | 6 | 7 | 8 |
|---|---|---|---|---|---|---|---|---|
| 1 |   |   | 3 |   | 3 |   | 3 |   3 |
| 2 | 2 |   | 2 |   | 2 |   | 2 |   |
| 3 |   |   | 3 |   | 3 |   | ● |   3 |
| 4 | 2 |   | 2 |   | 2 |   | 2 |   |
| 5 |   |   | 3 |   | 3 |   | 3 |   3 |
| 6 | 2 |   | 2 |   | 2 |   | 2 |   |
| 7 |   |   | 3 |   | ● |   | 3 |   3 |
| 8 | ● |   | 2 |   | 2 |   | ● |   |

∿Dp2_3

|   | 1 | 2 | 3 | 4 | 5 | 6 | 7 | 8 |
|---|---|---|---|---|---|---|---|---|
| 1 |   |   | 3 |   | 3 |   | 3 |   3 |
| 2 |   | ● |   | 4 |   | 4 |   | 4 |
| 3 |   |   | 3 |   | 3 |   | ● |   3 |
| 4 |   | 4 |   | 4 |   | 4 |   | 4 |
| 5 |   |   | 3 |   | 3 |   | 3 |   3 |
| 6 |   | 4 |   | 4 |   | 4 |   | ● |
| 7 |   |   | 3 |   | ● |   | 3 |   3 |
| 8 |   | 4 |   | 4 |   | 4 |   | 4 |

∿Dp3_4

|   | 1 | 2 | 3 | 4 | 5 | 6 | 7 | 8 |
|---|---|---|---|---|---|---|---|---|
| 1 | * |   | 1 |   | ● |   | 1 |   |
| 2 |   | ● |   | 4 |   | 4 |   | 4 |
| 3 | 1 |   | 1 |   | 1 |   | 1 |   |
| 4 |   | 4 |   | 4 |   | 4 |   | 4 |
| 5 | 1 |   | ● |   | 1 |   | 1 |   |
| 6 |   | 4 |   | 4 |   | 4 |   | ● |
| 7 | 1 |   | 1 |   | 1 |   | 1 |   |
| 8 |   | 4 |   | 4 |   | 4 |   | 4 |

DIGITIZED DOT FORMATION (CONSECUTIVE PIXEL GROUPS)

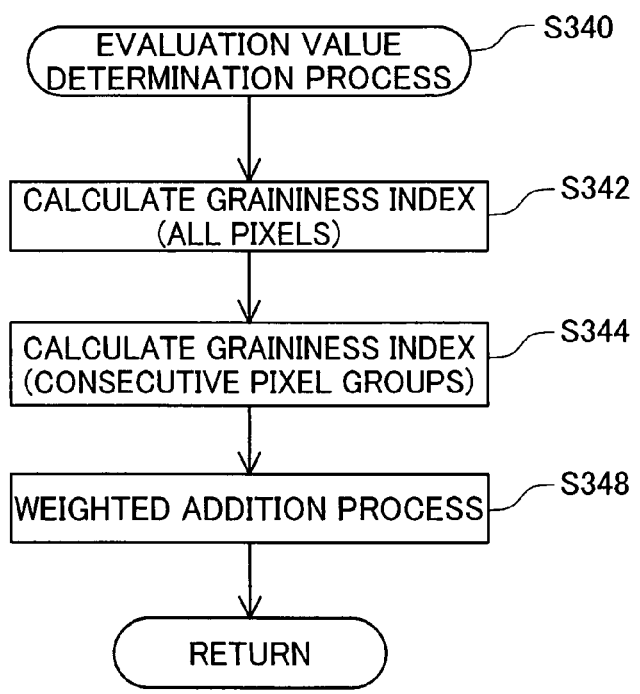

Fig.19

```
       ┌─────────────────────────┐
       │   EVALUATION VALUE      │ ─── S340
       │  DETERMINATION PROCESS  │
       └─────────────────────────┘
                   │
                   ▼
       ┌─────────────────────────┐
       │ CALCULATE GRAININESS INDEX │ ─── S342
       │      (ALL PIXELS)        │
       └─────────────────────────┘
                   │
                   ▼
       ┌─────────────────────────────┐
       │ CALCULATE GRAININESS INDEX  │ ─── S344
       │ (CONSECUTIVE PIXEL GROUPS)  │
       └─────────────────────────────┘
                   │
                   ▼
       ┌─────────────────────────┐
       │ WEIGHTED ADDITION PROCESS │ ─── S348
       └─────────────────────────┘
                   │
                   ▼
              ( RETURN )
```

Fig.20

EVALUATION VALUE COMPUTATIONAL EQUATION $E = Ga \times Wa + (G1\_2 + G2\_3 + G3\_4 + G4\_1) \times Wg$ E : EVALUATION VALUE
Ga: GRAININESS INDEX (ALL PIXELS)
G1_2, G2_3, G3_4, G4_1: GRAININESS INDICES (CONSECUTIVE PIXELS)
Wa, Wg: WEIGHTING COEFFICIENTS

ERROR DIFFUSION GLOBAL MATRIX

|  |  | * | 7/48 | 5/48 |
|---|---|---|---|---|
| 3/48 | 5/48 | 7/48 | 5/48 | 3/48 |
| 1/48 | 3/48 | 5/48 | 3/48 | 1/48 |

Ma

* : TARGETED PIXEL

MODIFICATION EXAMPLE OF EMBODIMENT 2

Fig.25

ERROR DIFFUSION SYNTHESIS MATRIX

|   |   | * | 14 | 13 |
|---|---|---|----|----|
| 7 | 13 | 19 | 13 | 7 |
| 3 | 6 | 13 | 6 | 3 |
|   | 1 | 1 | 1 |   |

Mg3

MAIN SCAN DIRECTION →
SUB-SCAN DIRECTION ↓

* : TARGETED PIXEL   1/120 OF ALL PIXELS

ERROR DIFFUSION GLOBAL MATRIX

|   |   | * | 7/48 | 5/48 |
|---|---|---|------|------|
| 3/48 | 5/48 | 7/48 | 5/48 | 3/48 |
| 1/48 | 3/48 | 5/48 | 3/48 | 1/48 |

Ma

* : TARGETED PIXEL

ERROR DIFFUSION SAME-MAIN SCAN GROUP MATRIX (AFTER WEIGHT ADJUSTMENT)

|   |   | * |   | 1.5/12 |
|---|---|---|---|--------|
| 0.5/12 | 1.5/12 | 2.5/12 | 1.5/12 | 0.5/12 |
| 0.5/12 |   | 1.5/24 |   | 0.5/12 |
|   | 0.5/12 | 0.5/12 | 0.5/12 |   |

Mg1a

* : TARGETED PIXEL

EMBODIMENT 3

Fig.29

|  | COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|---|
| ROW 1 | 1 | 3 | 1 | 3 | 1 | 3 | 1 | 3 |
| ROW 2 | 2 | 4 | 2 | 4 | 2 | 4 | 2 | 4 |
| ROW 3 | 1 | 3 | 1 | 3 | 1 | 3 | 1 | 3 |
| ROW 4 | 2 | 4 | 2 | 4 | 2 | 4 | 2 | 4 |
| ROW 5 | 1 | 3 | 1 | 3 | 1 | 3 | 1 | 3 |
| ROW 6 | 2 | 4 | 2 | 4 | 2 | 4 | 2 | 4 |
| ROW 7 | 1 | 3 | 1 | 3 | 1 | 3 | 1 | 3 |
| ROW 8 | 2 | 4 | 2 | 4 | 2 | 4 | 2 | 4 |

~ Dpak

ALL PIXELS, BLACK

|  | 1 | 2 | 3 | 4 | 5 | 6 | 7 | 8 |
|---|---|---|---|---|---|---|---|---|
| 1 | 1 |  | 1 |  | 1 |  | 1 |  |
| 2 |  |  |  |  |  |  |  |  |
| 3 | 1 |  | 1 |  | 1 |  | 1 |  |
| 4 |  |  |  |  |  |  |  |  |
| 5 | 1 |  | 1 |  | 1 |  | 1 |  |
| 6 |  |  |  |  |  |  |  |  |
| 7 | 1 |  | 1 |  | 1 |  | 1 |  |
| 8 |  |  |  |  |  |  |  |  |

~ Dp0ky

FIRST PIXEL GROUP, BLACK, YELLOW

|  | 1 | 2 | 3 | 4 | 5 | 6 | 7 | 8 |
|---|---|---|---|---|---|---|---|---|
| 1 | 1 |  | 1 |  | 1 |  | 1 |  |
| 2 |  |  |  |  |  |  |  |  |
| 3 | 1 |  | 1 |  | 1 |  | 1 |  |
| 4 |  |  |  |  |  |  |  |  |
| 5 | 1 |  | 1 |  | 1 |  | 1 |  |
| 6 |  |  |  |  |  |  |  |  |
| 7 | 1 |  | 1 |  | 1 |  | 1 |  |
| 8 |  |  |  |  |  |  |  |  |

~ Dp0k

FIRST PIXEL GROUP, BLACK

Fig.31

FORMATION OF CORRESPONDING DOTS OF ALREADY-DETERMINED THRESHOLD VALUE STORAGE ELEMENTS (ALL PIXELS, BLACK INK)

|       | COLUMN 1 | COLUMN 2 | COLUMN 3 | COLUMN 4 | COLUMN 5 | COLUMN 6 | COLUMN 7 | COLUMN 8 |
|-------|---|---|---|---|---|---|---|---|
| ROW 1 |   |   |   |   | ● |   |   |   |
| ROW 2 |   |   |   |   |   |   |   |   |
| ROW 3 |   |   |   |   |   | ● |   |   |
| ROW 4 | ● |   |   |   |   |   |   |   |
| ROW 5 |   |   | ● |   |   |   |   |   |
| ROW 6 |   |   |   |   |   |   |   | ● |
| ROW 7 |   |   |   | ● |   |   |   |   |
| ROW 8 | ● |   |   |   |   |   | ● |   |

Dpak

●: BLACK DOTS

Fig.32

DIGITIZED DOT FORMATION (ALL PIXELS, BLACK INK)

|       | COLUMN 1 | COLUMN 2 | COLUMN 3 | COLUMN 4 | COLUMN 5 | COLUMN 6 | COLUMN 7 | COLUMN 8 |
|-------|---|---|---|---|---|---|---|---|
| ROW 1 | 0 | 0 | 0 | 0 | 1 | 0 | 0 | 0 |
| ROW 2 | 0 | 0 | 0 | 0 | 0 | 0 | 0 | 0 |
| ROW 3 | 0 | 0 | 0 | 0 | 0 | 1 | 0 | 0 |
| ROW 4 | 1 | 0 | 0 | 0 | 0 | 0 | 0 | 0 |
| ROW 5 | 0 | 0 | 1 | 0 | 0 | 0 | 0 | 0 |
| ROW 6 | 0 | 0 | 0 | 0 | 0 | 0 | 0 | 1 |
| ROW 7 | 0 | 0 | 0 | 1 | 0 | 0 | 0 | 0 |
| ROW 8 | 1 | 0 | 0 | 0 | 0 | 0 | 1 | 0 |

Ddak

Fig.33

FORMATION OF CORRESPONDING DOTS OF ALREADY-DETERMINED THRESHOLD VALUE STORAGE ELEMENTS (FIRST PIXEL GROUP, K, Y)

|  | COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|---|
| ROW 1 |  |  |  |  | ● |  |  |  |
| ROW 2 |  |  |  |  |  |  |  |  |
| ROW 3 |  |  | ⊘ |  |  |  |  |  |
| ROW 4 |  |  |  |  |  |  |  |  |
| ROW 5 |  |  | ● |  |  |  |  |  |
| ROW 6 |  |  |  |  |  |  |  |  |
| ROW 7 |  |  |  |  |  |  | ⊘ |  |
| ROW 8 |  |  |  |  |  |  |  |  |

— Dp0ky

● : BLACK INK
⊘ : YELLOW INK

Fig.34

DIGITIZED DOT FORMATION (FIRST PIXEL GROUP, K, Y)

|  | COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|---|
| ROW 1 | 0 | 0 | 0 | 0 | 1 | 0 | 0 | 0 |
| ROW 2 | 0 | 0 | 0 | 0 | 0 | 0 | 0 | 0 |
| ROW 3 | 0 | 0 | 1 | 0 | 0 | 0 | 0 | 0 |
| ROW 4 | 0 | 0 | 0 | 0 | 0 | 0 | 0 | 0 |
| ROW 5 | 0 | 0 | 1 | 0 | 0 | 0 | 0 | 0 |
| ROW 6 | 0 | 0 | 0 | 0 | 0 | 0 | 0 | 0 |
| ROW 7 | 0 | 0 | 0 | 0 | 0 | 0 | 1 | 0 |
| ROW 8 | 0 | 0 | 0 | 0 | 0 | 0 | 0 | 0 |

FORMATION OF CORRESPONDING DOTS OF ALREADY-DETERMINED THRESHOLD VALUE STORAGE ELEMENTS (FIRST PIXEL GROUP, K)

|  | COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|---|
| ROW 1 |  |  |  |  | ● |  |  |  |
| ROW 2 |  |  |  |  |  |  |  |  |
| ROW 3 |  |  |  |  |  |  |  |  |
| ROW 4 |  |  |  |  |  |  |  |  |
| ROW 5 |  |  | ● |  |  |  |  |  |
| ROW 6 |  |  |  |  |  |  |  |  |
| ROW 7 |  |  |  |  |  |  |  |  |
| ROW 8 |  |  |  |  |  |  |  |  |

— Dp0k

● : BLACK INK

Fig.36

DIGITIZED DOT FORMATION (FIRST PIXEL GROUP, K)

|  | COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|---|
| ROW 1 | 0 | 0 | 0 | 0 | 1 | 0 | 0 | 0 |
| ROW 2 | 0 | 0 | 0 | 0 | 0 | 0 | 0 | 0 |
| ROW 3 | 0 | 0 | 0 | 0 | 0 | 0 | 0 | 0 |
| ROW 4 | 0 | 0 | 0 | 0 | 0 | 0 | 0 | 0 |
| ROW 5 | 0 | 0 | 1 | 0 | 0 | 0 | 0 | 0 |
| ROW 6 | 0 | 0 | 0 | 0 | 0 | 0 | 0 | 0 |
| ROW 7 | 0 | 0 | 0 | 0 | 0 | 0 | 0 | 0 |
| ROW 8 | 0 | 0 | 0 | 0 | 0 | 0 | 0 | 0 |

ALL PIXELS, BLACK INK — Dpak1

FIRST PIXEL GROUP, BLACK, YELLOW — Dp0ky1

FIRST PIXEL GROUP, BLACK — Dp0k1

● : BLACK INK
⊘ : YELLOW INK

Fig.38

|  | COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|---|
| ROW 1 | 1 |  |  |  | 1 |  |  |  |
| ROW 2 |  |  |  |  |  |  |  |  |
| ROW 3 |  |  |  |  |  | 1 |  |  |
| ROW 4 | 1 |  |  |  |  |  |  |  |
| ROW 5 |  |  | 1 |  |  |  |  |  |
| ROW 6 |  |  |  |  |  |  |  | 1 |
| ROW 7 |  |  |  | 1 |  |  |  |  |
| ROW 8 | 1 |  |  |  |  |  | 1 |  |

Ddak1

ALL PIXELS, BLACK INK

|  | 1 | 2 | 3 | 4 | 5 | 6 | 7 | 8 |
|---|---|---|---|---|---|---|---|---|
| 1 | 1 |  |  |  | 1 |  |  |  |
| 2 |  |  |  |  |  |  |  |  |
| 3 |  |  | 1 |  |  |  |  |  |
| 4 |  |  |  |  |  |  |  |  |
| 5 |  |  | 1 |  |  |  |  |  |
| 6 |  |  |  |  |  |  |  |  |
| 7 |  |  |  |  |  |  | 1 |  |
| 8 |  |  |  |  |  |  |  |  |

Dd0ky1

FIRST PIXEL GROUP, BLACK, YELLOW

|  | 1 | 2 | 3 | 4 | 5 | 6 | 7 | 8 |
|---|---|---|---|---|---|---|---|---|
| 1 | 1 |  |  |  | 1 |  |  |  |
| 2 |  |  |  |  |  |  |  |  |
| 3 |  |  |  |  |  |  |  |  |
| 4 |  |  |  |  |  |  |  |  |
| 5 |  |  | 1 |  |  |  |  |  |
| 6 |  |  |  |  |  |  |  |  |
| 7 |  |  |  |  |  |  |  |  |
| 8 |  |  |  |  |  |  |  |  |

Ddok1

● : BLACK INK

FIRST PIXEL GROUP, BLACK

Fig.39

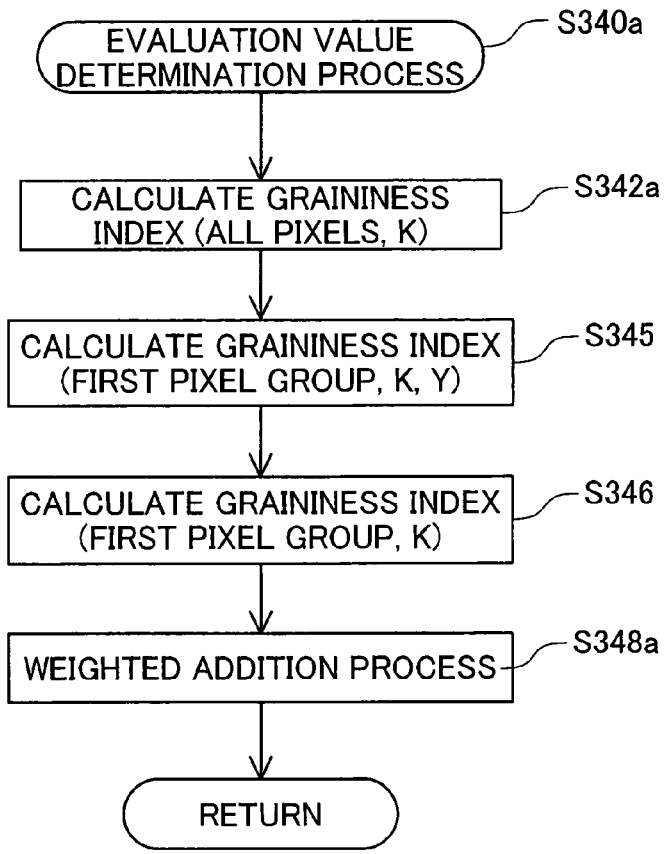

Fig.40

EVALUATION VALUE COMPUTATIONAL EQUATIONS

EQ. 1: $Ek = Gak \times Wak + Gk \times Wg1 + Gky \times Wg2$
EQ. 2: $Ek = Gak \times Wak + Gk \times Wg1 + (Gky + Gkm) \times Wg2$
EQ. 3: $Ek = Gak \times Wak + Gk \times Wg1 + (Gky + Gkm + Gym) \times Wg2$
EQ. 4: $Ek = Gak \times Wak + Gk \times Wg1 + Gky \times Wg2 + Gkm \times Wg3 + Gym \times Wg4$
EQ. 5: $Ek = Gak \times Wak + Gk \times Wg1 + Gkym \times Wg2$ Ek : EVALUATION VALUE (K DOTS)
Gak : GRAININESS INDEX (ALL PIXELS, K DOTS)
Gk : GRAININESS INDEX (PIXEL GROUP, K DOTS)
Gky : GRAININESS INDEX (PIXEL GROUP, K & Y DOTS)
Gkm : GRAININESS INDEX (PIXEL GROUP, K & M DOTS)
Gym : GRAININESS INDEX (PIXEL GROUP, Y & M DOTS)
Gkym : GRAININESS INDEX (PIXEL GROUP, K, Y & M DOTS)
Wak, Wg1, Wg2, Wg3, Wg4 : WEIGHTING COEFFICIENTS

Fig.41

MODIFICATION EXAMPLE OF EMBODIMENT 3

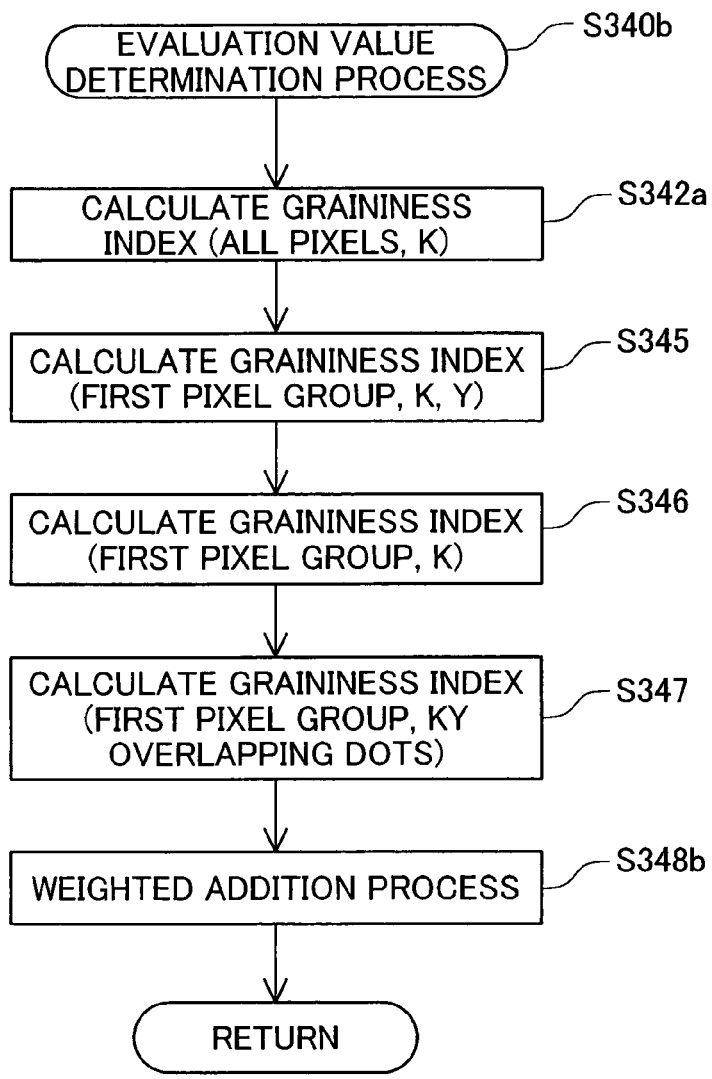

Fig.42

EVALUATION VALUE COMPUTATIONAL EQUATION $Ek' = Gak \times Wak + Gky \times Wg1 + Gk \times Wg2 + Gky' \times Wg3$ Gk : GRAININESS INDEX (BLACK DOTS)
Gak : GRAININESS INDEX (ALL PIXELS, BLACK DOTS)
Gky : GRAININESS INDEX (PIXEL GROUP, BLACK & YELLOW DOTS)
Gk : GRAININESS INDEX (ALL PIXELS, BLACK DOTS)
Gky' : GRAININESS INDEX (PIXEL GROUP, OVERLAPPING DOTS)
Wak, Wg1, Wg2, Wg3 : WEIGHTING COEFFICIENTS Fig.44
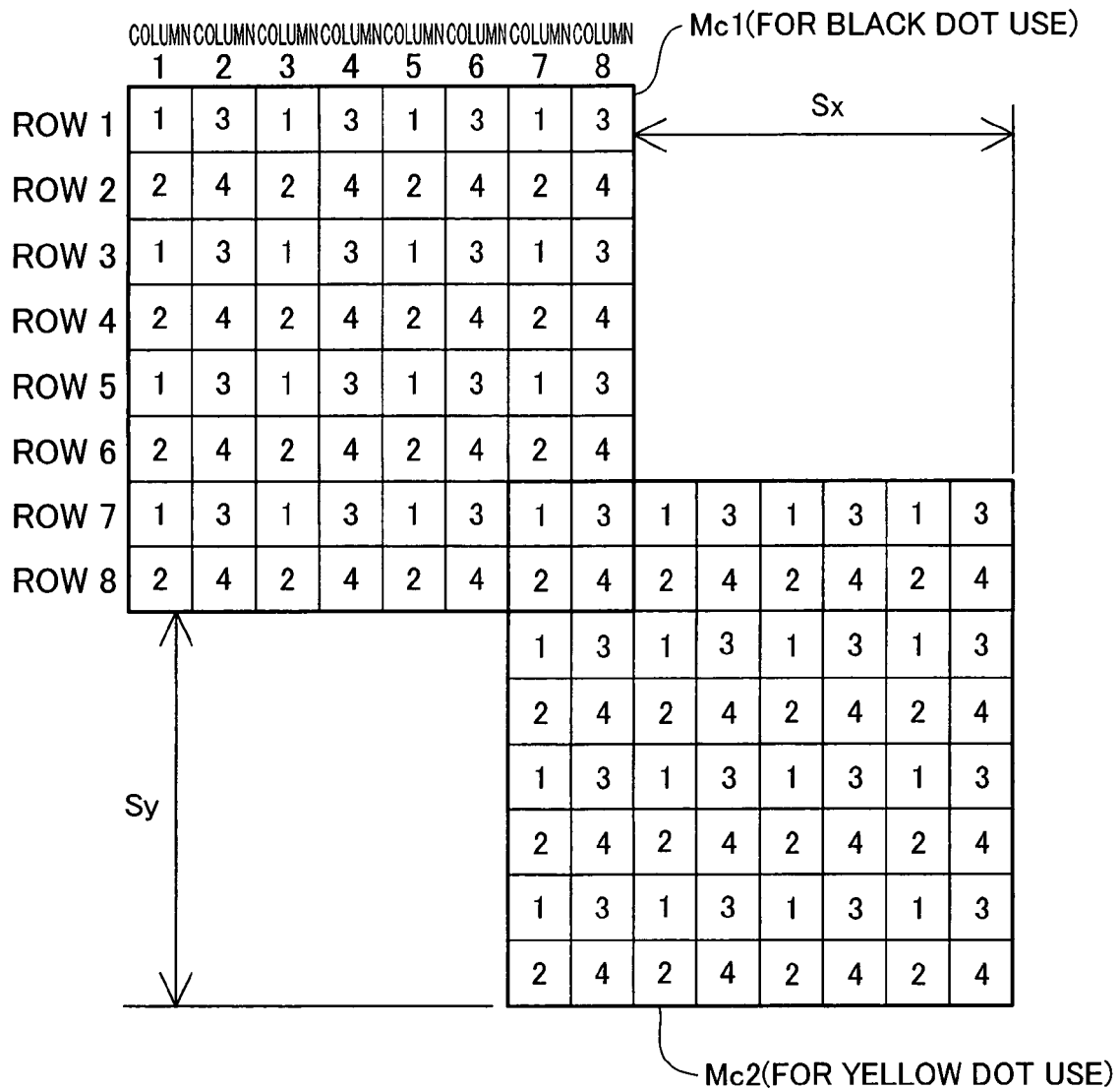
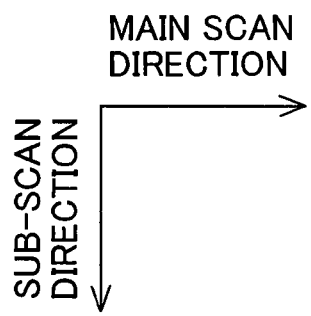

Fig.45

FORMATION OF CORRESPONDING DOTS OF ALREADY-DETERMINED THRESHOLD VALUE STORAGE ELEMENTS (FIRST PIXEL GROUP, K, Y)

|       | COLUMN 1 | COLUMN 2 | COLUMN 3 | COLUMN 4 | COLUMN 5 | COLUMN 6 | COLUMN 7 | COLUMN 8 |
|-------|----------|----------|----------|----------|----------|----------|----------|----------|
| ROW 1 | ✱ |   |   |   | ● |   |   |   |
| ROW 2 |   |   |   |   |   |   |   |   |
| ROW 3 | ⊘ |   |   |   |   |   |   |   |
| ROW 4 |   |   |   |   |   |   |   |   |
| ROW 5 |   |   | ● |   |   |   |   |   |
| ROW 6 |   |   |   |   |   |   |   |   |
| ROW 7 |   |   | ⊘ |   |   |   | ✱ |   |
| ROW 8 |   |   |   |   |   |   |   |   |

Dp0kys1

● : BLACK INK
⊘ : YELLOW INK

Fig.46

DIGITIZED DOT FORMATION (FIRST PIXEL GROUP, K, Y)

|       | COLUMN 1 | COLUMN 2 | COLUMN 3 | COLUMN 4 | COLUMN 5 | COLUMN 6 | COLUMN 7 | COLUMN 8 |
|-------|---|---|---|---|---|---|---|---|
| ROW 1 | 1 | 0 | 0 | 0 | 1 | 0 | 0 | 0 |
| ROW 2 | 0 | 0 | 0 | 0 | 0 | 0 | 0 | 0 |
| ROW 3 | 1 | 0 | 0 | 0 | 0 | 0 | 0 | 0 |
| ROW 4 | 0 | 0 | 0 | 0 | 0 | 0 | 0 | 0 |
| ROW 5 | 0 | 0 | 1 | 0 | 0 | 0 | 0 | 0 |
| ROW 6 | 0 | 0 | 0 | 0 | 0 | 0 | 0 | 0 |
| ROW 7 | 0 | 0 | 1 | 0 | 0 | 0 | 1 | 0 |
| ROW 8 | 0 | 0 | 0 | 0 | 0 | 0 | 0 | 0 |

Dd0kys1

ERROR DIFFUSION SAME-MAIN SCAN GROUP MATRIX
(AFTER WEIGHT ADJUSTMENT)

FOUR PIXEL GROUPS OF DOTS FORMED IN SAME MAIN SCAN

Fig.51

ERROR DIFFUSION SYNTHESIS MATRIX

|   |   | * | 14 | 16 |   | 3 | — Mg3 |
|---|---|---|----|----|---|---|---|
| 6 | 10 | 14 | 10 | 6 |   |   |   |
| 5 | 6 | 16 | 6 | 5 |   |   |   |
|   |   | 3 |    |    |   |   |   |

\* : TARGETED PIXEL     1/120 OF ALL PIXELS

MAIN SCAN DIRECTION →
SUB-SCAN DIRECTION ↓

ERROR DIFFUSION GLOBAL MATRIX

|      |      | *    | 7/48 | 5/48 |
|------|------|------|------|------|
| 3/48 | 5/48 | 7/48 | 5/48 | 3/48 |
| 1/48 | 3/48 | 5/48 | 3/48 | 1/48 |

— Ma

\* : TARGETED PIXEL

ERROR DIFFUSION SAME-MAIN SCAN GROUP MATRIX (AFTER WEIGHT ADJUSTMENT)

|        |      | *    |      | 3/12 |      | 1.5/12 | — Mg1a' |
|--------|------|------|------|------|------|--------|---------|
| 1.5/12 |      | 3/12 |      | 1.5/12 |    |        |         |
|        |      | 1.5/12 |    |      |      |        |         |

\* : TARGETED PIXEL

EMBODIMENT 6

Fig.53

TWO PIXEL GROUPS OF DOTS FORMED IN SAME MAIN SCAN DIRECTION

|   | 1 | 2 | 3 | 4 | 5 | 6 | 7 | 8 |
|---|---|---|---|---|---|---|---|---|
| 1 | 1 | 3 | 1 | 3 | 1 | 3 | 1 | 3 |
| 2 |   |   |   |   |   |   |   |   |
| 3 | 1 | 3 | 1 | 3 | 1 | 3 | 1 | 3 |
| 4 |   |   |   |   |   |   |   |   |
| 5 | 1 | 3 | 1 | 3 | 1 | 3 | 1 | 3 |
| 6 |   |   |   |   |   |   |   |   |
| 7 | 1 | 3 | 1 | 3 | 1 | 3 | 1 | 3 |
| 8 |   |   |   |   |   |   |   |   |

~M13

|   | 1 | 2 | 3 | 4 | 5 | 6 | 7 | 8 |
|---|---|---|---|---|---|---|---|---|
| 1 |   |   |   |   |   |   |   |   |
| 2 | 2 | 4 | 2 | 4 | 2 | 4 | 2 | 4 |
| 3 |   |   |   |   |   |   |   |   |
| 4 | 2 | 4 | 2 | 4 | 2 | 4 | 2 | 4 |
| 5 |   |   |   |   |   |   |   |   |
| 6 | 2 | 4 | 2 | 4 | 2 | 4 | 2 | 4 |
| 7 |   |   |   |   |   |   |   |   |
| 8 | 2 | 4 | 2 | 4 | 2 | 4 | 2 | 4 |

~M24

ERROR DIFFUSION SAME-MAIN SCAN DIRECTION GROUP MATRIX

|   |   | * | 8/24 | 4/24 | 2/24 |
|---|---|---|------|------|------|
| 1/24 | 2/24 | 4/24 | 2/24 | 1/24 |   |

Mg2

* : TARGETED PIXEL

MAIN SCAN DIRECTION →
SUB-SCAN DIRECTION ↓

Fig.54

|        | COLUMN 1 | COLUMN 2 | COLUMN 3 | COLUMN 4 | COLUMN 5 |
|--------|----------|----------|----------|----------|----------|
| ROW 1  | 0 | 1 | 2 | 1 | 0 |
| ROW 2  | 1 | 3 | 4 | 3 | 1 |
| ROW 3  | 2 | 4 | 5 | 4 | 2 |
| ROW 4  | 1 | 3 | 4 | 3 | 1 |
| ROW 5  | 0 | 1 | 2 | 1 | 0 |

Fig.55

EQUATION DEFINING RMS GRANULARITY $$\text{RMS GRANULARITY} = \sqrt{\frac{\sum (\text{DENSITY VALUE} - \text{AVERAGE DENSITY VALUE})^2}{\text{PIXEL COUNT}}}$$

SECOND MODIFICATION EXAMPLE

MODIFICATION EXAMPLE 4

HALFTONE FOR REDUCING DOT CONTACT BETWEEN DIFFERENT COLORS

BACKGROUND

1. Technical Field

The present invention relates to technology for printing images by forming dots on a printing medium.

2. Related Art

Printing devices that print images by forming dots on a printing medium enjoy widespread use as output devices for images created on a computer or images shot with a digital camera, for example. Since input tone values will outnumber the tone values of the dots that such a printing device is capable of forming, the device performs tone representation by means of a halftone process. Systematic dither processes employing dither matrices are one widely used type of halftone process. Since the content of the dither matrix has considerable influence on image quality, it has been attempted to optimize dither matrices by analytical methods such as genetic algorithms or simulated annealing using evaluation coefficients that take human visual faculty into consideration, such as disclosed in JP-A-7-177351 for example. There has also been proposed technology for improving dispersion of multiple types of dots, in printed images that are formed using multiple types of dots of different density or hue, as disclosed in JP-A-10-157167.

However, halftone processes such as the above fail to take into consideration degradation of image quality that can occur when images are printed by ejecting ink dots of several colors while scanning a common area of the printing medium (e.g. uneven color mixing of several color inks occurring in main scans).

SUMMARY

An advantage of some aspect of the invention is to provide a technique for reducing degradation of image quality produced when images are printed by ejecting ink dots of multiple colors while scanning a common area of the printing medium.

The invention provides a printing method of printing on a printing medium. The method includes: generating dot data representing a status of dot formation on each of print pixels of a print image to be formed on the print medium, by performing a halftone process on image data representing a input tone value of each of pixels constituting an original image; providing a print head having a plurality of nozzle groups that eject inks of mutually different colors; and generating the print image by mutually combining dot groups of multiple colors formed in at least one scan in a common print area, by forming each dot group with each of the plurality of nozzle groups during each scan of the print head in response to the dot data, the each of the dot groups being mutually different in color. The generating dot data comprise setting a condition for reducing contact between the dot groups of the at least two specific colors within at least part of tone values, for at least two specific colors of dot groups among the dot groups of multiple colors.

According to the printing method of the invention, dot groups mutually differing in color are formed by individual banks among the plurality of nozzle groups during each scan of the print head, a100nd conditions for the halftone process for dot groups of two or more specific colors among the dot groups of multiple colors formed during at least one scan pass are established so as to inhibit contact among the dot groups, whereby it is possible to inhibit degraded image quality such as uneven color mixing of several colors of ink that can occur during main scan passes, or reversal irregularity (described later) that can occur during bi-directional printing. It is accordingly possible to inhibit degradation of image quality produced when images are printed by ejecting ink dots of several colors while scanning a common area of the printing medium.

Herein, "contact among dot groups of two or more specific colors" is a broad concept that refers not only to contiguity and contact among dots belonging to dot groups of the two or more specific colors, but includes overlap of these as well. "Inhibiting contact" refers not only to inhibiting contact (i.e. contiguity or overlap of dots) among dot groups, but is interpreted in a broad sense to include: (1) instances of inhibiting further contact among dots that have come into contact as a result of having dispersed contacting dots; and (2) instances in which, focusing exclusively on dispersion of contacting dots, inhibiting only multiple contact among dots (e.g. the method focusing exclusively on overlapping dots described in the modification example of invention). Such halftone processes may be implemented by means of halftone processes employing dither matrices, or by error diffusion methods.

The invention also provides a method for generating the aforementioned dither matrix. This method is a method for generating a dither matrix whose elements respectively store a plurality of threshold values for the purpose of determining the state of formation of dots of multiple colors on the print pixels of a printed image to be formed on a printing medium in accordance with input image data. The formation of the printed image is carried out by means of a plurality of nozzle banks that respectively eject inks of mutually different color to form dot groups of mutually different color during each scan of a print head having the plurality of nozzle banks, and combining together within a shared printing region dot groups of multiple colors formed by at least one scan of the print head. The method for generating the dither matrix includes: an evaluation value determination step in which, for dot groups of two or more specific colors from among the multiple color dot groups, a matrix evaluation value is determined for each of the candidates, on the basis of a hypothetical state of dot formation on each candidate storage element for a targeted threshold value targeted for evaluation among the plurality of threshold values, wherein the evaluation value is calculated using a value that quantifies the extent of contact among the dot groups of two or more specific colors; a storage element determination step wherein a storage element for the targeted threshold value is determined from among the candidates, on the basis of the determined matrix evaluation value; and a repeating step wherein the evaluation value determination step and the storage element determination step are repeated for at least some tone values of the plurality of threshold values.

In general, the "matrix evaluation value" herein may be an evaluation value calculated using a value that quantifies the extent of contact of dots of two or more specific colors among multiple colors of dots. Furthermore, the value that quantifies the extent of contact of dots of two or more specific colors can take the form of a correlation function between dot patterns composed of dots of two or more specific colors, and the resultant condition of less contact among dots (blue noise characteristics or green noise characteristics).

The value that quantifies the extent of contact among dot groups of two or more specific colors may be calculated using RMS granularity or the graininess index of dot patterns composed of dots of the specific two or more colors; it would also be possible to use a potential method whereby threshold values are stored sequentially in elements corresponding to pixels of low dot density subsequent to a low-pass filter process. Where a low-pass filter is employed, depending on the extent of image quality degradation caused by the effects of color mixing, the range of the low-pass filter can be adjusted in addition to employing the weights discussed previously. For example, in cases where the intention is to emphasize inhibition of contact and overlap only rather than to improve dot dispersion, this could be accomplished by adopting a small range of the low-pass filter.

The aforementioned method for generating the dither matrix may further include: a targeted threshold value determination step for determining, from among a plurality of threshold values to be stored in elements of the dither matrix, a targeted threshold value for which the storage element is yet underdetermined and that has the highest tendency for dot formation to be on; the repeating step may include a step of repeating the targeted threshold value determination step, the evaluation value determination step, and the storage element determination step, for at least some tone values of the plurality of threshold values or further include: a preparation step for preparing a dither matrix with an initial state in which a plurality of threshold values for the purpose of determining dot on/off state of each pixel depending on input tone values are stored in the elements; and a storage element replacement step for replacing some of the plurality of threshold values stored in the elements, with threshold values stored at other elements. The evaluation value determination step includes a step of determining the matrix evaluation value for a hypothetical state of dot formation assuming that replacement of the threshold value has been determined; and the repeating step includes a step of repeating the storage element replacement step, the evaluation value determination step, and the storage element determination step, for at least some tone values of the plurality of threshold values. In the latter case, "each candidate storage element" would be equivalent to "each combination of several replaced candidate storage elements" as in the modification example (E-7) discussed previously.

The invention may also be reduced to practice in other forms, for example, a dither matrix, a dither matrix generating device, a printing device or printing method employing a dither matrix, a method of generating printed matter, a computer program for implementing the functions of such method or device by means of a computer, or a recording medium having such a computer program recorded thereon.

The use of a dither matrix in a printing device, printing method, or method of generating printed matter permits the dot on/off state of pixels to be determined through comparison on a pixel-by-pixel basis of threshold values established in the dither matrix to the tone values of image data; however, it would also be acceptable to determine the dot on/off state by comparing the sum of threshold value and tone value to a fixed value, for example. It would also be acceptable to determine dot on/off state according to tone values, and data created previously on the basis of threshold values, rather than using threshold values directly. Generally speaking, the dither method of the invention can be any method that permits dot on/off state to be determined according the tone values of pixels, and threshold values established at corresponding pixel locations in a dither matrix.

The dither matrix of the invention has a broad concept that includes a conversion table (or correspondence table) generated using a dither matrix, in technology such as that disclosed in Japanese Unexamined Patent Application 2005-236768 or Japanese Unexamined Patent Application 2005-269527 for example, which teach the use of intermediate data (count data) for the purpose of identifying states of dot formation. Such a conversion table may be generated not only directly from a dither matrix generated by the generation method of the invention, but in some instances may be subjected to adjustments or improvements; such instances will also constitute use of a dither matrix generated by the generation method of the invention.

BRIEF DESCRIPTION OF THE DRAWINGS

FIG. 11 is an illustration depicting a dither matrix M subjected to a grouping process in Embodiment 1.

FIG. 12 is an illustration depicting four divided matrices M1-M4 in Embodiment 1.

FIG. 13 is an illustration depicting an example of evaluation matrices targeted for evaluation in Embodiment 1.

FIG. 15 is an illustration depicting dots formed on each of eight pixels that correspond to elements storing threshold values associated with the first to eighth greatest tendency to dot formation in a dither matrix M.

FIG. 16 is an illustration depicting a matrix that digitizes a condition in which a dot pattern Dpa has been formed, i.e., a dot density matrix Dda that represents dot density quantitatively.

FIG. 17 is an illustration depicting four dot patterns Da1_2, Da2_3, Da3_4, Da4_1 formed on print pixels belonging respectively to first to fourth consecutive pixel groups, among elements storing the threshold values associated with the first to eighth greatest tendency to dot formation in a dither matrix M.

FIG. 18 is an illustration depicting dot density matrices Dd1_2, Dd2_3, Dd3_4, Dd4_1 that correspond respectively to the four dot patterns Da1_2, Da2_3, Da3_4, Da4_1.

FIG. 19 is a flowchart showing the processing routine of an evaluation determination process in Embodiment 1.

FIG. 20 is an illustration depicting a computational equation for use in a weighted addition process in Embodiment 1.

FIG. 25 is an illustration depicting an error diffusion synthesis matrix Mg3 used in a modification example of Embodiment 2.

FIG. 29 is an illustration depicting an exemplary dot pattern targeted for evaluation in Embodiment 3.

FIG. 31 is an illustration depicting dots formed on each of eight pixels that correspond to elements storing threshold values associated with the first to eighth greatest tendency to dot formation in a dither matrix.

FIG. 32 is an illustration depicting a matrix constituting a digitized representation formation of the dot pattern Dpak, i.e., a dot density matrix Ddak that represents dot density quantitatively.

FIG. 33 is an illustration depicting a dot pattern Dp0ky in Embodiment 3.

FIG. 34 is an illustration depicting a dot density matrix Dd0ky in Embodiment 3.

FIG. 35 is an illustration depicting a dot pattern Dp0k in Embodiment 3.

FIG. 36 is an illustration depicting a dot density matrix Dd0k in Embodiment 3.

FIG. 37 is an illustration depicting selection of a storage candidate element from among elements in a divided matrix M1.

FIG. 38 is an illustration depicting three dot density matrices Dpak1, Dp0ky1, Dp0k1 constituting digitized representations of a dot formed on a pixel (Row 1 Column 3) corresponding to a candidate storage element.

FIG. 39 is a flowchart showing the processing routine of a dither matrix evaluation process in Embodiment 3.

FIG. 40 is an illustration depicting a computational equation for use in a weighted addition process in Embodiment 3.

FIG. 41 is a flowchart showing the processing routine of a dither matrix evaluation process in a modification example of Embodiment 3.

FIG. 42 is an illustration depicting a computational equation for use in a weighted addition process in a modification example of Embodiment 3.

FIG. 44 is an illustration depicting the specifics of a matrix shift process in Embodiment 4.

FIG. 45 is an illustration depicting an evaluation dot pattern Dp0kys1 in Embodiment 4.

FIG. 46 is an illustration depicting a dot density matrix Dd0kys1 in Embodiment 4.

FIG. 51 is an illustration depicting an error diffusion synthesis matrix Mg3 used in a modification example of Embodiment 5.

FIG. 53 is an illustration depicting an error diffusion same-main scan group matrix for the purpose of performing cumulative group error diffusion into a specific pixel group in Embodiment 6.

FIG. 54 is an illustration depicting a low-pass filter used for computing RMS granularity, used in Modification Example 1.

FIG. 55 is an illustration depicting an equation defining RMS granularity, used in Modification Example 1.

DESCRIPTION OF EXEMPLARY EMBODIMENTS

The preferred embodiments will be described below in the following order, for the purpose of providing a clearer understanding of the operation and working effects of the invention.

Figure 1:
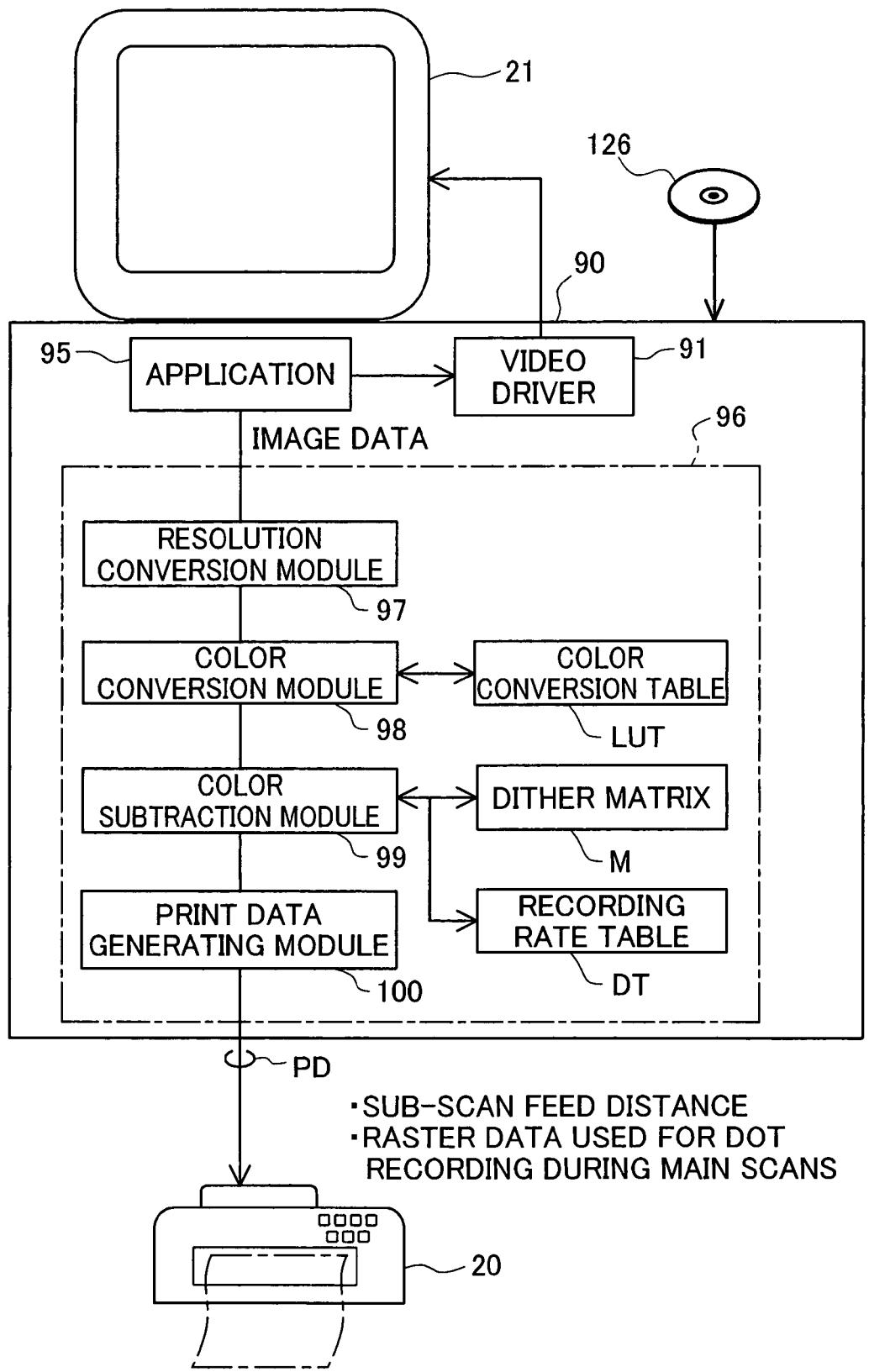
FIG. 1 is a block diagram illustrating the configuration of a printing system in the embodiments.

A. Configuration of Printing System in the Embodiments:
B. Concept of Optimized Dither Matrix in the Embodiments:
C. Improving Dispersion of Dots Formed in Consecutive Main Scans:
   C-1. Halftone Process in Embodiment 1 (Dither Matrix Generation Method)
   C-2. Halftone Process in Embodiment 2 (Dither Matrix Generation Method)
D. Improving Dispersion of Multiple-color Dots Formed in Same-main scan
   D-1. Halftone Process in Embodiment 3 (Dither Matrix Generation Method)
   D-2. Halftone Process in Embodiment 4 (Dither Matrix Generation Method)
   D-3. Halftone Process in Embodiment 5 (Error Diffusion Method)
   D-4. Halftone Process in Embodiment 6 (Error Diffusion Method)
E. Modification Examples:
   A. Configuration of Printing System in the Embodiments:

FIG. 1 is a block diagram illustrating the configuration of a printing system in the embodiments. This printing system is furnished with a computer 90 as a printing control device, and a color printer 20 as a printing portion. The color printer 20 and the computer 90 can be termed a "printing device" in the broad sense.

On the computer 90, an application program 95 runs on a prescribed operating system. The operating system incorporates a video driver 91 and a printer driver 96; print data PD for transfer to the color printer 20 is output from the application program 95 via these drivers. The application program 95 performs the desired processing of images targeted for processing, as well as outputting images to a CRT 21 via the video driver 91.

Within the printer driver 96 are a resolution conversion module 97 for converting the resolution of an input image to the resolution of the printer; a color conversion module 98 for color conversion from RGB to CMYK; a color subtraction module 99 that, using the dither matrices M generated in the embodiments to be discussed later, performs color subtraction of input tone values and transform them into output tone values representable by forming dots; a print data generating module 100 that uses the color subtraction data for the purpose of generating print data to be sent to the color printer 20; a color conversion table LUT serving as a basis for color conversion by the color conversion module 98; and a recording rate table DT for determining recording rates of dots of each size, for the color subtraction process. The printer driver 96 corresponds to a program for implementing the function of generating the print data PD. The program for implementing the functions of the printer driver 96 is provided in a format recorded on a computer-readable recording medium. Examples of such a recording medium are a CD-ROM 126, flexible disk, magnetooptical disk, IC card, ROM cartridge, punch card, printed matter having a bar code or other symbol imprinted thereon, a computer internal memory device (e.g. RAM, ROM, or other memory) or external memory device, or various other computer-readable media.

Figure 2:
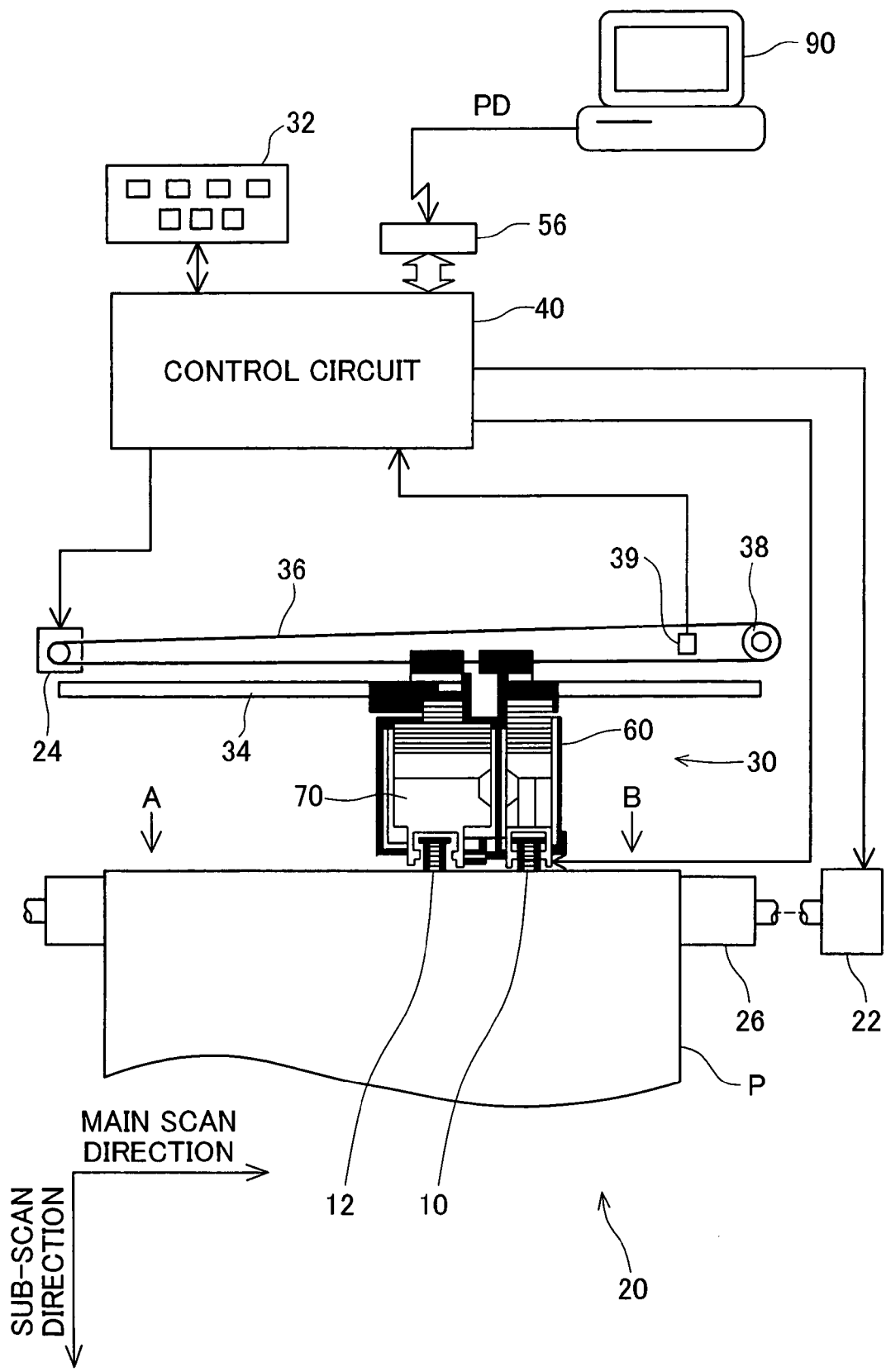
FIG. 2 is a schematic illustration of a color printer 20.

FIG. 2 is a schematic illustration of the color printer 20. The color printer 20 is equipped with a sub-scan driving portion for transporting printing paper P in the sub-scanning direction by means of a paper feed motor 22; a main scan driving portion for reciprocating a carriage 30 in the axial direction of a paper feed roller 25 (main scanning direction) by means of a carriage motor 24; a head drive mechanism for driving a print head unit 60 installed on the carriage 30 (also termed the "print head assembly") and controlling ink ejection and dot formation; and a control circuit 40 for exchange of signals with the paper feed motor 22, the carriage motor 24, the print head unit 60 equipped with the print heads 10, 12, and a control panel 32. The control circuit 40 is connected to the computer 90 via a connector 56.

Figure 3:
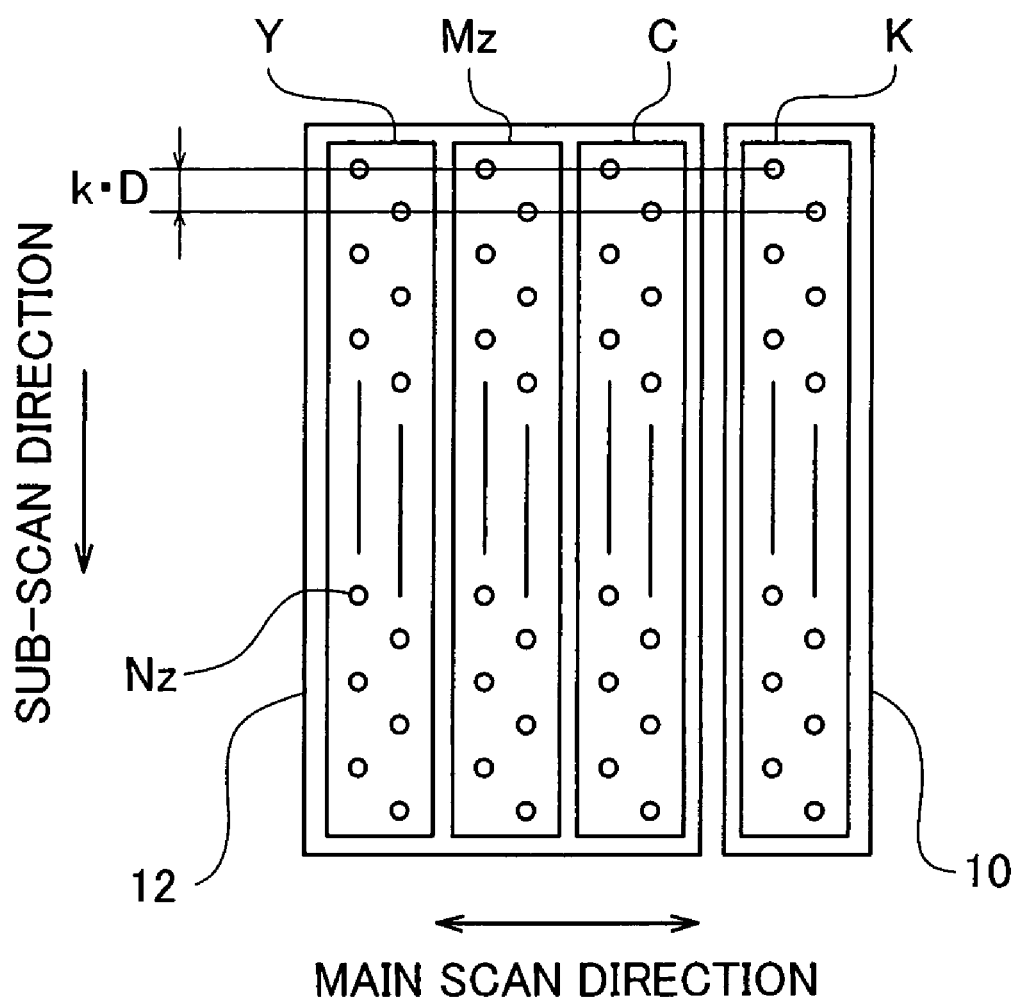
FIG. 3 is an illustration of a nozzle arrangement on the lower face of print heads.

FIG. 3 is an illustration of the nozzle arrangement on the lower face of the print heads 10, 12. On the lower face of the print head 10 there are formed a black ink nozzle group K for ejecting black ink, a cyan ink nozzle group C for ejecting cyan ink, a magenta ink nozzle group Mz for ejecting magenta ink, and a yellow ink nozzle group Y for ejecting yellow ink.

The plurality of nozzles contained in each nozzle group are respectively lined up at a constant nozzle pitch k·D, in the sub-scan direction. Here, k is an integer, and D represents pitch equivalent to the print resolution in the sub-scan direction (also termed "dot pitch"). This will also be referred to herein as "the nozzle pitch being k dots." The "dot" unit means the dot pitch of the print resolution. Similarly, sub-scan feed distance is also expressed in "dot" units.

Each nozzle Nz is provided with a piezo element (not shown) for the purpose of driving the nozzle Nz and ejecting drops of ink. During printing, ink drops are ejected from the nozzles as the print heads 10, 12 are scanned in the main scan direction MS.

In the color printer 20 having the hardware configuration described above, as the printing paper P is transported by the paper feed motor 22, the carriage 30 is reciprocated by the carriage motor 24 while at the same time driving the piezo elements of the print head 10 to eject ink drops of each color and form large, medium, and small dots, producing on the printing paper P an image optimized for the ocular system and the color printer 20. Specifically, a printed image is formed in the following way. In order to make the following description easier to understand, monochromatic printing using the print head 10 only will be described first, and then the discussion will be expanded to include color printing.

Figure 4:
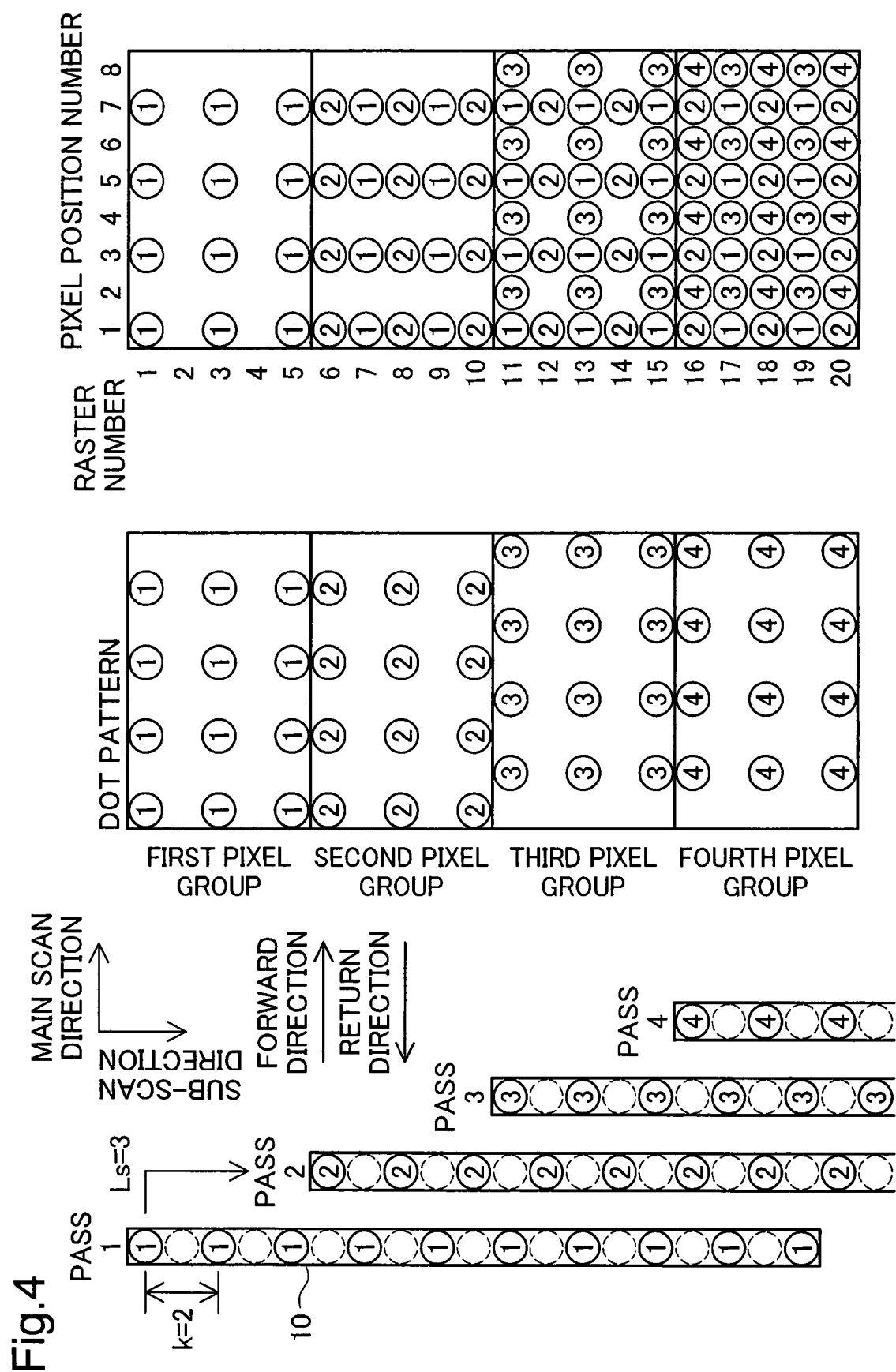
FIG. 4 is an illustration of an exemplary monochromatic print image generating process in the embodiments.
Figure 5:
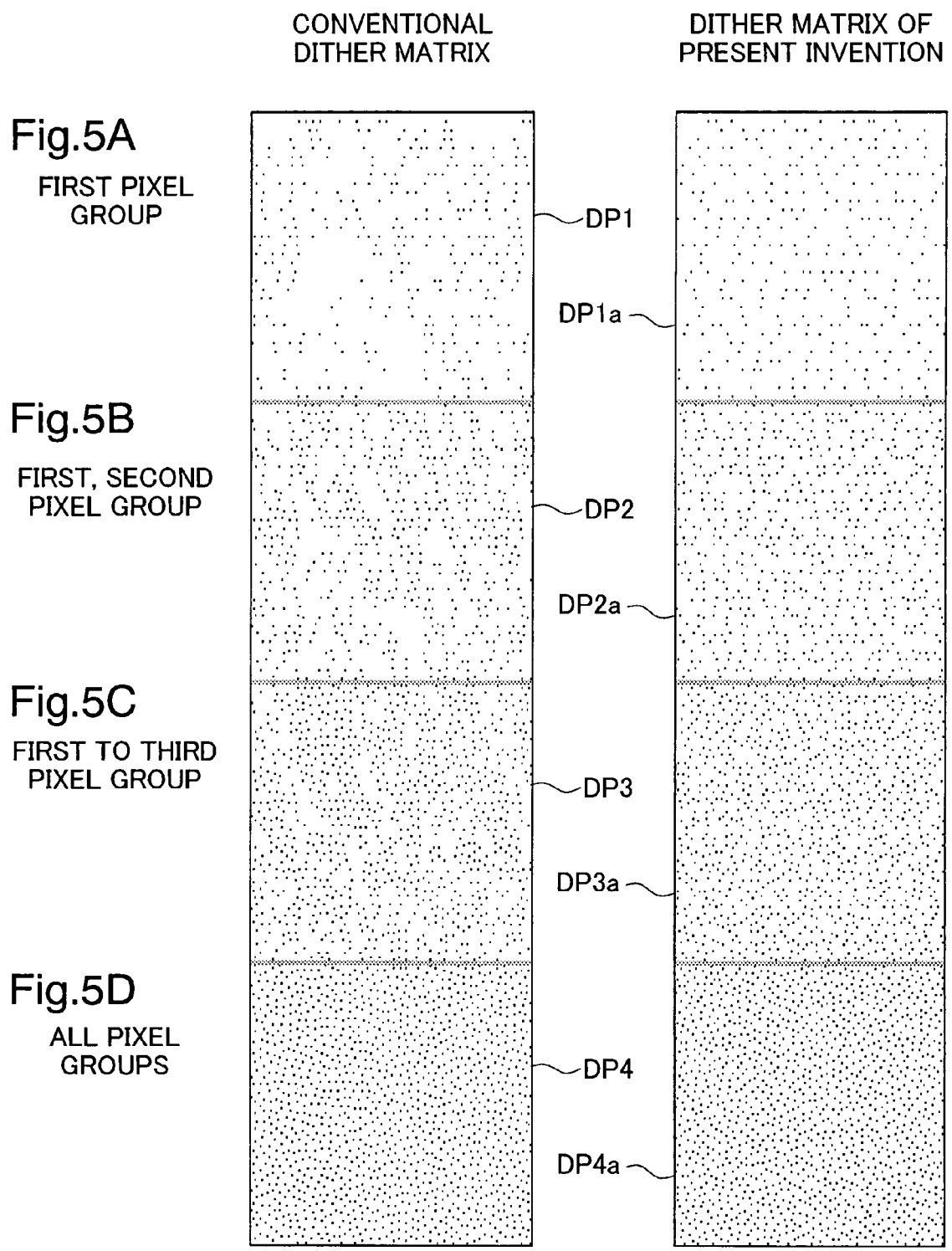
FIGS. 5A to 5D are an illustration depicting creation of a printed image on a printing medium in the embodiments by means of combining, into a common printing area, print pixels that belong to multiple pixel groups.

FIG. 4 is an illustration of an exemplary monochromatic print image generating process in the embodiments. The print image is generated on the print medium by forming ink dots while performing main scanning and sub scanning in this image forming methods. The main scan means the operation of moving the printing head 10 relatively in the main scan direction in relation to the print medium. The sub scan means the operation of moving the printing head 10 relatively in the sub scan direction in relation to the print medium. The printing head 10 is configured so as to form ink dots by spraying ink drops on the print medium. The printing head 10 is equipped with ten nozzles that are not illustrated at intervals of 2 times the pixel pitch k.

Generation of the print image is performed as follows while performing main scanning and sub scanning. Among the ten main scan lines of raster numbers 1, 3, 5, 7, 9, 11, 13, 15, 17, and 19, ink dots are formed at the pixels of the pixel position numbers 1, 3, 5, and 7. The main scan line means the line formed by the continuous pixels in the main scan direction. Each circle indicates the dot forming position. The number inside each circle indicates the pixel groups configured from the plurality of pixels for which ink dots are formed simultaneously. With pass 1, dots are formed on the print pixels belong to the first pixel group.

When the pass 1 main scan is completed, the sub scan sending is performed at a movement volume Ls of 3 times the pixel pitch in the sub scan direction. Typically, the sub scan sending is performed by moving the print medium, but with this embodiment, the printing head 10 is moved in the sub scan direction to make the description easy to understand. When the sub scan sending is completed, the pass 2 main scan is performed.

With the pass 2 main scan, among the ten main scan lines for which the raster numbers are 6, 8, 10, 12, 14, 16, 18, 20, 22, and 24, ink dots are formed at the pixels for which the pixel position number is 1, 3, 5, and 7. Working in this way, with pass 2, dots are formed on the print pixels belonging to the second pixel group. Note that the two main scan lines for which the raster numbers are 22 and 24 are omitted in the drawing. When the pass 2 main scan is completed, after the sub scan sending is performed in the same way as described previously, the pass 3 main scan is performed.

With the pass 3 main scan, among the ten main scan lines including the main scan lines for which the raster numbers are 11, 13, 15, 17, and 19, ink dots are formed on the pixels for which the pixel position numbers are 2, 4, 6, and 8. With the pass 4 main scan, among the ten main scan lines including the three main scan lines for which the raster numbers are 16, 18, and 20, ink dots are formed on the pixels for which the pixel position numbers are 2, 4, 6, and 8. Working in this way, we can see that it is possible to form ink dots without gaps in the sub scan position from raster number 15 and thereafter. With pass 3 and pass 4, dots are formed on the print pixels belonging respectively to the third and fourth pixel groups.

When monitoring this kind of print image generation focusing on a fixed area, we can see that this is performed as noted below. For example, when the focus area is the area of pixel position numbers 1 to 8 with the raster numbers 15 to 19, we can see that the print image is formed as noted below at the focus area.

With pass 1, at the focus area, we can see that a dot pattern is formed that is the same as the ink dots formed at the pixel positions for which the pixel position numbers are 1 to 8 with the raster numbers 1 to 8. This dot pattern is formed by dots formed at the pixels belonging to the first pixel group. Specifically, with pass 1, for the focus area, dots are formed at pixels belonging to the first pixel group.

With pass 2, at the focus area, dots are formed at the pixels belonging to the second pixel group. With pass 3, at the focus area, dots are formed at the pixels belonging to the third pixel group. With pass 4, at the focus area, dots are formed at the pixels belonging to the fourth pixel group.

In this way, the monochromatic print with this embodiment, we can see that the dots formed at the print pixels belonging to each of the plurality of first to fourth pixel groups are formed by mutually combining at the common print area.

Meanwhile, in color printing in accordance with the present embodiment, color printed images are formed by means of ejecting ink of the colors C, Mz, Y and K from the ink head (FIG. 3), onto each of the first to fourth multiple pixel groups. In this way, in color printing inks of several colors are ejected substantially simultaneously during each main scan pass.

FIGS. 5A to 5D are illustrations depicting creation of a printed image on a printing medium in the embodiments by means of combining, into a common printing area, print pixels that belong to multiple pixel groups. In the example of FIGS. 5A to 5D, the printed image is a printed image of prescribed intermediate tone (monochrome). The dot patterns DP1, DP1a are dot patterns formed on a plurality of pixels belonging to a first pixel group. The dot patterns DP2, DP2a are dot patterns formed on a plurality of pixels belonging to the first and a second pixel group. The dot patterns DP3, DP3a are dot patterns formed on a plurality of pixels belonging to the first through a third pixel group. The dot patterns DP4, DP4a are dot patterns formed on a plurality of pixels belonging to all of the pixel groups.

The dot patterns DP1, DP2, DP3, DP4 are dot patterns obtained where a conventional dither matrix is used. The dot patterns DP1a, DP2a, DP3a, DP4a are dot patterns obtained where the dither matrix of the embodiment is used. As will be apparent from FIGS. 5A to 5D, where the dither matrix of the embodiment is used, dispersion of dots is more uniform than here a conventional dither matrix is used, especially for the dot patterns DP1a, DP2a having minimal overlap of dot pattern.

Since conventional dither matrices lack the concept of pixel groups, optimization is carried out in a manner focused exclusively on dispersion of dots in the final printed image (in the example of FIGS. 5A to 5D, the dot pattern DP4).

However, the inventors have carried out an analysis of image quality of printed images, focusing on the dot patterns in the course of the dot formation process. As a result of the analysis, it was found that image irregularity may arise during the dot formation process due to density level of dot patterns. The inventors discovered that such image irregularity occurs because dots of several colors formed during a given main scan pass do not overlap in a uniform manner, thus producing areas in which dots of several colors come into contact and bleed together and areas in which where dots of several colors remain separate and do not bleed together, occur in mottled patterns, which in turn causes irregular color.

Such color irregularity may occur even where a printed image is formed in a single pass. However, even if color irregularity is produced uniformly throughout the entire image, it will nevertheless not be readily apparent to the human visual faculty. This is because, due to the fact that the irregularity occurs uniformly, ink bleed will not take the form of nonuniform "irregularity" that includes a low-frequency component.

In a dot pattern composed of pixel groups in which ink dots are formed substantially simultaneously during a given main scan, if irregularity should happen to occur due to ink bleed in a low-frequency region that is readily noticeable to the human eye, marked degradation of image quality will become apparent. In this way, the inventors discovered for the first time that, where a printed image is produced by means of forming ink dots, high levels of image quality may be obtained if the dither matrix is optimized giving attention to the dot patterns formed in pixel groups in which ink dots are formed substantially simultaneously.

The inventors further ascertained that degraded image quality of an extent highly noticeable to the human eye may result not only from ink bleed, but also from physical phenomena of the ink, such as ink agglomeration, irregular sheen, or bronzing. Bronzing is a phenomenon whereby, due to factors such as coagulation of dye in ink drops, the condition of reflected light on the printed paper surface varies so that, for example, the printed surface develops a bronze-colored appearance depending on the viewing angle. The inventors additionally ascertained that such physical phenomena of ink occurs even in consecutive passes (e.g. Pass 1 and Pass 2). It was further determined by the inventors that color irregularity of the sort described above can occur during consecutive passes as well.

Furthermore, conventional dither matrices, attempt to achieve optimization on the assumption that positional relationships among pixel groups are the same as the ones posited in advance; thus, in the event that actual positional relationships should deviate, optimality can no longer be assured and appreciable degradation of image quality may result. However, experiments conducted by the inventors have shown for the first time that, with the dither matrix of the embodiment, due to the fact that dispersion of dots is assured in dot patterns within dot groups as well, a high level of robustness against such deviation in positional relationships can be assured.

The inventors have furthermore found that this technical concept assumes increased importance as printing speed increases. This is because faster printing speed means that dots of the next pixel group are formed before there has been sufficient time for the ink to be absorbed.

Figure 6:
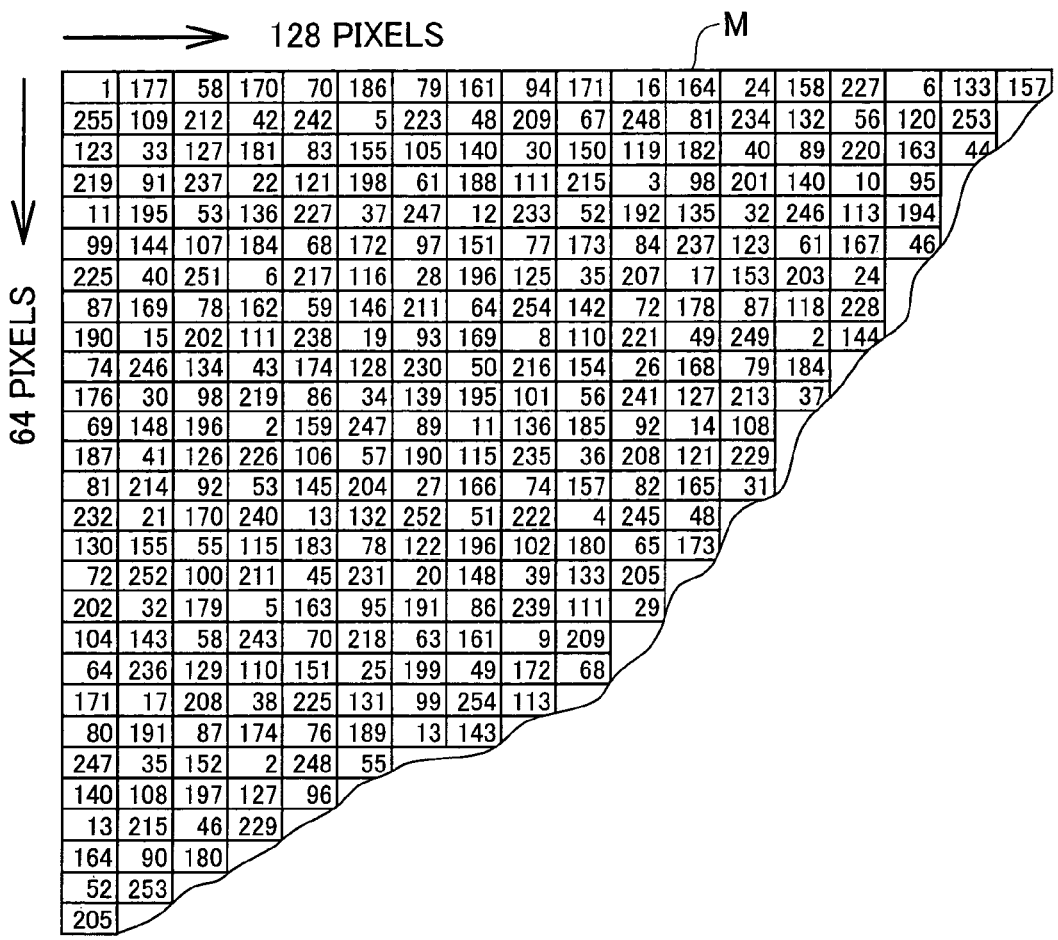
FIG. 6 is an illustration depicting conceptually part of an exemplary dither matrix.

B. Concept of Optimized Dither Matrix in the Embodiments:

FIG. 6 is an illustration depicting conceptually part of an exemplary dither matrix. The illustrated dither matrix contains threshold values selected evenly from a tone value range of 1 to 255, stored in a total of 8912 elements, i.e. 128 elements in the horizontal direction (main scan direction) and 64 elements in the vertical direction (sub-scan direction). The size of the dither matrix is not limited to that shown by way of example in FIG. 6; various other sizes are possible, including matrices having identical numbers of horizontal and vertical elements.

Figure 7:
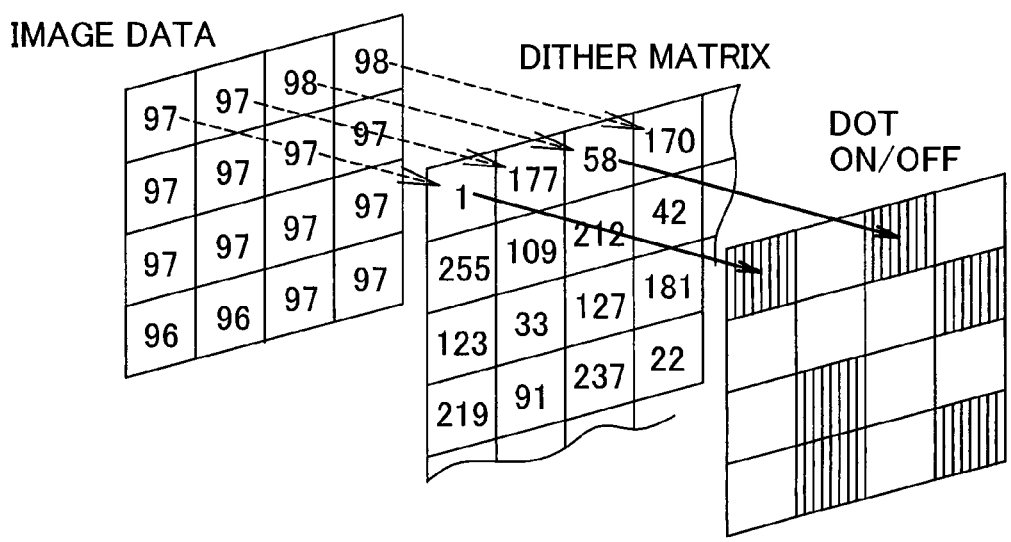
FIG. 7 is an illustration depicting the concept of dot on/off states using a dither matrix.

FIG. 7 is an illustration depicting the concept of dot on/off states using a dither matrix. FIG. 2 is an illustration depicting the concept of dot on-off state using a dither matrix. For convenience in illustration, only a portion of the elements are shown. As depicted in FIG. 7, when determining dot on-off states, tone values contained in the image data are compared with the threshold values saved at corresponding locations in the dither matrix. In the event that a tone value contained in the image data is greater than the corresponding threshold value stored in the dither table, a dot is formed; if the tone value contained in the image data is smaller, no dot is formed. Pixels shown with hatching in FIG. 7 signify pixels targeted for dot formation. By using a dither matrix in this way, dot on-off states can be determined on a pixel-by-pixel basis, by a simple process of comparing the tone values of the image data with the threshold values established in the dither matrix, making it possible to carry out the tone number conversion process rapidly. Furthermore, once image data tone values have been determined, decisions as to whether to form dots on pixels will be made exclusively on the basis of the threshold values established in the matrix, and from this fact it will be apparent that with a systematic dither process it is possible to actively control dot production conditions by means of the threshold value storage locations established in the dither matrix.

Since with a systematic dither process it is possible in this way to actively control dot production conditions by means of the storage locations of the threshold values established in the dither matrix, a resultant feature is that dot dispersion and other picture qualities can be controlled by means of adjusting the settings of the threshold value storage locations. This means that by means of a dither matrix optimization process, it is possible to optimize the halftoning process for a wide variety of target states.

Figure 8:
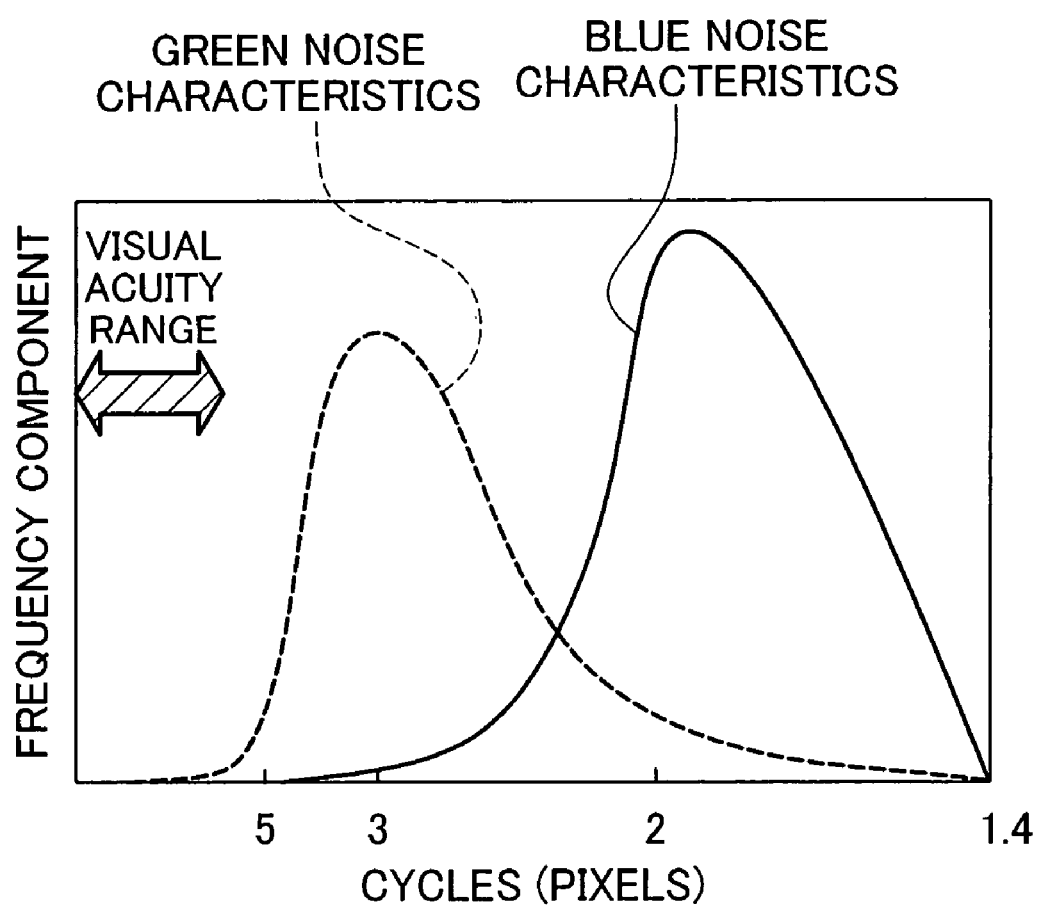
FIG. 8 is an illustration depicting conceptually exemplary spatial frequency characteristics of threshold values established at pixels in a blue noise dither matrix having blue noise characteristics.

FIG. 8 is an illustration depicting conceptually exemplary spatial frequency characteristics of threshold values established at pixels in a blue noise dither matrix having blue noise characteristics, by way of a simple example of adjustment of dither matrix. The spatial frequency characteristics of a blue noise dither matrix are characteristics such that the length of one cycle has the largest frequency component in a high frequency region of close to two pixels. These spatial frequency characteristics have been established in consideration of the characteristics of human visual perception. Specifically, a blue noise dither matrix is a dither matrix in which, in consideration of the fact that human visual acuity is low in the high frequency region, the storage locations of threshold values have been adjusted in such a way that the largest frequency component is produced in the high frequency region.

FIG. 8 also shows exemplary spatial frequency characteristics of a green noise matrix, indicated by the broken line curve. As illustrated in the drawing, the spatial frequency characteristics of a green noise dither matrix are characteristics such that the length of one cycle has the largest frequency component in an intermediate frequency region of from two to ten or so pixels. Since the threshold values of a green noise dither matrix are established so as to produce these sorts of spatial frequency characteristics, if dot on/off states of pixels are decided while looking up in a dither matrix having green noise characteristics, dots will be formed adjacently in units of several dots, while at the same time the clusters of dots will be formed in a dispersed pattern overall. For printers such as laser printers, with which it is difficult to consistently form fine dots of about one pixel, by means of deciding dot on/off states of pixels through lookup in such a green noise matrix it will be possible to suppress formation of "orphan" dots. As a result, it will be possible to output images of consistently high quality at high speed. In other words, a dither matrix adapted for lookup to decide dot on/off states in a laser printer or similar printer will contain threshold values adjusted so as to have green noise characteristics.

Figures 9A, 9B, 9C:
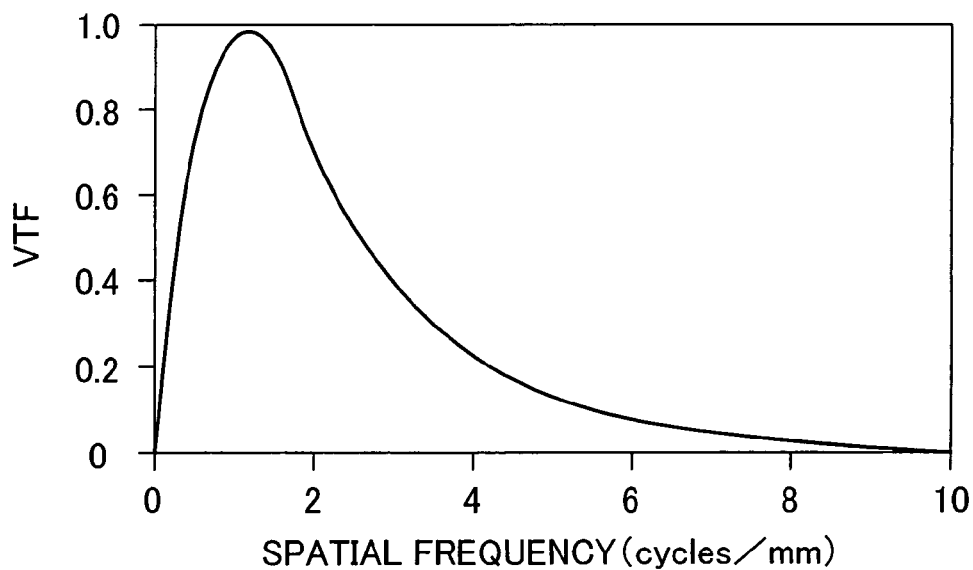
FIGS. 9A to 9C is a conceptual illustration of a visual spatial frequency characteristic VTF (Visual Transfer Function) representing acuity of the human visual faculty with respect to spatial frequency.

FIGS. 9A to 9C are conceptual illustrations of a visual spatial frequency characteristic VTF (Visual Transfer Function) representing human visual acuity with respect to spatial frequency. Through the use of a visual spatial frequency characteristic VTF it will be possible to quantify the perception of graininess of dots apparent to the human visual faculty following the halftone process, by means of modeling human visual acuity using a transfer function known as a visual spatial frequency characteristic VTF. A value quantified in this manner is referred to as a graininess index. FIG. 9B gives a typical experimental equation representing a visual spatial frequency characteristic VTF. In FIG. 9B the variable L represents observer distance, and the variable u represents spatial frequency. FIG. 9C gives an equation defining a graininess index. In FIG. 9C the coefficient K is a coefficient for matching derived values with human acuity.

Such quantification of graininess perception by the human visual faculty makes possible fine-tuned optimization of a dither matrix for the human visual system. Specifically, a Fourier transform can be performed on a dot pattern hypothesized when input tone values have been input to a dither matrix, to arrive at a power spectrum FS; and a graininess evaluation value that can be derived by integrating all input tone values after multiplying the power spectrum FS with the visual spatial frequency characteristic VTF (FIG. 9C) can be utilized as a evaluation coefficient for the dither matrix. In this example, the aim is to achieve optimization by adjusting threshold value storage locations to minimize the dither matrix evaluation coefficient.

C. Improving Dispersion of Dots Formed in Consecutive Main Scans:

C-1. Halftone Process in Embodiment 1 (Dither Matrix Generation Method)

The halftone process in Embodiment 1 is implemented through the use of a dither matrix M generated by the following method.

Figure 10:
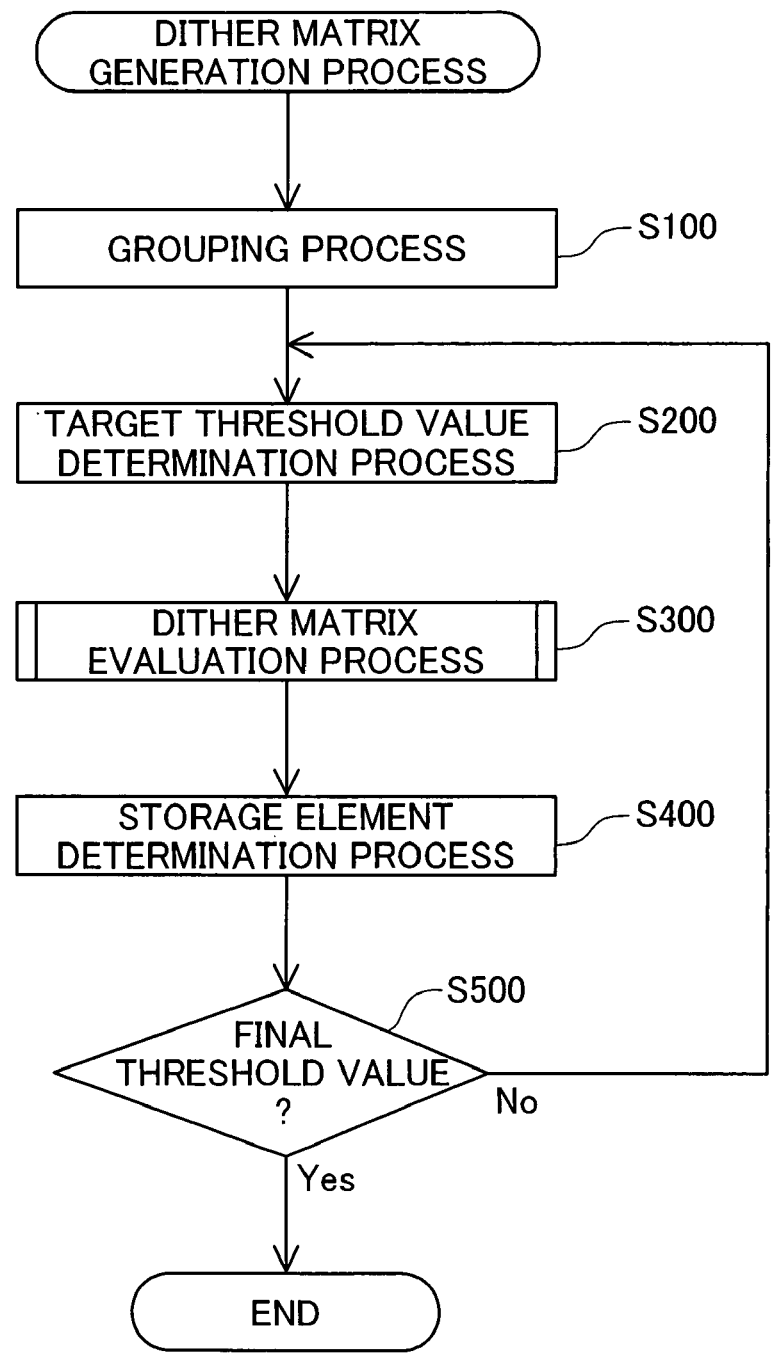
FIG. 10 is a flowchart showing the processing routine of the dither matrix generation method in Embodiment 1.

FIG. 10 is a flowchart showing the processing routine of the dither matrix generation method in Embodiment 1. The generation method of Embodiment 1 is constituted in such a way that optimization can be carried out with consideration to dispersion of dots formed in consecutive main scans (passes) in the process of forming a printed image. In this example, to facilitate description, generation of a small 8×8 matrix shall be described. The graininess index (FIG. 9C) is used as the evaluation value representing optimality of the dither matrix.

In Step S100, a grouping process is carried out. In the present embodiment, the grouping process is a process for dividing a dither matrix into individual elements corresponding to a plurality of pixel groups in which dots will be formed substantially at the same time during the process of producing a printed image (FIG. 4), as well as for synthesizing groups in which dots will be formed consecutively in time.

FIG. 11 is an illustration depicting a dither matrix M subjected to a grouping process in Embodiment 1. In this grouping process, the dither matrix is assumed to be divided into the four pixel groups shown in FIG. 4 The numeral appearing in each element of the dither matrix M indicates the pixel group to which the element belongs. For example, the element of Row 1/Column 1 belongs to a first pixel group (FIG. 4), while the element of Row 2/Column 1 belongs to a second pixel group.

FIG. 12 is an illustration depicting four divided matrices M1-M4 in Embodiment 1. The divided matrix M1 is composed of elements taken from among the elements in the dither matrix M, and which are elements that correspond to pixels belonging to the first pixel group, together with a plurality of blank elements which are blank. The blank elements are elements for which a dot will never be formed, regardless of input tone value. The divided matrices M2-M4 are composed respectively of such blank elements, and a plurality of elements from the dither matrix M and belonging to the second to fourth pixel groups;

Of the divided matrices M2-M4 generated in this way, those in which dots will be formed consecutively in time are synthesized together, and evaluation matrices M1_2, M2_3, M3_4, M4_1 (FIG. 13) corresponding individually to the first to fourth consecutive groups are generated.

FIG. 13 is an illustration depicting an example of evaluation matrices targeted for evaluation in Embodiment 1. In this drawing, the dot patterns formed in the first to fourth consecutive groups corresponding to the evaluation matrices are targeted for evaluation. The first consecutive pixel group is a pixel group synthesized from the first pixel group and the second pixel group consecutively formed in Pass 1 and Pass 2 respectively. The second consecutive pixel group is a pixel group similarly synthesized from the second pixel group and the third pixel group. The third consecutive pixel group is a pixel group synthesized from the third pixel group and the fourth pixel group. The fourth consecutive pixel group is a pixel group synthesized from the fourth pixel group and the first pixel group.

In Embodiment 1, synthesized dot patterns composed of dots patterns to be formed respectively by consecutive main scan passes are subjected to evaluation in the above manner, whereby it is possible to optimize a dither matrix with a focus on overall dispersion of dot patterns that will be formed by consecutive main scan passes, as shall be discussed later.

There are two principal reasons, discussed below, for carrying out optimization of the dither matrix in this way, with focus on overall dispersion of synthesized dot patterns. The first is that, as noted previously, physical phenomena of the ink such as ink agglomeration, irregular sheen, or bronzing may also occur in consecutive main scan passes (e.g. Pass 1 and Pass 2 in FIG. 4), and therefore improving dispersion of the dot patterns formed in both consecutive main scan passes will lead to better image quality. A second purpose is to reduce degradation of image quality caused by variability in the temporal interval of dot formation, caused by differences in position during main scanning (e.g. the main scan left edge A versus the main scan right edge B in FIG. 2).

This sort of variability in temporal interval can occur in the following manner. Consider a case where, for example, dots are formed during a main scan pass of the print head unit 60 (FIG. 2) in the forward direction, i.e. from the main scan left edge A towards the main scan right edge B; and subsequently dots are formed during a main scan pass of the print head unit 60 in the return direction, i.e. from the main scan right edge towards the B main scan left edge A. In this instance, during the forward direction main scan pass, after a dot has been formed at the main scan left edge A which is the starting point of a forward direction main scan pass by the print head unit 60, after about 0.5 second for example, a dot will be formed at the main scan right edge B which is the end point of the forward direction main scan pass. Next, when the return direction main scan pass commences after an interval of 0.1 second for example, after a dot has been formed at the main scan right edge B which is the starting point of the return direction main scan pass, a dot will be formed at the main scan left edge A which is the end point of the return direction main scan pass. In this case, the temporal interval of dot formation at the main scan left edge A is 1.1 second (=0.5 second+0.5 second+0.1 second). On the other hand, the temporal interval of dot formation at the main scan right edge B is 0.1 second.

In this way, whereas at the main scan left edge A dots are formed at 1.1-second intervals, at the main scan right edge B dots are formed at 0.1-second intervals, and consequently there will be variability in the extent to which physical phenomena of the ink occurs at the main scan left edge A versus the main scan right edge B. As mentioned previously, where physical phenomena of ink occurs uniformly throughout an entire printed image, such phenomena will not be readily noticeable as degraded image quality to the human visual faculty, and improvement through correction will be possible as well. However, variability (or irregularity) in the extent of physical phenomena of the ink will be markedly noticeable as degraded image quality to the human visual faculty. In the present embodiment, with the goal of reducing such variability, the dither matrix M optimized in such a way as to improve dispersion of the dot patterns formed in during consecutive main scan passes in both directions.

Once the grouping process of Step S100 h as been completed in this way, the process advances to Step S200.

In Step S200, a targeted threshold value determination process is carried out. The targeted threshold value determination process is a process for determining a threshold value targeted for determination of a storage element. In the present embodiment, threshold values are determined by selecting threshold values of relatively small value, i.e. in order from threshold values associated with greatest tendency for dot formation. Through selection in order from those threshold values associated with greatest tendency for dot formation in this way, the elements for storing them will be fixed in order starting with those threshold values that control dot placement in highlight areas where dot granularity tends to stand out, and accordingly there will be a high degree of freedom in design of highlight areas where dot granularity tends to stand out. In this example, it is assumed that eight threshold values have already been determined, and the ninth threshold value is being determined, as will be discussed later.

Figure 14:
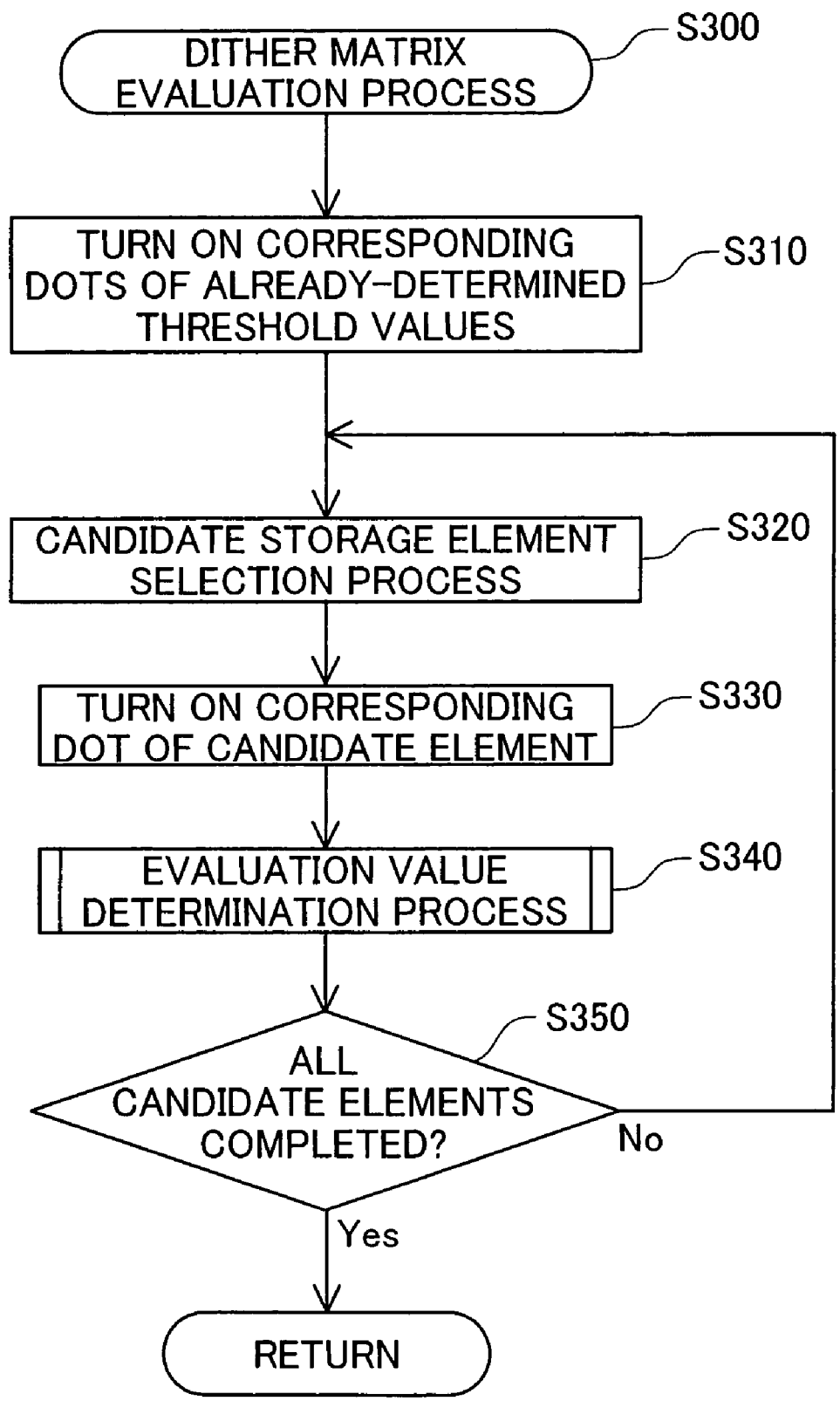
FIG. 14 is a flowchart showing the processing routine of a dither matrix evaluation process in Embodiment 1.

FIG. 14 is a flowchart showing the processing routine of the dither matrix evaluation process in Embodiment 1. In Step S310, dots corresponding to already-determined threshold values go ON. An already-determined threshold value means a threshold value for which a storage element has already been determined. As noted, since in the present embodiment the selection takes place in order starting from threshold values associated with greatest tendency for dot formation, when a dot is formed on a targeted threshold value, invariably, dots will have been formed on pixels corresponding to elements where already-determined threshold values are stored. Conversely, at the smallest input tone value at which a dot will form on the targeted threshold value, dots will not have formed on pixels corresponding to any elements other than those where already-determined threshold values are stored.

FIG. 15 is an illustration depicting dots formed on each of eight pixels corresponding to elements that store the threshold values associated with the first to eighth greatest tendency to dot formation in the dither matrix M. The dot pattern Dpa constituted in this way is used for determining the pixel on which the ninth dot should be formed. The * symbol denotes a candidate storage element.

In Step S320 (FIG. 14), a candidate storage element selection process is carried out. The candidate storage element selection process is a process for selecting candidate elements for storing threshold values, as candidate storage elements from among the elements of the divided matrix M1 selected as the evaluation matrix. In this example, the storage element of Row 1, Column 1 denoted by the * symbol has been selected as a candidate storage element.

Selection of the candidate storage elements may take place, for example, through selection in order of all storage elements except for the already-determined storage elements representing the eight storage elements already determined as storage elements for threshold values of the dither matrix M; alternatively, where elements that are not adjacent to already-determined storage elements are present, these may be selected preferentially.

In Step S330 (FIG. 14), it is assumed that the dot is ON in the selected candidate storage element. By so doing it becomes possible to evaluate the dither matrix M, with the threshold value associated with the ninth-greatest tendency for dot formation stored at the candidate storage element.

FIG. 16 is an illustration depicting a matrix that digitizes a condition in which a dot pattern Dpa has been formed, i.e., a dot density matrix Dda that represents dot density quantitatively. The numeral 0 means that a dot has not been formed, and the numeral 1 means that a dot has been formed (including instances where a dot is assumed to have been formed).

FIG. 17 is an illustration depicting four dot patterns Dp1_2, Dp2_3, Dp3_4, Dp4_1 formed on print pixels belonging respectively to first to fourth consecutive pixel groups, among elements storing the threshold values associated with the first to eighth greatest tendency to dot formation in a dither matrix M. In other words, the patterns represent patterns of dots to be formed on print pixels belonging respectively to the first to fourth consecutive pixel groups, extracted from the dot pattern Dpa (FIG. 15). In FIG. 17, as in the dot pattern Dpa (FIG. 15), the print pixel corresponding to the candidate storage element is indicated by the * symbol. FIG. 18 is an illustration depicting dot density matrices Dd1_2, Dd2_3, Dd3_4, Dd4_1 that correspond respectively to the four dot patterns Dp1_2, Dp2_3, Dp3_4, Dp4_1.

Once the five dot density matrices Dda, Dd1_2, Dd2_3, Dd3_4, and Dd4_1 have been determined in this way, the process advances to an evaluation value determination process (Step S340).

FIG. 19 is a flowchart showing the processing routine of the evaluation determination process in Embodiment 1. In Step S342, all pixels are evaluated and a graininess index is calculated. Specifically, calculation of the equation of FIG. 9C is performed on the basis of the dot density matrix Dda (FIG. 16). In Step S344, the first to fourth consecutive pixel groups are evaluated and granularity indices are calculated. Specifically, calculation of the equation of FIG. 9C is performed on the basis of the dot density matrices Dda, Dd1_2, Dd2_3, Dd3_4, and Dd4_1 respectively (FIG. 18).

In Step S348, a weighted addition process is carried out. The weighted addition process refers to a process of weighting the respective calculated granularity indices, as well as adding them.

FIG. 20 is an illustration depicting a computational equation for use in the weighted addition process in Embodiment 1. As will be apparent from the computational equation, an evaluation value E is determined as the sum of: the value of a weighting coefficient Wa (e.g. 4) multiplied by the graininess index Ga for all pixels (calculated in Step S342; and the value of a weighting coefficient Wg (e.g. 1) multiplied by the sum of the four granularity indices G1_2, G2_3, G3_4, G4_1 for the first to fourth consecutive pixel groups (calculated in Step S344).

This series of processes from the candidate storage element selection process (Step S320) to the evaluation value determination process (Step S340) (FIG. 14) is carried out for all of the candidate storage elements (Step S350). Once respective evaluation values have been determined for all candidate storage elements, the process advances to Step S400 (FIG. 10).

In Step S400, a storage element determination process is carried out. In the storage element determination process, candidate storage elements having the smallest evaluation values are determined as storage elements for targeted threshold values.

This process (Step S200 to Step S400) is repeated while modifying the threshold values, until reaching the last threshold value. The last threshold value can be the largest threshold value associated with the lowest tendency to dot formation, or the maximum value in a prescribed threshold value range specified in advance. This applies similarly to the threshold value initially targeted for evaluation as well.

In this way, in Embodiment 1 the dither matrix M is optimized so as to minimize the graininess index of a synthesized dot pattern composed of a plurality of dot patterns that are respectively formed in consecutive main scan passes, whereby it is possible to reduce degradation of image quality caused by physical phenomena of ink occurring among a plurality of dot patterns that are respectively formed in temporally consecutive main scan passes. Furthermore, in bidirectional printing, it is possible to appreciably reduce degradation of image quality caused by variability in the temporal interval of dot formation occurring due to differences in position during main scanning.

C-2. Halftone Process in Embodiment 2 (Dither Matrix Generation Method)

Figure 21:
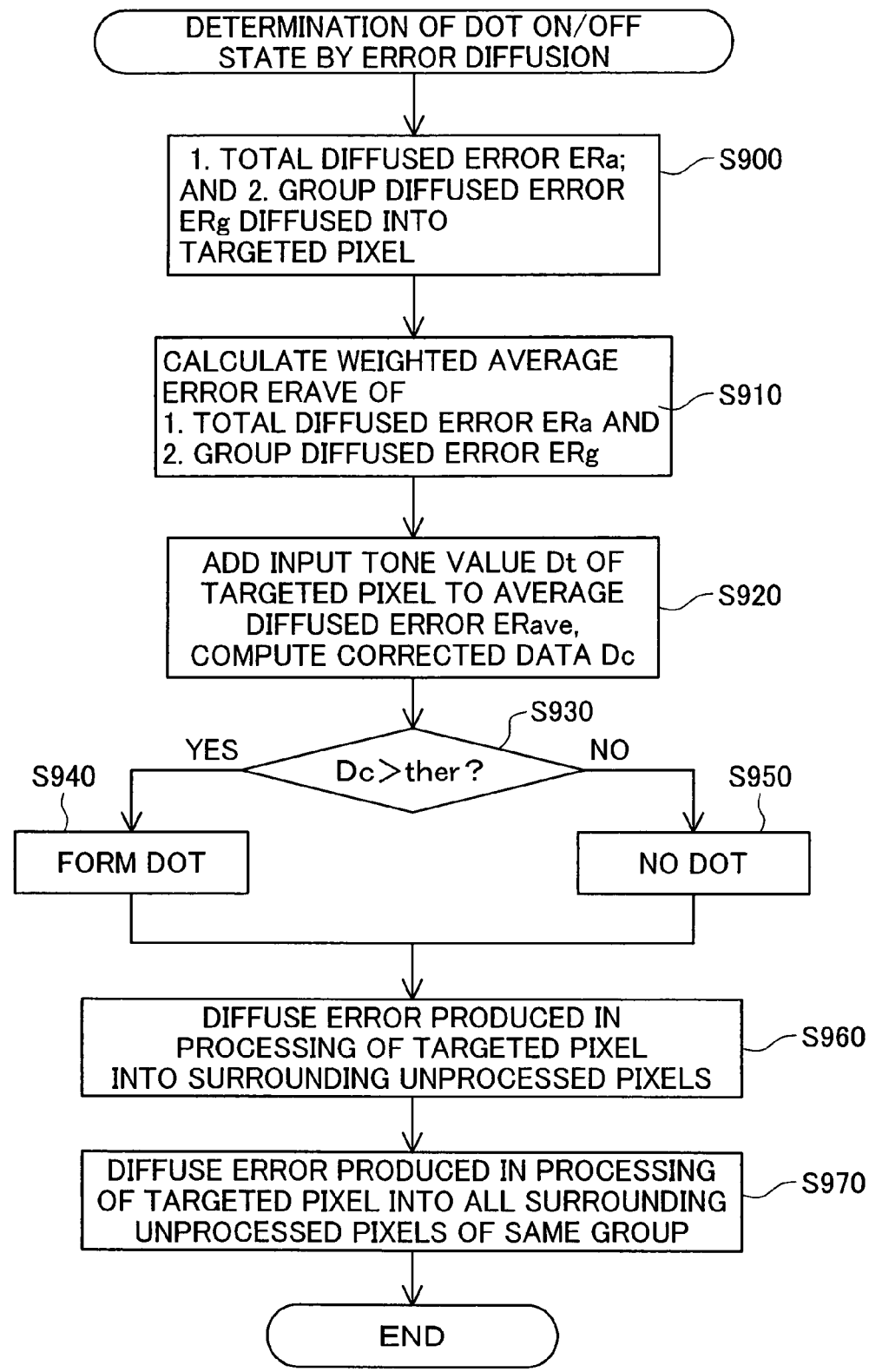
FIG. 21 is a flowchart of an error diffusion process in Embodiment 2.

FIG. 21 is a flowchart of an error diffusion process in Embodiment 2. In this embodiment, by means of carrying out a process of diffusing error separately into consecutive pixel groups in addition to normal error diffusion, it is possible, by means of the inherent characteristics of the error diffusion method, to impart acceptable levels of diffusion to dot patterns formed on print pixels that respectively belong to consecutive pixel groups as well. In the error diffusion method, the state of dot formation on all print pixels is determined by shifting in increments of one the target pixel which is the pixel currently targeted for the dot formation decision. A typical method of shifting involves, for example, shifting the target pixel in increments of one in the horizontal direction, and once processing of all of the pixels in the current main scan line has been completed, shifting the targeted pixel to the adjacent unprocessed main scan line.

In Step S900, diffused error that has been diffused into the targeted pixel from a plurality of other pixels which have already been processed is read in. In the present embodiment, diffused error includes global diffused error ERa and group diffused error ERg.

Figure 22:
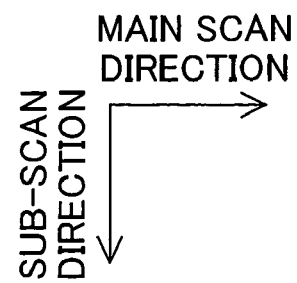
FIG. 22 is an illustration depicting a Jarvis, Judice & Ninke error diffusion matrix.

The global diffused error ERa is the error that has been diffused using the error diffusion global matrix Ma shown in FIG. 22. In the present embodiment, error is diffused using the commonly known Jarvis, Judice & Ninke error diffusion matrix. Such error diffusion is carried out as typical error diffusion. Like the error diffusion methods of the conventional art, such error diffusion makes it possible to impart acceptable dispersion to the final dot pattern, by way of an inherent characteristic of error diffusion methods.

In the present embodiment, however, a point of difference from conventional error diffusion methods is that group diffused error ERg is additionally diffused, for the purpose or imparting acceptable dispersion to dot groups formed on pixels formed in mutually consecutive main scan passes.

Figure 23:
FIG. 23 is an illustration depicting an error diffusion consecutive main scan group matrix Mg1 for the purpose of performing additional error diffusion into the pixel group to which the targeted pixel belongs.

FIG. 23 is an illustration depicting an error diffusion consecutive main scan group matrix Mg1 for the purpose of performing additional error diffusion into the pixel group to which the targeted pixel belongs. The error diffusion consecutive main scan group matrix Mg1 is constituted so that error is diffused exclusively into pixels formed in mutually consecutive main scan passes. This kind or error diffusion can be implemented easily by means of an configuration such that error is not diffused into pixels not formed in mutually consecutive main scan passes.

In the present embodiment, the following relationships can be utilized for implementing the error diffusion consecutive main scan group matrix Mg1.
(1) Dots are not formed consecutively to the first pixel group and the third pixel group.
(2) Dots are not formed consecutively to the second pixel group and the fourth pixel group.
(3) The positional relationship between the first pixel group and the third pixel group is identical to the positional relationship between the second pixel group and the fourth pixel group.

For example, in the event that the targeted pixel belongs to the first pixel group, the error diffusion consecutive main scan group matrix Mg1 will be constituted so that error is not diffused into pixels belonging to the third pixel group. Specifically, elements of pixel positions belonging to the third pixel group are made blank with respect to the first pixel group, and those elements are distributed to other pixels. In the event that the targeted pixel belongs to the third pixel group, since the target is the positional relationship between the first pixel group and the third pixel group, the error diffusion consecutive main scan group matrix Mg1 can be utilized as-is. Next, in the event that the targeted pixel belongs to the second pixel group, since the positional relationship between the second pixel group and the fourth pixel group is identical to the positional relationship between the first pixel group and the third pixel group, the error diffusion consecutive main scan group matrix Mg1 can be utilized as-is in this instance as well. Furthermore, in the event that the targeted pixel belongs to the fourth pixel group, since the target is the positional relationship between the second pixel group and the fourth pixel group, the error diffusion consecutive main scan group matrix Mg1 can be utilized as-is. In this way, it is possible for the error diffusion consecutive main scan group matrix Mg1 to be utilized regardless of which group the target pixel belongs to.

Thus, in the present embodiment, error may be diffused in such a way that prescribed characteristics are imparted to the final dot pattern by means of error diffusion with the error diffusion global matrix Ma, as well as imparting prescribed characteristics to dot patterns formed on pixels that are formed in mutually consecutive main scan passes, by means of error diffusion using the error diffusion consecutive main scan group matrix Mg1.

In Step S910, average diffused error ERave representing a weighted average of global diffused error ERa and group diffused error ERg is calculated. In the present embodiment, by way of example, global diffused error ERa and group diffused error ERg are assigned weights of "4" and "1" respectively. The average diffused error ERave is calculated by adding the value of global diffused error ERa multiplied by the weight "4" to the value of group diffused error ERg multiplied by the weight "1", and dividing the sum by the total sum of the weights "5."

In Step S920, an input tone value Dt and the average diffused error ERave are added, and corrected data Dc is computed.

In Step S930, the corrected data Dc computed in this way is compared against a preestablished threshold value Thre. If the result of this comparison is that the corrected data Dc is greater than the threshold value Thre, a determination to form a dot is made (Step S940). If on the other hand the corrected data Dc is smaller than the threshold value Thre, a determination to not form a dot is made (Step S950).

In Step S960, tone error is calculated, and the tone error is diffused into neighboring unprocessed pixels. Tone error is the difference between the tone value of the corrected data Dc and actual tone value produced by the determination of dot on/off state. For example, where the tone value of the corrected data Dc is "223," and the actual tone value produced by dot formation is 255, the tone error will be "−32" (=233−255). In this step (S960), error diffusion is carried out using the error diffusion global matrix Ma.

Specifically, for the pixel neighboring the targeted pixel to the right, a value of "−224/48" (=−32×7/48), equivalent to the error diffusion global matrix Ma coefficient "7/48" that corresponds to the right neighboring pixel, multiplied by the tone error of "−32" created by the targeted pixel, will be diffused. For the two pixels situated adjacently to the right of the targeted pixel, a value of "−160/48" (=−32×5/48), equivalent to the error diffusion global matrix Ma coefficient "5/48" that corresponds to the two adjacent right pixels, multiplied by the tone error of "−32" created by the targeted pixel, will be diffused. Like the error diffusion methods of the conventional art, such an error diffusion method imparts prescribed characteristics to the final dot pattern, by way of inherent characteristics of error diffusion methods.

In Step S970, in contrast with conventional error diffusion, additional error diffusion is carried out using the error diffusion consecutive main scan group matrix Mg1 (FIG. 23). As noted previously, this is done in order to impart acceptable dispersion to dot groups formed on pixels formed in mutually consecutive main scan passes.

Specifically, for the pixel neighboring the targeted pixel to the right, a value of "0" (=−32×0), equivalent to the error diffusion consecutive main scan group matrix Mg1 coefficient "0" that corresponds to the right neighboring pixel, multiplied by the tone error of "−32" created by the targeted pixel, will be diffused into the pixel Furthermore, a value of "−20/3" (=−32×5/24) equal to the error diffusion global matrix Ma coefficient "−5/24" that corresponds to the neighboring pixel below the targeted pixel, multiplied by the tone error of "−32" created by the targeted pixel, will be diffused.

In this way, with the error diffusion method of Embodiment 2, the objects of Embodiment 1 can be achieved through additional error diffusion from the targeted pixel into consecutive pixel groups.

Figure 24:
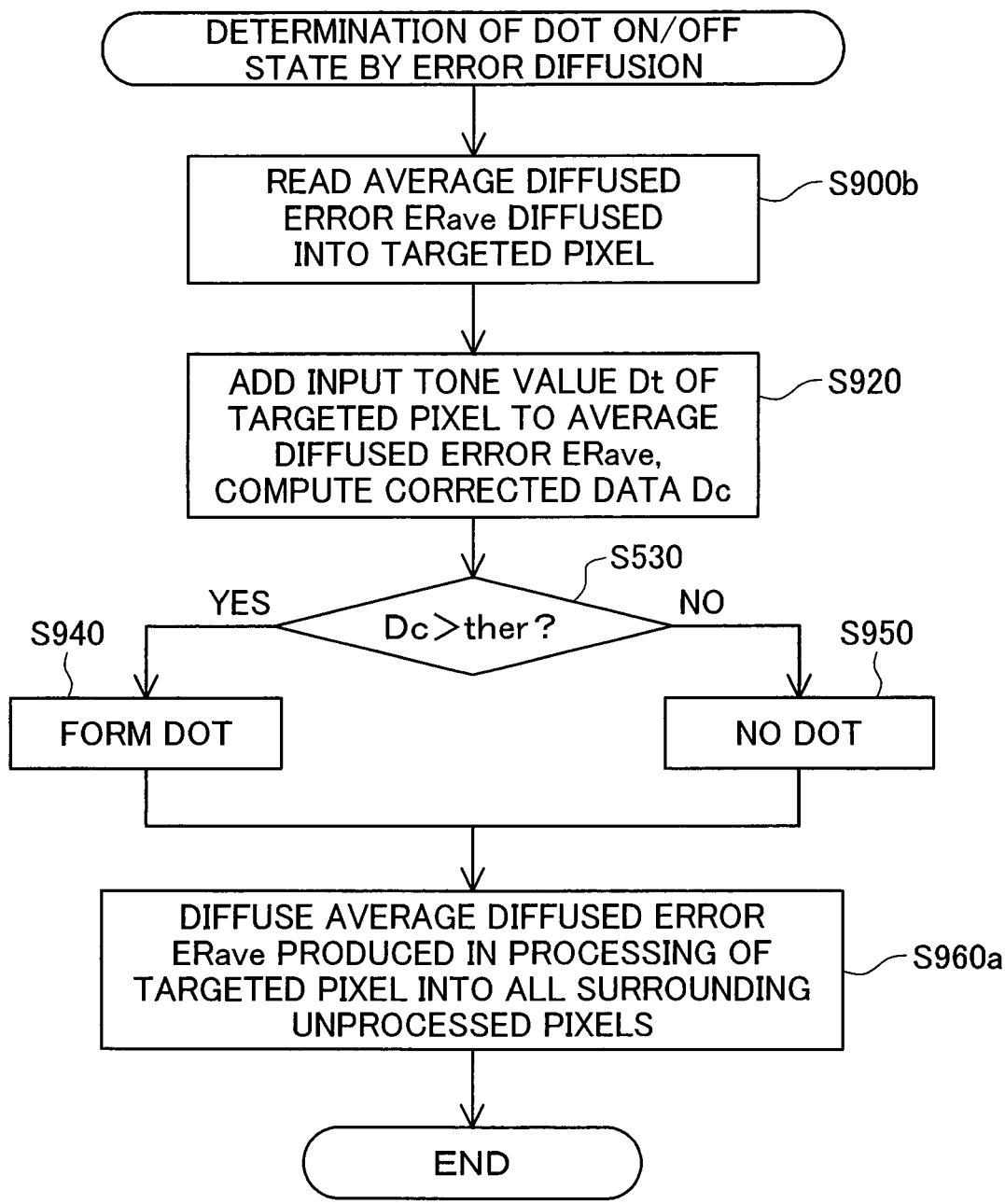
FIG. 24 is an illustration depicting a flowchart of a modification example of Embodiment 2.

FIG. 24 is an illustration depicting a flowchart of a modification example of Embodiment 2. The modification example differs from Embodiment 2 in that Step S900*b* replaces Step S900, and the other two steps S910, S970 are eliminated. In comparison with convention error diffusion, only the error diffusion matrix used for error diffusion differs. In the modification example, Embodiment 2 is extended utilizing the linearity of diffused error, and thus the specifics of the process are mathematically equivalent to Embodiment 2.

In Step S900*b*, average diffused error ERave that has been diffused using an error diffusion synthesized matrix Mg3 is read in. The average diffused error ERave is a value identical to that calculated in Step S910*a* of Embodiment 2. The error diffusion synthesized matrix Mg3 is an error diffusion matrix constituted by synthesis, with prescribed weights, of the error diffusion global matrix Ma and the error diffusion consecutive main scan group matrix Mg1. The prescribed weights are "4" to "1."

The error diffusion synthesized matrix Mg3 (FIG. 25) is a matrix derived by simple addition of the denominators and numerators of the coefficients of the error diffusion global matrix Ma and the weight-adjusted error diffusion consecutive main scan group matrix Mg1*a*. The weight-adjusted error diffusion consecutive main scan group matrix Mg1*a* has been derived by multiplying 1.5 by the denominators and numerators of the coefficients of the error diffusion consecutive main scan group matrix Mg1, in order to make this addition operation possible. Thus, the sum total of the numerators of the error diffusion global matrix Ma equals 48, and the sum total of the numerators of the weight-adjusted error diffusion consecutive main scan group matrix Mg1*a* equals 12, so the ratio of the numerators of the error diffusion global matrix Ma and the error diffusion consecutive main scan group matrix Mg1*a* is "4" to "1." Meanwhile, by making the denominator of the coefficients 60 (=48+12), the sum total of the diffused error coefficients can be made to equal "1." In the error diffusion synthesized matrix Mg3, the denominator is 120 in order to make the numerator an integer.

In the modification example, the invention can be implemented in a processing sequence identical to conventional error diffusion simply by replacing the error diffusion matrix, and multiple diffusion processes can be carried out all at once, which affords the advantage of lower processing overhead.

D. Improving Dispersion of Multiple-color Dots Formed in Same-main Scan

D-1. Halftone Process in Embodiment 3 (Dither Matrix Generation Method):

The halftone process in Embodiment 3 is implemented through the use of a dither matrix M generated by the following method.

Figure 26:
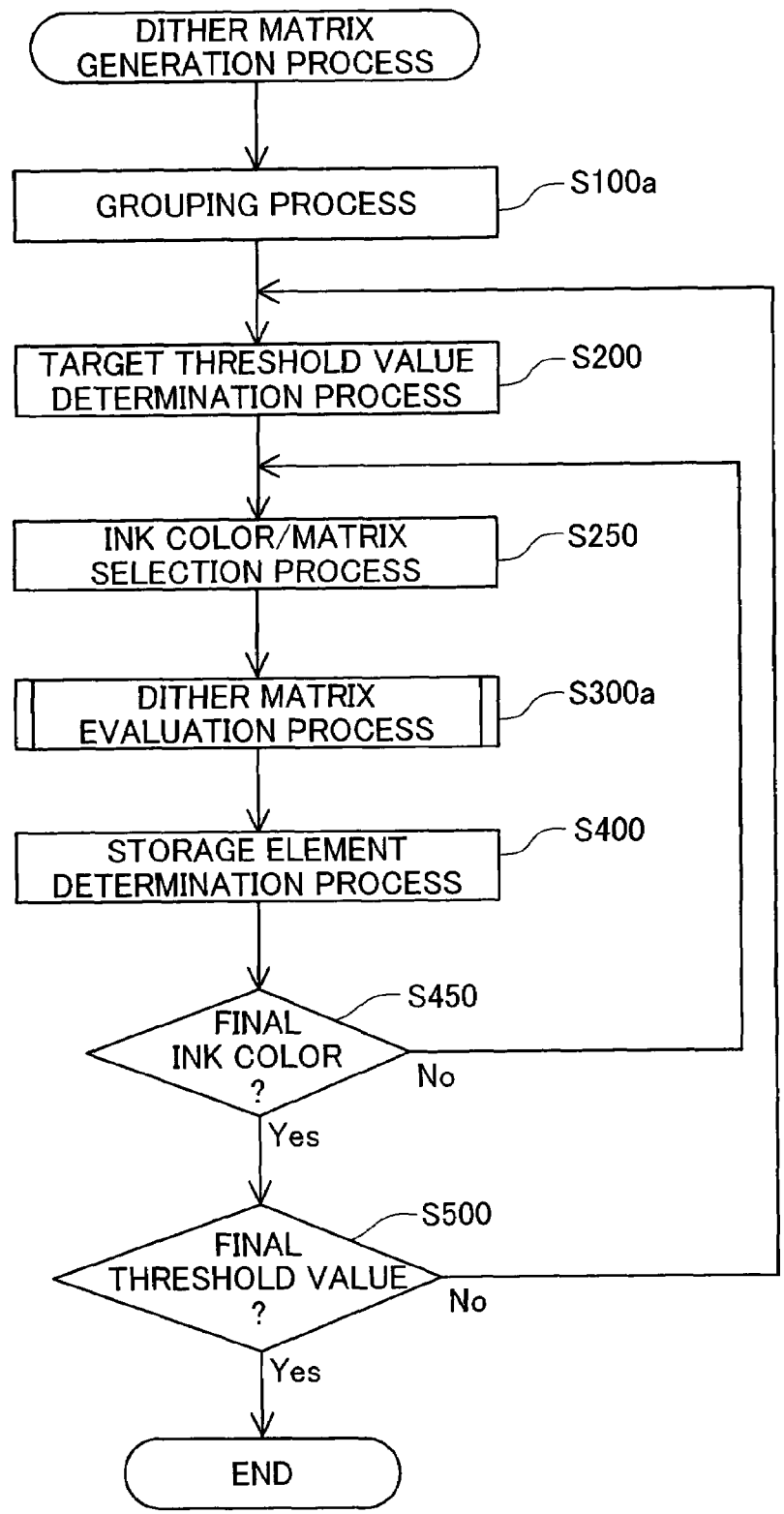
FIG. 26 is a flowchart showing the processing routine of a dither matrix generation method in Embodiment 3.

FIG. 26 is a flowchart showing the processing routine of a dither matrix generation method in Embodiment 3. This embodiment differs from the dither matrix generation method of Embodiment 1 in that the grouping process (Step S100) and the dither matrix evaluation process (Step S300*a*) are modified to Step S100*a* and Step S300*a* respectively; and in that there is an additional ink color/matrix selection process and a process for repetition thereof (Steps S250, S450).

The grouping process (Step S100*a*) of the present embodiment differs from Embodiment 1 in that it is a process that merely divides the dither matrix M into individual pixels corresponding to a plurality of pixel groups in which dots are formed substantially simultaneously in the process of forming a printed image (FIG. 4).

Figure 27:
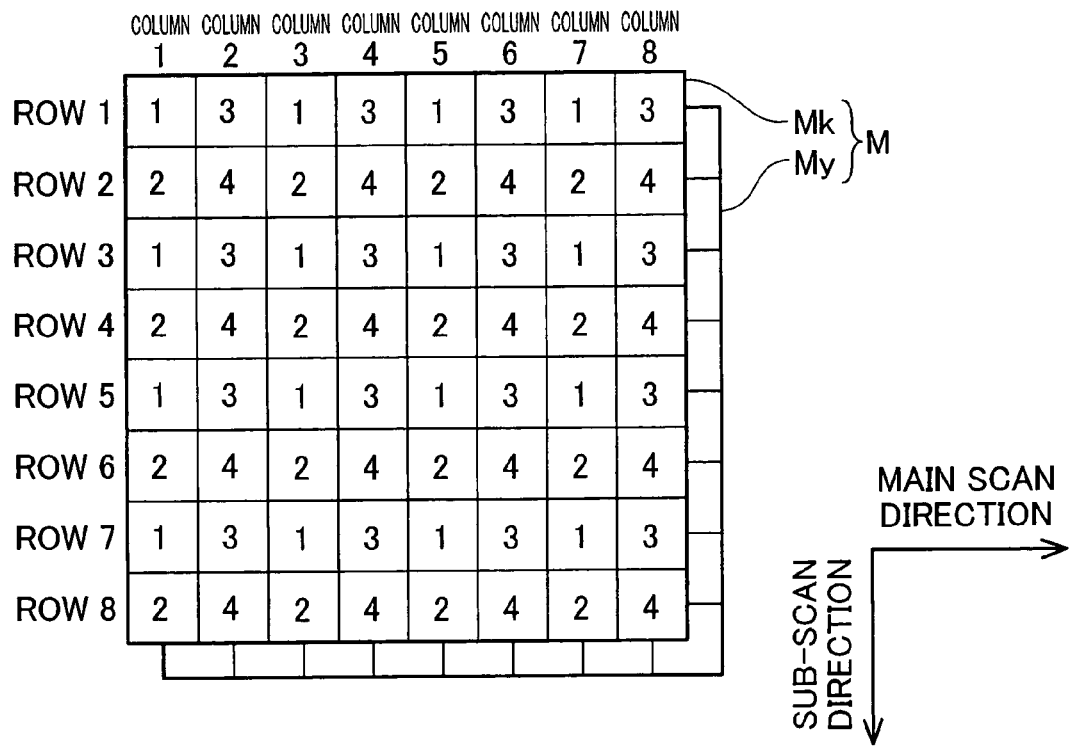
FIG. 27 is an illustration depicting a dither matrix M subjected to a grouping process in Embodiment 3.

FIG. 27 is an illustration depicting the dither matrix M subjected to a grouping process in Embodiment 3. In this grouping process, the matrix is divided into the four pixel groups in FIG. 4. The numerals appearing in each element of the dither matrix M indicate the pixel groups to which the elements belong. For example, the element of Row 1, Column 1 belongs to the first pixel group (FIG. 4), and the element of Row 2, Column 1 belongs to the second pixel group; this aspect is the same as Embodiment 1. The dither matrix M is composed of a yellow matrix My constituting a dither matrix for use with yellow ink, and a black matrix Mk constituting a dither matrix for use with black ink.

Figure 28:
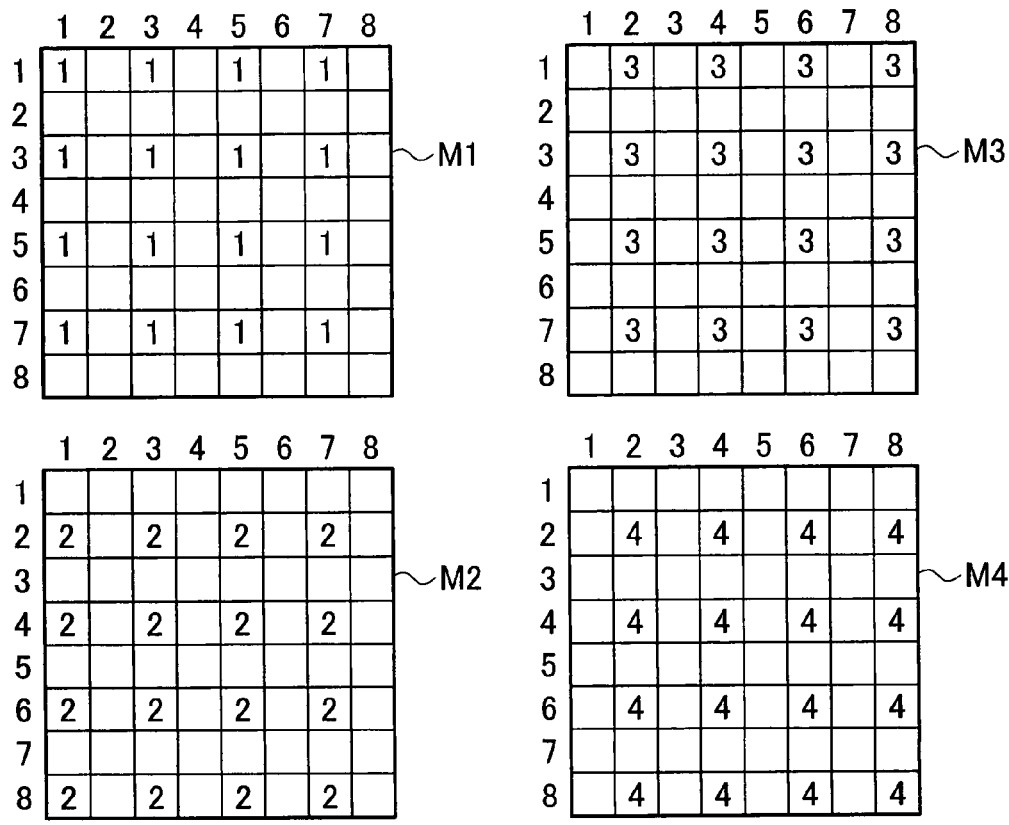
FIG. 28 is an illustration depicting four divided matrices M1-M4 in Embodiment 3.

FIG. 28 is an illustration depicting four divided matrices M1-M4 in Embodiment 3. As in Embodiment 1, the divided matrix M1 is composed of a plurality of elements from the dither matrix M and corresponding to the pixels belonging to the first pixel group, together with a plurality of blank elements which are blank. The blank elements are elements for which a dot will never be formed, regardless of input tone value. The divided matrices M2-M4 are composed respectively of such blank elements, and a plurality of elements from the dither matrix M and belonging to the second to fourth pixel groups.

The ink color/matrix selection process (Step S250) is a process for selecting ink color, and a dither matrix corresponding to this ink color. In this example, in order to make the description easier to understand, printing will be assumed to be carried out with black ink and yellow ink, as mentioned previously. Here, it is assumed that black ink and the dither matrix corresponding to black ink have been selected.

FIG. 29 is an illustration depicting an exemplary dot pattern targeted for evaluation in Embodiment 3. The drawing shows three dot patterns that would be targeted for evaluation in the event that a first pixel group corresponding to the divided matrix M1, black ink, and the black ink matrix have been selected. The first dot pattern is a global pixel black pattern Dpak made up of all of the black dots. The second dot pattern is a first pixel group mixed color pattern Dp0ky composed of black dots formed on print pixels belonging to the first pixel group, and yellow dots formed on print pixels belonging to the first pixel group. The third dot pattern is a first pixel group black pattern Dp0k composed of black dots formed on print pixels belonging to the first pixel group.

The dither matrix evaluation process (Step S300*a*) of Embodiment 3 differs from that of Embodiment 1 in that the dither matrix is evaluated while focusing on the graininess index of a dot pattern composed of dots of multiple colors, in order to optimize the matrix in consideration of dispersion of dots of multiple colors formed simultaneously in the course of forming the printed image. Accordingly, Step S330 and Step S340 have been modified to Step S330*a* and Step S340*a* respectively.

Figure 30:
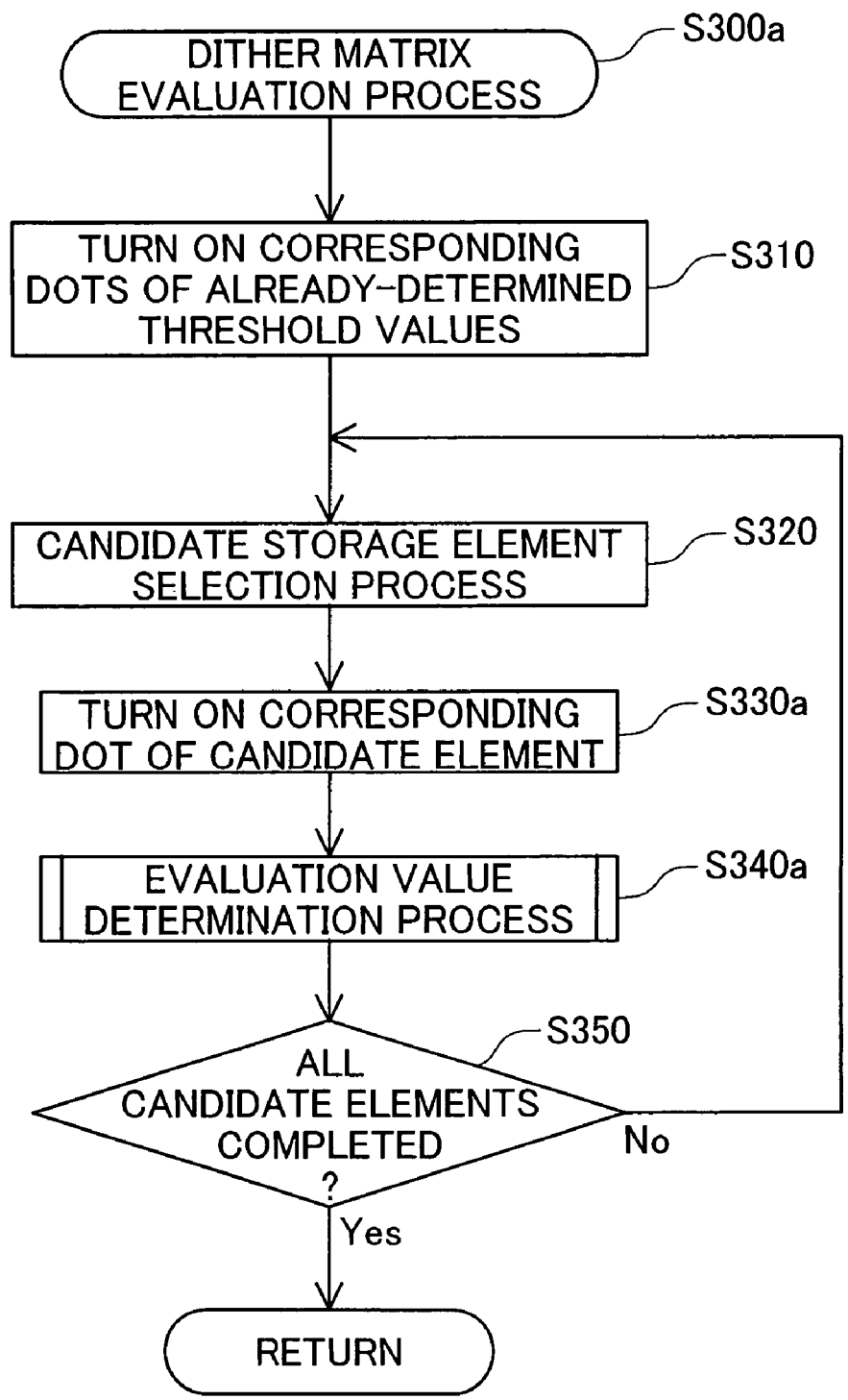
FIG. 30 is a flowchart showing the processing routine of a dither matrix evaluation process in Embodiment 3.

FIG. 30 is a flowchart showing the processing routine of a dither matrix evaluation process in Embodiment 3. In Step S310, dots corresponding to already-determined threshold values go ON, in the same manner as Embodiment 1.

FIG. 31 is an illustration depicting dots formed on each of eight pixels that correspond to elements storing threshold values associated with the first to eighth greatest tendency to dot formation in the black matrix. The dot pattern Dpak constituted in this way is used for determining which pixel the ninth dot should be formed on.

FIG. 32 is an illustration depicting a matrix constituting a digitized representation formation of the dot pattern Dpak, i.e., a dot density matrix Ddak that represents dot density quantitatively. The numeral 0 means that a dot has not been formed, and the numeral 1 means that a dot has been formed.

FIG. 33 and FIG. 34 are illustrations depicting a dot pattern Dp0ky, and a corresponding dot density matrix Dd0ky. The dot pattern Dp0ky is composed of black dots and yellow dots. The black dots are dots formed respectively on print pixels that correspond to the divided matrix M1, from among the eight print pixels that correspond to elements storing threshold values associated with the first to eighth greatest tendency to dot formation in the black matrix. The yellow dots are dots formed respectively on print pixels that correspond to the divided matrix M1, from among the eight print pixels that correspond to elements storing threshold values associated with the first to eighth greatest tendency to dot formation in the yellow matrix.

FIG. 35 and FIG. 36 are illustrations depicting a dot pattern Dp0k, and a corresponding dot density matrix Dd0k. The dot pattern Dp0k consists of dots formed respectively on print pixels that correspond to the divided matrix M1, from among the eight print pixels that correspond to elements storing threshold values associated with the first to eighth greatest tendency to dot formation in the black matrix.

In Step S320 (FIG. 28), a candidate storage element selection process is carried out in the same manner as in Embodiment 1. The candidate storage element selection process is a process for selecting candidate elements for storing threshold values, as candidate storage elements from among the elements of the divided matrix M1 selected as the evaluation matrix.

FIG. 37 is an illustration depicting selection of a candidate storage element from among elements in a divided matrix M1. FIG. 37 shows three patterns Dpak1, Dp0ky1, Dp0k1 that depict the selected candidate storage element for three dot patterns Dpak, Dp0ky, Dp0k targeted for evaluation. In this example, the storage element of Row 1, Column 3 dented by the * symbol has been selected as the candidate storage element.

Selection of the candidate storage element may also take place, for example, through selection in order from all other storage elements, excluding the already-determined storage elements for threshold values of the black matrix, namely, the storage elements of Row 1, Column 5 and Row 5, Column 3 constituting the already-determined elements; and the already-determined storage elements for threshold values of the yellow matrix, namely, the storage elements of Row 3, Column 3 and Row 7, Column 7 constituting the already-determined elements.

In Step S330 (FIG. 30), it is assumed that the dot is ON in the selected candidate storage element, as in Embodiment 1. By so doing it is possible to perform an evaluation of the black matrix Mk when the threshold value associated with the ninth greatest tendency to dot formation is stored in the candidate storage element.

FIG. 38 is an illustration depicting three dot density matrices Ddak1, Dd0ky1, Dd0k1 that represent digitally a dot formed on a pixel (Row 1 Column 3) corresponding to a candidate storage element. In these dot density matrices Ddak1, Dd0ky1, Dd0k1, the numeral 0 in an element means that a dot has not been formed, and the numeral 1 means that a dot has been formed.

In Step S340a (FIG. 30), an evaluation value determination process is carried out. The evaluation value determination process of Embodiment 3 differs from that of Embodiment 1, in that the first to fourth pixel groups (FIG. 4) are evaluated, and dots of multiple colors are evaluated.

FIG. 39 is a flowchart showing the processing routine of the evaluation value determination process in Embodiment 3. The evaluation value determination process of Embodiment 3 differs from the evaluation value determination process of Embodiment 1 in that Steps S342 and S348 (FIG. 19) of the evaluation value determination process of Embodiment 1 have been modified respectively to Steps S342a and S348a; and a graininess index calculation process for consecutive pixel groups (Step S344) replaces the two steps S345, S346.

In Step S342a, all pixels are evaluated and a graininess index is calculated for the black dots. Specifically, the calculation is made with the equation of FIG. 9C, on the basis of the dot density matrix Ddak1 (FIG. 38). In Step S345, the first consecutive pixel group is evaluated and a graininess index is calculated for the black dots and the yellow dots. Specifically, the calculation is made in the same way, on the basis of the dot density matrix Dd0ky1. In Step S346, the first consecutive pixel group is evaluated and a graininess index is calculated for the black dots. Specifically, the calculation is made in the same way, on the basis of the dot density matrix Dd0k1.

In the weighted addition process (Step S348a) of Embodiment 3, a weighted addition process is carried out in accordance with evaluation value computational equation 1 of FIG. 40, as an example. As will be apparent from this computational equation, an evaluation value Ek is determined as the sum of: the value of a weighting coefficient Wak (e.g. 4) multiplied by the graininess index Gak for all pixels; the value of a weighting coefficient Wg1 (e.g. 1) multiplied the graininess index Gk for the black dots of the first to fourth pixel groups; and the value of a weighting coefficient Wg2 (e.g. 2) multiplied the graininess index Gky for the black dots and the yellow dots of the first to fourth pixel groups. The equations given in Eq. 2 to Eq. 5 will be discussed later.

In this way, in Embodiment 3, candidate storage elements are selected on the basis of the state of dot formation of both black dots and yellow dots, and the black matrix and yellow matrix are established in such a way as to minimize the graininess index. It is therefore possible to make contact of black dots and yellow dots unlikely, as well as to improve dispersion of dot patterns containing these dots in combination. Furthermore, the Embodiments can reduce degradation of image quality due to bleed, which has the advantage of making it possible to use inks that could not be used conventionally, due to bleed.

Moreover, in the present embodiment, black dots and yellow dots were taken by way of example in the description, but it would also be possible to generated three or more dither matrices for three or more colors, for example; or to implement the Embodiment only for ink colors that tend to bleed easily. Furthermore, it would be acceptable to divide dots of multiple of colors (e.g. five colors or seven colors) into a plurality of groups, and generate a dither matrix for each.

For example, when focusing upon the three colors of black, magenta, and yellow for example, it would be possible to use Eq. 2 to Eq. 5 (FIG. 40) for example. Eq. 2 is an evaluation value computational equation that recognizes graininess with color mixing of black dots and magenta dots, in addition to the evaluation value of Eq. 1. Eq. 3 is an evaluation value computational equation that further recognizes graininess with color mixing of yellow dots and magenta dots, in addition to the evaluation value of Eq. 2. Eq. 4 is an evaluation value computational equation that further recognizes graininess with color mixing of black dots and yellow dots, graininess with color mixing of yellow dots and magenta dots, and graininess with color mixing of yellow dots and magenta dots, with respectively different weights, and that makes possible optimization with emphasis on specific color mixing. Eq. 5 can simultaneously improve graininess with two-color mixing, i.e. of black dots with yellow dots or magenta dots with yellow dots, and has the advantage that similar effects can be achieved with fewer calculations than with Eq. 3. Expansion from three colors to four or more colors (e.g. black, cyan, yellow, magenta) is possible as well.

FIG. 41 is a flowchart showing the processing routine of a dither matrix evaluation process in a modification example of Embodiment 3. This embodiment differs from the evaluation value determination process of Embodiment 3 in that Step 347 is added to the processing routine of the evaluation value determination process (Step S340a), and the weighted addition process (Step S348a) is modified to Step S348b.

In Step S347, a graininess index of overlapping dots formed by overlap of black dots and yellow dots is calculated for each of the pixel groups corresponding to the divided matrices M1-M4. Overlapping dots will inevitably occur where dot formation rates of black dots and yellow dots exceed 50%. However, the inventors, recognizing that if the occurrence of such dots is dispersed uniformly, degraded image quality will not take the form of low frequency irregularity and not be easily noticeable to the human visual faculty, arrived at the idea of targeting such mixed color dot patterns (not shown) for evaluation with dither matrices.

In a similar manner to Embodiment 3, in Step S348b there is performed an additional calculation of multiplying a prescribed weight Wg3 by a graininess index Gky' of mixed dot patterns composed of overlapping dots as shown in FIG. 42. The dispersion of mixed dot patterns can be improved thereby as well, so degradation of image quality caused by the use of multiple color inks can be effectively reduceed.

Moreover, in this modification example, dot density matrix generation can be implemented by assigning the number 2 or a value (e.g. 1.5) multiplied by an appropriate weight (e.g. 0.75), for the value of elements associated with formation of both dots. It is also acceptable to improve dispersion of overlapping dots by recognizing overlapping dots exclusively. That is, it is acceptable to establish the weight Wg3 at "1" and all other weights at "0."

Generation Method)

D-2. Halftone Process in Embodiment 4 (Dither Matrix Generation Method):

The halftone process in Embodiment 4 is implemented through the use of a dither matrix M generated by the following method.

Figure 43:
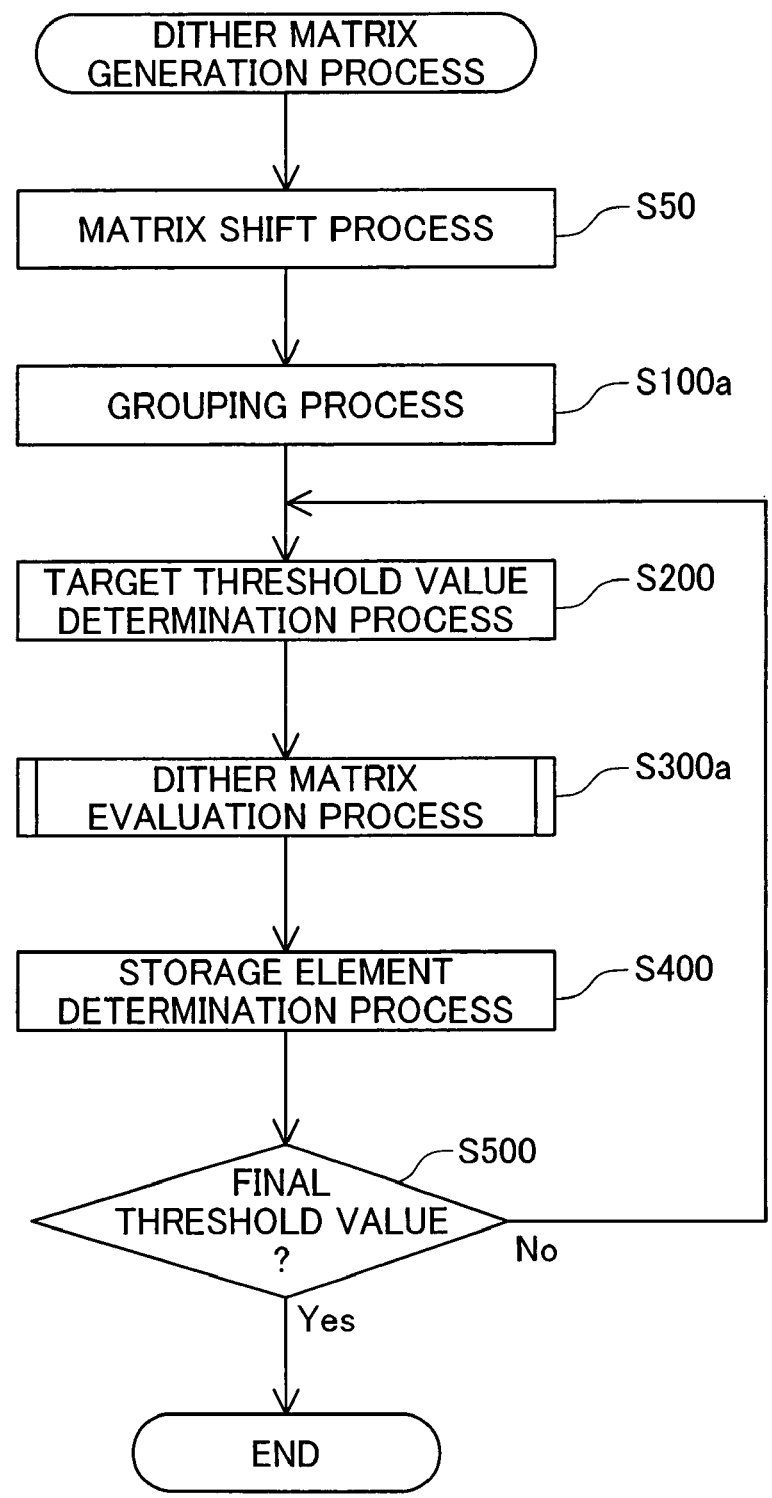
FIG. 43 is a flowchart showing the processing routine of a dither matrix generation process in Embodiment 4.

FIG. 43 is a flowchart showing the processing routine of a dither matrix generation process in Embodiment 4. This embodiment differs from the dither matrix generation process of Embodiment 3 (FIG. 26) in that a matrix shift process (Step S50) has been added to, and the ink color/matrix selection process (Steps S250, S450) have been eliminated from, the dither matrix generation process. Embodiment 4 differs from the other embodiments discussed previously in that a single shared dither matrix is shifted and use to determine the on/off states of both black dots and yellow dots (halftone process).

FIG. 44 is an illustration depicting the specifics of the matrix shift process in Embodiment 4. The matrix shift process is a process for shifting and positioning a dither matrix in a condition identical to the condition used in the halftone process described earlier. With the method of Embodiment 4, a single shared dither matrix Mc is generated for us in halftone processing of black dots and yellow dots. When the shared dither matrix Mc is positioned at a prescribed location, it is used as a dither matrix Mc1 for determining the state of black dot formation. Meanwhile, when the shared dither matrix Mc is shifted by a prescribed amount from the prescribed location, it is used as a dither matrix Mc2 for determining the state of yellow dot formation.

To facilitate description, in the present embodiment this shift process is carried out so that the divided matrices M1-M4 coincide with one another. In the example shown in the drawing, the matrix is shifted by Sx (6 pixels) in the main scan direction and by Sy (6 pixels) in the sub-scan direction. However, it is not necessary for the amounts of shift in the main scan direction and the sub-scan direction to coincide, and shifting may take place in one or the other direction exclusively. Furthermore, shifting is not limited to translational movement, and may include rotational movement as well. Where shifting takes place in a manner such that the divided matrices M1-M4 coincide with one another, a resultant advantage is lower processing load for the dither matrix generation process.

In Embodiment 4, since a single shared dither matrix Mc is used for halftone processing of black dots and yellow dots, the ink color/matrix selection process (Steps S250, S450) is rendered unnecessary. For example, assuming that the rows and columns in FIG. 44 indicate pixel positions, the threshold value used for black dot halftone processing at the pixel position of Row 1, Column 1 will also be used for yellow dot halftone processing at a pixel position shifted by 6 pixels in both the main scan direction and the sub-scan direction, i.e. the pixel position of Row 7, Column 7. In other words, the threshold value in the uppermost column/leftmost row of the shared dither matrix Mc will be used for black dot halftone processing at the pixel position of Row 1, Column 1, as well as for yellow dot halftone processing at the pixel position of Row 7, Column 7.

FIGS. 45 and 46 are illustrations depicting an evaluation dot pattern Dp0kys1 and a corresponding dot density matrix Dd0kys1 in Embodiment 4. The evaluation dot pattern Dp0kys1 and dot density matrix Dd0kys1 in Embodiment 4 correspond respectively to the evaluation dot pattern Dp0ky1 (FIG. 37) and the dot density matrix Dd0ky1 (FIG. 38) in Embodiment 3. In the example of FIGS. 45 and 46, of the elements belonging to the divided dither matrix M1 of the shared dither matrix Mc, threshold values stored at the element of Row 1, Column 5 and the element of Row 5, Column 3 have already been determined. Therefore, black dots have been formed on pixels corresponding to the element of Row 1, Column 5 and the element of Row 5, Column 3; and yellow dots have been formed on pixels corresponding to the element of Row 7, Column 3 and the element of Row 3, Column 1, shifted by six pixels in the main scan direction and the sub-scan direction respectively from the element of Row 1, Column 5 and the element of Row 5, Column 3.

Furthermore, in FIGS. 45 and 46, the element of Row 1, Column 1 has been selected as the candidate storage element (see the * symbol), and therefore in the dot density matrix Dd0kys1, the numeral 1, signifying that a dot is formed, is stored both at the element of Row 1, Column 1, and at the element of Row 7, Column 7 shifted by six pixels in the main scan direction and the sub-scan direction respectively from this element. In this way, on/off states of both black dots and yellow dots are determined on the basis of determination of the storage element for a single threshold value, whereby it is possible to simultaneously determine storage locations of a threshold value for determining on/off states of black dots and yellow dots, without the need to carry out the ink color/matrix selection process (Step S250).

In this way, in Embodiment 4, there is postulated a halftone process by means of shifting and positioning a single shared dither matrix Mc; and a method affording good overall dispersion of dots of multiple colors in this postulated halftone process is achieved. The shared dither matrix Mc generated in this manner has the advantage of reducing the number of dither matrices used for the halftone process, decreasing the processing load in the printing system and reducing the load on hardware resources. An additional advantage of the dither matrix generation method of Embodiment 4 is that processing related to the color/matrix selection process (Step S250) is curtailed, thus decreasing the load imposed by the dither matrix generation process.

Figure 47:
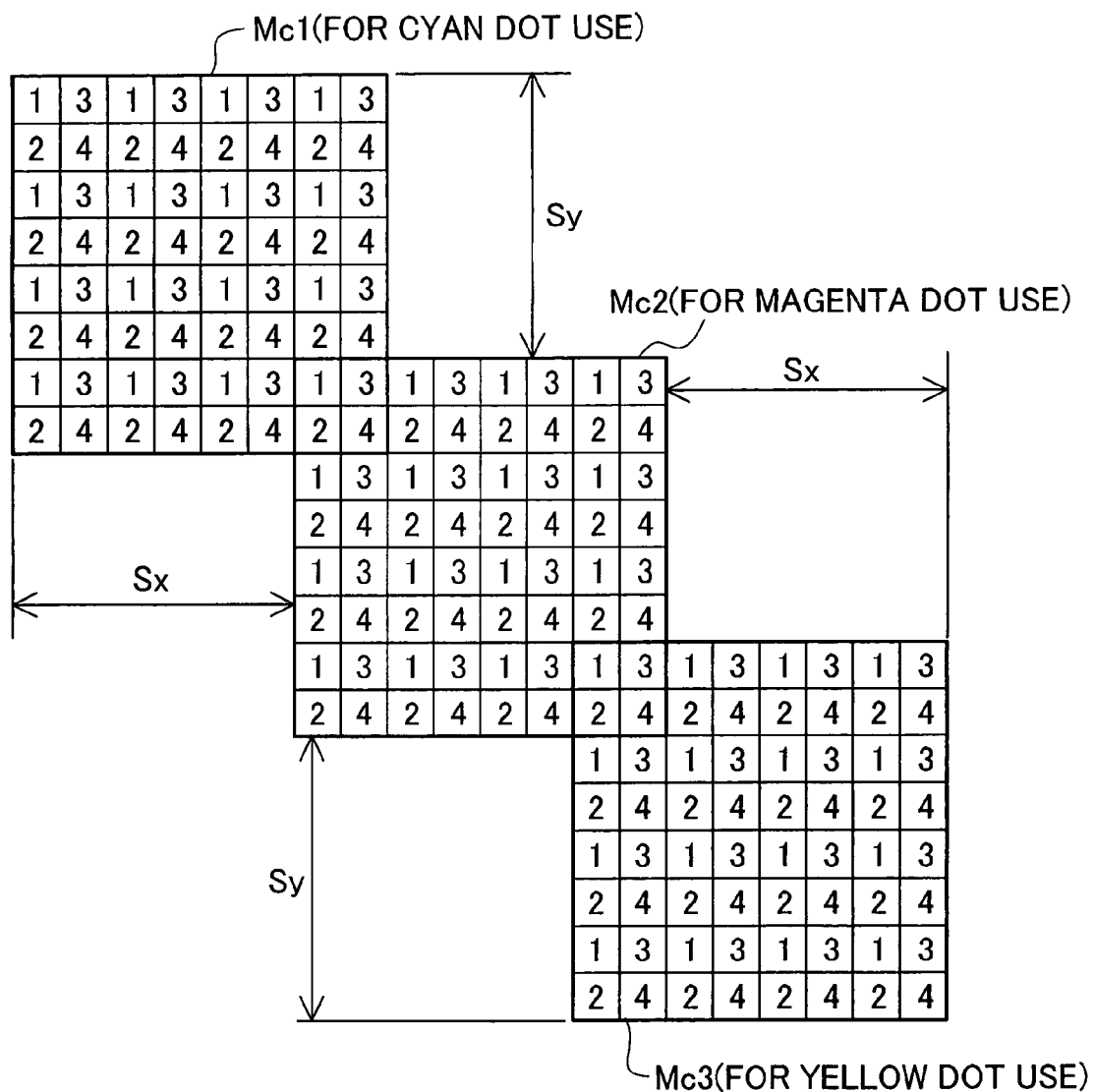
FIG. 47 is an illustration depicting another method of use of a single shared dither matrix Mc generated by the generation process of Embodiment 4.

FIG. 47 is an illustration depicting another method of use of the single shared dither matrix Mc generated by the generation process of Embodiment 4. In this example of use, halftone processes are carried out for cyan dots, magenta dots, and yellow dots. In Embodiment 4, a dither matrix Mc1— established by positioning the shared dither matrix Mc at a prescribed location—is used to determine the state of cyan dot formation; a dither matrix Mc2—established by positioning the shared dither matrix Mc at a location shifted by six pixels in the main scan direction and the sub-scan direction respectively from a prescribed location—is used to determine the state of magenta dot formation; and a dither matrix Mc3— established by positioning the shared dither matrix Mc at a location shifted by six pixels in the main scan direction and the sub-scan direction respectively from a prescribed location—is used to determine the state of yellow dot formation.

In this example, optimal color mixing between dots whose on/off states are determined by the dither matrix Mc1 and dots whose on/off states are determined by the dither matrix Mc2, as well as optimal color mixing between dots whose on/off states are determined by the dither matrix Mc2 and dots whose on/off states are determined by the dither matrix Mc3, are assured. Specifically, since optimal color mixing between cyan dots and magenta dots, as well as optimal color mixing between magenta dots and yellow dots, are assured, it is possible to markedly improve image quality in instances where color mixing of magenta dots has a relatively large effect on image degradation. Instances where color mixing of magenta dots has a relatively large effect on image degradation refer to instances in which the magenta ink tends to bleed more easily than other inks, for example.

However, the generation method of Embodiment 4 may be extended so as to generate the shared dither matrix Mc with consideration to optimal color mixing between cyan dots and yellow dots as well. The optimization discussed above means allocating the degree of freedom in dither matrix design with focus on optimality of color mixing between cyan dots and magenta dots and on optimality of color mixing between magenta dots and yellow dots. Thus, keeping in mind that optimality of color mixing between cyan dots and yellow dots tends to decline, it will be preferable to carry out evaluation so as to also recognize color mixing between cyan dots and yellow dots if necessary.

In this way, in halftone processing for the purpose of generating a printed image using multiple ink colors, it would be acceptable to either establish dither matrices for each of the multiple ink colors, or to share some of the dither matrices. Furthermore, it would be acceptable to group together at least some of the multiple ink colors, and to prepare a dither matrix for each such group.

Figure 48:
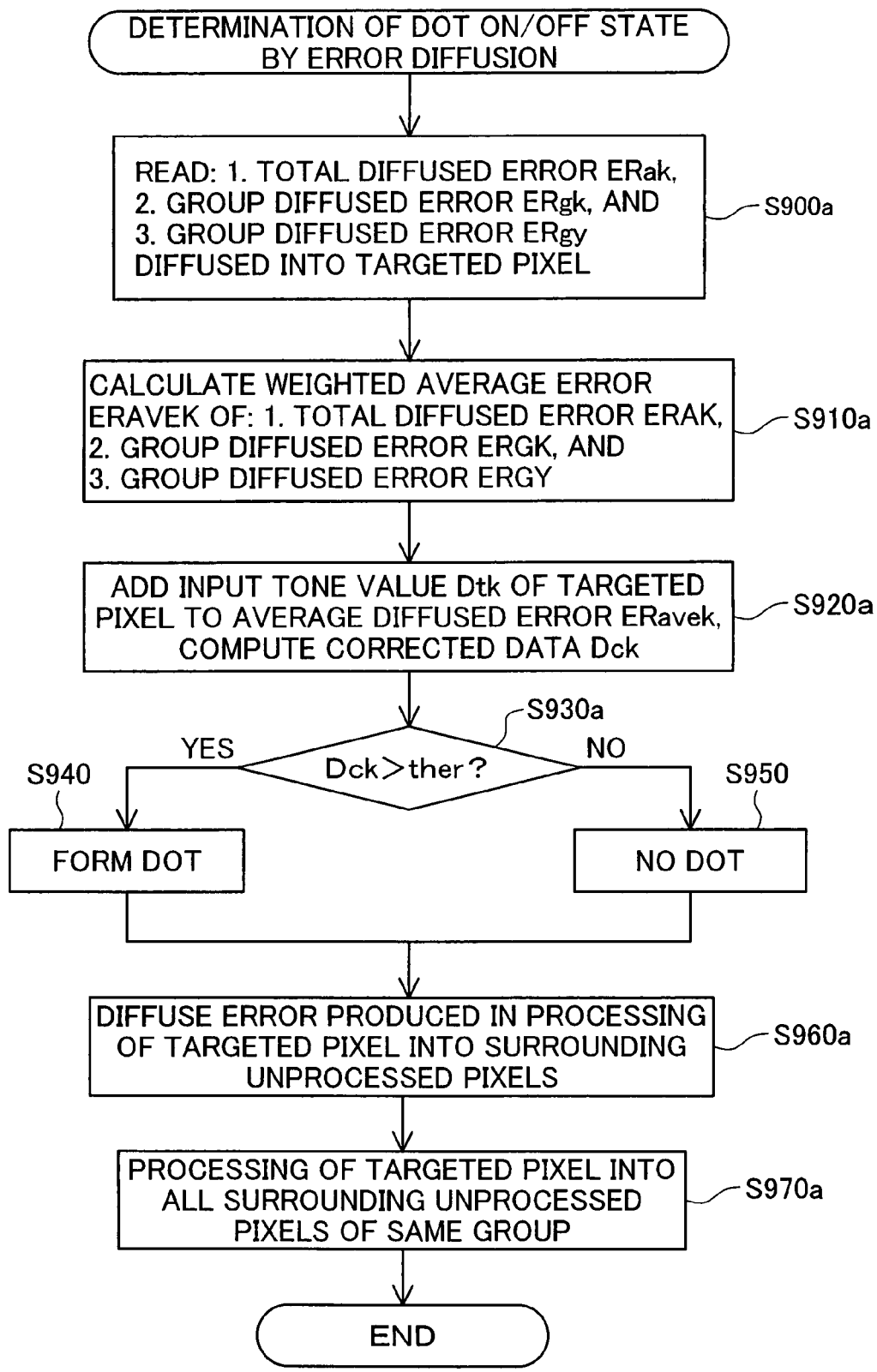
FIG. 48 is an illustration showing a flowchart of an error diffusion method in Embodiment 5.

D-3. Halftone Process in Embodiment 5 (Error Diffusion Method):

FIG. 48 is an illustration showing a flowchart of an error diffusion method in Embodiment 5. This error diffusion method differs from the error diffusion method of Embodiment 2 in that error is diffused for the purpose of achieving effects similar to Embodiments 3 and 4. Since it is significantly different from Embodiment 2, Embodiment 5 shall be discussed below independently of Embodiment 2.

In Step S900a, diffused error that has been diffused into the targeted pixel from a plurality of other pixels which have already been processed is read in. In the present embodiment, in order to facilitate the discussion it is assumed that the error diffusion process is performed for black dots and yellow dots, and that the state of black dot formation is determined with consideration to color mixing with the yellow dots. The diffused error includes global diffused error ERak and group diffused error ERgk for the black dots, as well as yellow group diffused error ERgy for the yellow dots. Here, in the modification example, for convenience in description it is assumed that the halftone process has already been completed by means of a systematic dither process etc.

The global diffused error ERak represents diffused error for the black dots, that has been diffused using the error diffusion global matrix Ma (FIG. 22) described earlier. However, the present embodiment differs from conventional error diffusion methods in that it involves additional diffusion of group diffused error ERgk for the black ink, in order to impart acceptable dispersion to the individual first to fourth pixel groups (FIG. 4) as well. Furthermore, the error diffusion method of the present embodiment is designed so that, by means of the added group diffused error ERgy for the yellow dots, the global dot pattern that includes the dot patterns of both the yellow dots and the black dots may be imparted with acceptable dot dispersion afforded by error diffusion per se. The group diffused error ERgy for the yellow dots can be calculated on the basis of predetermined on/off states of the yellow dots, as discussed previously.

Figure 49:
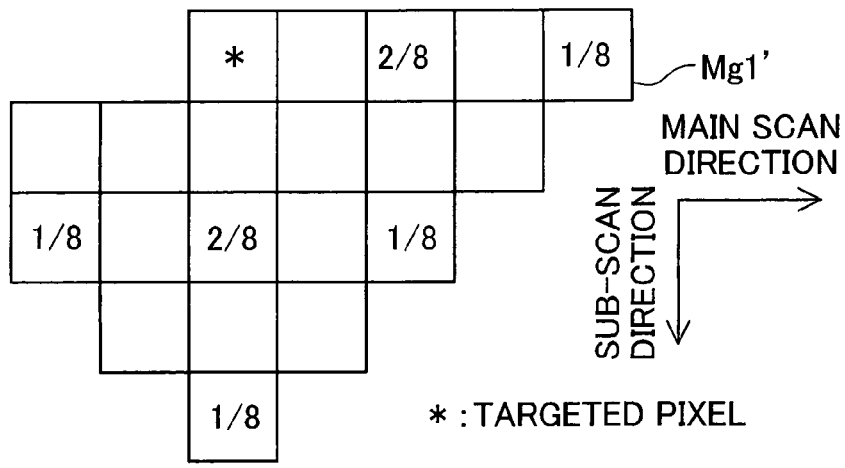
FIG. 49 is an illustration depicting an error diffusion same-main scan group matrix Mg1' for the purpose of performing group error diffusion ERgk, ERgy into the same pixel group as the targeted pixel.

FIG. 49 is an illustration depicting an error diffusion same-main scan group matrix Mg1' for the purpose of performing group error diffusion ERgk, ERgy into the same pixel group as the targeted pixel. The error diffusion same-main scan group matrix Mg1' is an error diffusion matrix for the purpose of additionally diffusing error into the pixel group that among the first to fourth plurality of pixel groups is the same as that of the targeted pixel. The four divided matrices M1 to M4 are identical to those shown in FIG. 12, and are depicted for the purpose of representing the positional relationships of the first to fourth plurality of pixel groups.

In the event that the targeted pixel belongs to the first pixel group for example, error will be diffused into pixels corresponding to elements where the value "1" is stored in the divided matrix M1. The error diffusion same-main scan group matrix Mg1' is constituted as an error diffusion matrix that stores coefficients for the purpose of error diffusion to diffuse errors into pixels in this manner. It will also be understood that, since the relative positional relationships of the targeted pixel and the other pixels are the same in the second to fourth pixel groups formed in the same main scan (pass) as the targeted pixel as well, it will be possible to utilize the same error diffusion matrix.

Thus, according to the present embodiment, prescribed characteristics (acceptable dot dispersion) may be imparted to the final dot pattern by means of error diffusion with the error diffusion global matrix Ma; as well as imparting prescribed characteristics to dot patterns composed of both black dots and yellow dots for each of the plurality of pixel groups, by means of error diffusion using the error diffusion same-main scan group matrix Mg1'.

In Step S910a, average diffused error ERavek representing a weighted average of global diffused error ERak and group diffused error ERgk, ERgy is calculated. In the present embodiment, by way of example, global diffused error ERak and group diffused error ERgk, ERgy are assigned weights of "4" and "1" respectively. The average diffused error ERavek is calculated by adding the value of global diffused error ERak multiplied by the weight "4," the value of the black group diffused error ERgk multiplied by the weight "1," and the value of the yellow group diffused error ERgy multiplied by the weight "1," and dividing the sum by the total sum of the weights "5" for the black dots.

The reason for excluding the weight "1" for the yellow dots is because it known that the sum of diffused errors of yellow dots is zero over a wide range. Specifically, if the halftone process for the yellow dots has been carried out appropriately and tone representation has been carried out accurately, over a wide range the sum total of errors will be zero, and thus diffused error of the yellow dots will affect only placement of the black dots, with no effect on dot count. Conversely, if the weight "1" for the yellow dots is not excluded, the value obtained by dividing by the sum "5" of the weights will be too small, and thus the dot count of the black dots will be less than that needed for accurate tone reproduction. The weight for the yellow dots is not limited to "1," and various other values could be employed as design parameters.

In Step S920a, an input tone value Dtk and the average diffused error ERavek are added, and corrected data Dc is computed.

In Step S930, the corrected data Dck computed in this way is compared against a preestablished threshold value Thre. If the result of this comparison is that the corrected data Dck is greater than the threshold value Thre, a determination to form a dot is made (Step S940). If on the other hand the corrected data Dck is smaller than the threshold value Thre, a determination to not form a dot is made (Step S950).

In Step S960a, tone error is calculated, and the tone error is diffused into neighboring unprocessed pixels. Error diffusion takes place by means of three error diffusion mechanisms, namely, a global diffused error mechanism, and two group diffused error mechanisms to be discussed later. The global diffused error mechanism diffuses error between the sum of input tone value data Dtk and global diffused error ERak for black dots, and actual tone values produced through determination of dot on/off states. For example, where the tone value of the sum of input tone value data Dtk and global diffused error ERak is "223," and the actual tone value produced by dot formation is 255, the tone error will be "−32" (=233−255). In this step (S960a), error diffusion is carried out using the error diffusion global matrix Ma (FIG. 22).

Specifically, for the pixel neighboring the targeted pixel to the right, a value of "−224/48" (=−32×7/48), equivalent to the error diffusion global matrix Ma (FIG. 22) coefficient "7/48" that corresponds to the right neighboring pixel, multiplied by the tone error of "−32" created by the targeted pixel, will be diffused. For the two pixels situated adjacently to the right of the targeted pixel, a value of "−160/48" (=−32×5/48), equivalent to the error diffusion global matrix Ma coefficient "5/48" that corresponds to the two adjacent right pixels, multiplied by the tone error of "−32" created by the targeted pixel, will be diffused. Like the error diffusion methods of the conventional art, such an error diffusion method imparts prescribed characteristics to the final dot pattern, by way of inherent characteristics of error diffusion methods.

In S970a, in contrast with conventional error diffusion, additional group error diffusion is carried out using the error diffusion same-main scan group matrix Mg1' (FIG. 49). Specifically, error is additionally diffused by two group diffused error mechanisms, namely, a group diffused error mechanism for black dots to the same pixel group as the targeted pixel (black group diffused error mechanism), and a group diffused error mechanism for yellow dots to same pixel group as the targeted pixel (yellow group diffusion mechanism). The black group diffused error mechanism diffuses error between the sum of the black dot input tone value data Dtk and the global diffused error ERgk for black dots, and actual tone values produced through determination of dot on/off states for the black dots. On the other hand, the yellow group diffused error mechanism diffuses error between the sum of the yellow dot input tone value data Dty (not shown) and the global diffused error ERgy for yellow dots, and actual tone values produced through determination of dot on/off states for the yellow dots. In this step (S970a), with either error diffusion mechanism, diffusion of error takes place in the same manner as with the global diffused error mechanism using the error diffusion same-main scan group matrix Mg1' (FIG. 49).

Group error diffusion in this way functions not only to impart prescribed characteristics to each of the first to fourth plurality of pixel groups (FIG. 4), but also to make the numbers of dots formed in each of them approximately uniform. The reason that the number of dots formed in each or the plurality of pixel groups is approximately uniform is as follows. Since the additional error diffusion is confined to within the individual first to fourth plurality of pixel groups, errors are not diffused into other groups. With this configuration, the sum total of input tone values and the sum total of tone values represented by dots will coincide for the groups, and thus where the sum total of input tone values is the same for each group, their dot counts will be approximately uniform.

In this way, with the error diffusion method of Embodiment 5, an object identical to that in Embodiments 3 and 4 can be achieved by means of additional error diffusion into the same pixel group as the targeted pixel, and additional error diffusion of group errors produced by other color dots.

According to the method described above, dot dispersion of both black dots and yellow dots is improved through the use of the yellow group diffused error ERgy; however, dot dispersion of both could also be improved by implementing technology previously disclosed by the inventors (Domestic Republication 98-003341). Specifically, it would be possible to improve dot dispersion of both by means of adding the difference (binarization error) between the yellow dot input tone value data Dty (not shown) and the actual tone values produced through determination of dot on/off states of yellow dots, to the group diffused error ERgk. This configuration is highly effective in cases where, in a given main scan, black dots and yellow dots belong to the same groups, and halftone processing of the yellow dots is carried out so that the average value of yellow dot error in any group is zero.

Figure 50:
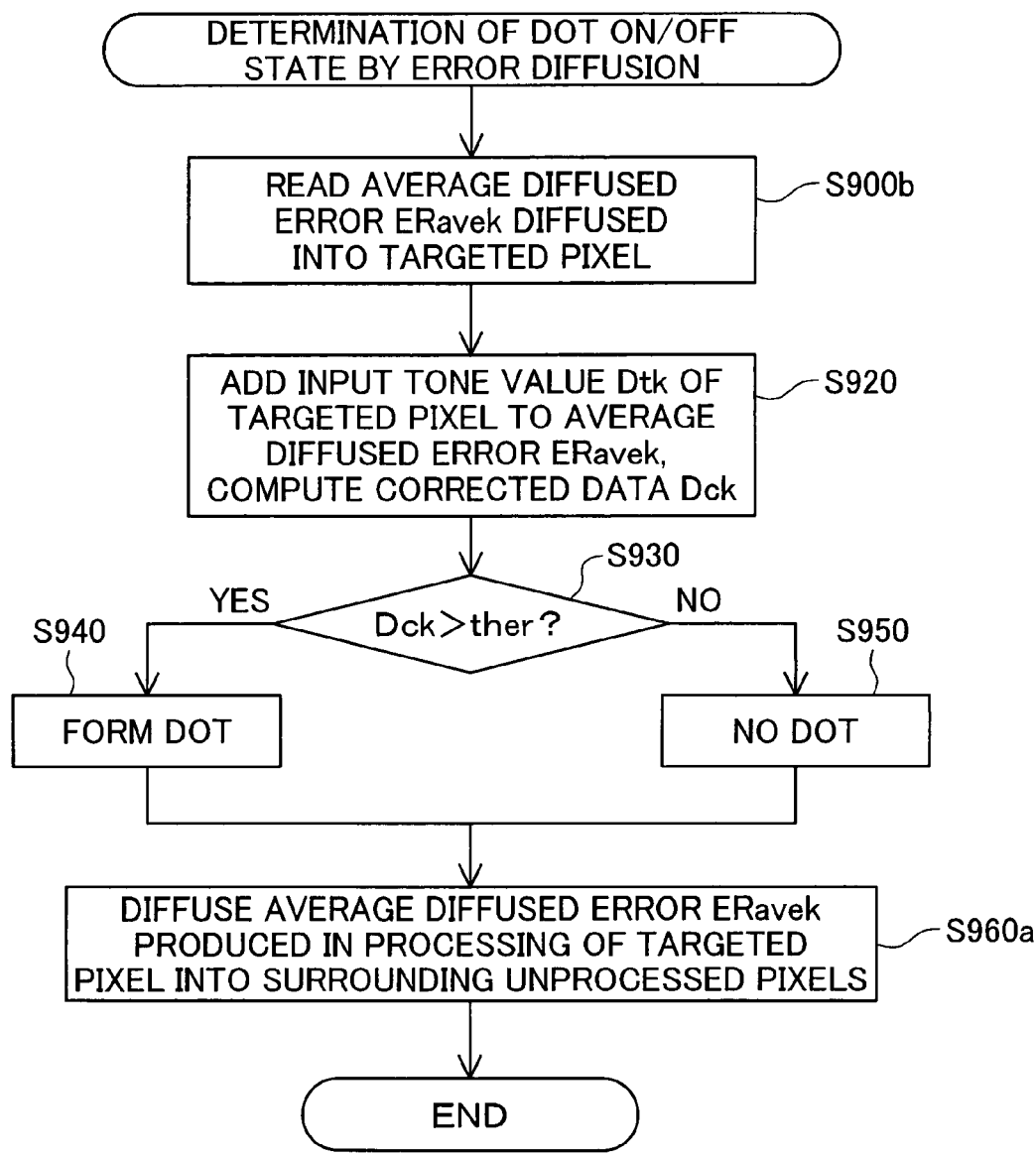
FIG. 50 an illustration showing a flowchart of an error diffusion method in a modification example of Embodiment 5.

FIG. 50 an illustration showing a flowchart of an error diffusion method in a modification example of Embodiment 5. This modification example differs from Embodiment 5 in that diffusion of error into the same pixel group or same set of pixel groups can be carried out all at once for each ink color. The modification example of Embodiment 5 involves modification similar to the modification of Embodiment 2 discussed previously.

This modification example differs from Embodiment 5 in that the one of the three steps S900a of Embodiment 5 is replaced by Step S900b, while the other two steps S910a, S970a are eliminated. In this modification example, Embodiment 5 is extended utilizing the linearity of diffused error, and thus the specifics of the process are mathematically equivalent to Embodiment 5.

In Step S900b, average diffused error ERavek that has been diffused using the error diffusion synthesized matrix Mg3 (FIG. 51) is read in. The average diffused error ERavek is identical to the value calculated in Step S910a of Embodiment 5. The error diffusion synthesized matrix Mg3 is an error diffusion matrix constituted by synthesis, with prescribed weights, of the error diffusion synthesized matrix Mg3 and the error diffusion same-main scan group matrix Mg1'. The prescribed weights are "4" to "1" in that order.

On the other hand, the yellow dot diffuse error is simply added as group diffused error ERgy calculated using the error diffusion same-main scan group matrix Mg1', as in Embodiment 5.

The error diffusion synthesized matrix Mg3 is a matrix composed of derived by simple addition of the denominators and numerators of the coefficients of the error diffusion synthesized matrix Mg3, and the weight-adjusted error diffusion same-main scan group matrix Mg1a'. The weight-adjusted error diffusion same-main scan group matrix Mg1' has been derived by multiplying 1.5 by the denominators and numerators of the coefficients of the error diffusion same-main main scan group matrix Mg1', in order to make this addition operation possible. Thus, the sum total of the numerators of the error diffusion synthesized matrix Mg3 equals 48, and the sum total of the numerators of the weight-adjusted error diffusion same-main scan group matrix Mg1a' equals 12, so the ratio of the numerators of the error diffusion synthesized matrix Mg3 and the error diffusion same-main main scan group matrix Mg1' is 1411 to "1." Meanwhile, by making the denominator of the coefficients 60 (=48+12), the sum total of the diffused error coefficients can be made to equal "1." In the error diffusion synthesized matrix Mg3, the denominator is 120 in order to make the numerator an integer.

In this modification example, the number of iterations of the error diffusion process can be reduced, which has the advantage of lower processing overhead. Furthermore, since this modification example is mathematically equivalent to Embodiment 5, the aspect of having the function of making the number of dots formed in each of the plurality of pixel groups approximately equivalent is similar to Embodiment 5.

Figure 52:
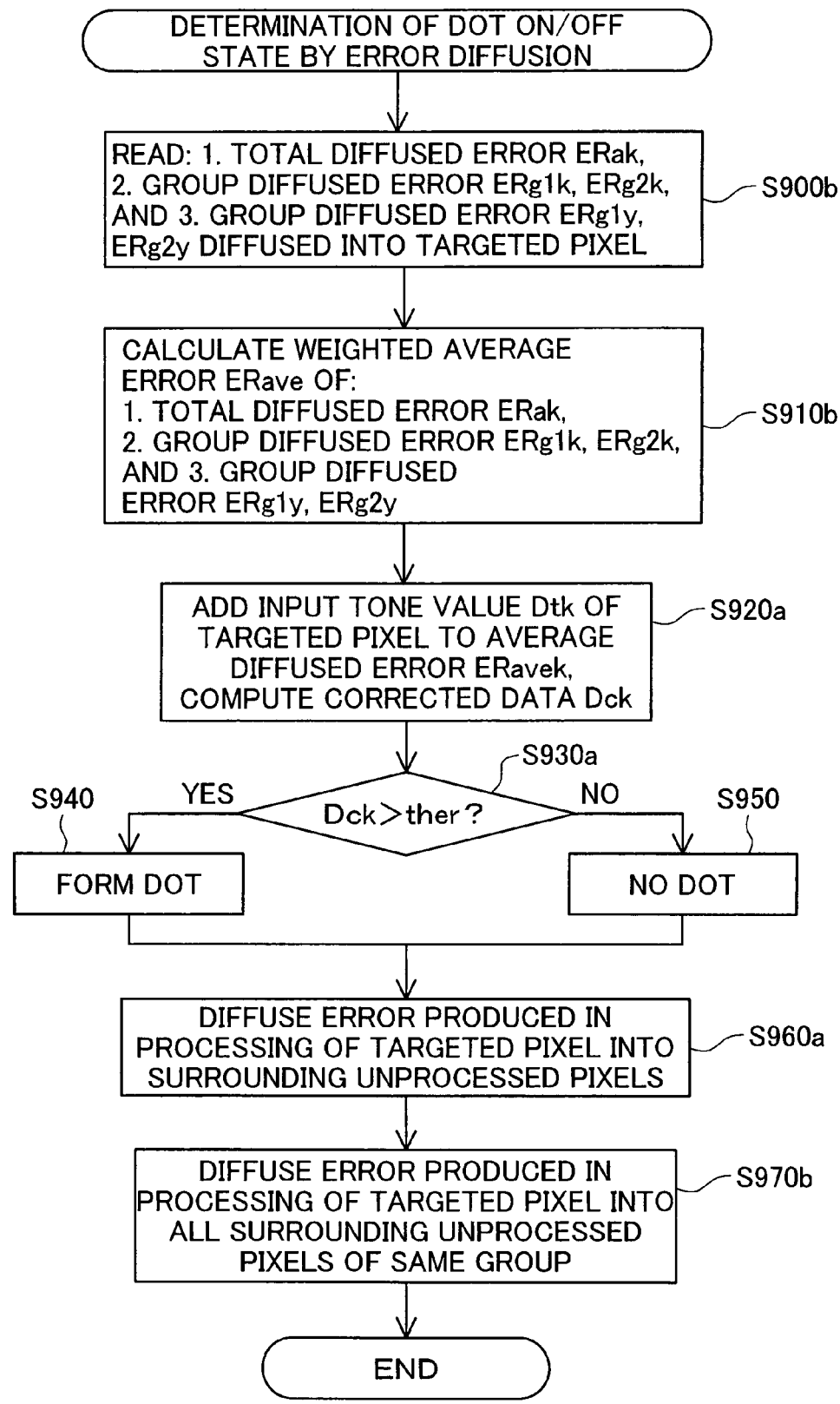
FIG. 52 is an illustration showing a flowchart of an error diffusion method in Embodiment 6.

D-4. Halftone Process in Embodiment 6 (Error Diffusion Method):

FIG. 52 is an illustration showing a flowchart of an error diffusion method in Embodiment 6. This modification example is particularly effective in relation to reducing color irregularity caused by color mixing, particularly in bidirectional printing, since the color sequence of the formed dots is reversed between the forward direction and the return direction. For example, when bidirectional printing is carried out using the print heads 10, 12 (FIG. 3), during main scanning of the print heads 10, 12 in the forward direction, dots will be formed in the order K, C, M, Y, whereas during main scanning of the print heads 10, 12 in the return direction, dots will be formed in the order Y, M, C, K, producing so-called reversal irregularity. In this embodiment, since the Y, M, C, and K dots can be dispersed in total, such reversal irregularity can be effectively reduced.

Embodiment 6 is constituted by replacing the three steps S900a, S910a, S970a of Embodiment 5 with Steps S900b, S910b, and S970b respectively.

Step S900b differs from Embodiment 5 in that error is diffused in the same manner as with the first to fourth pixel groups, also for pixels corresponding to two element group sets M13, M24 (FIG. 53) in which dots are formed in the same main scan. Here, the element group set M13 is an element group set constituted through synthesis of two divided matrices M1, M3 corresponding to pixels that are formed in the same main scanning direction (e.g. rightward in FIG. 2) in bidirectional printing. The element group set M24 is an element group set constituted through synthesis of two divided matrices M2, M4 corresponding to pixels that are formed in the same main scanning direction (e.g. leftward in FIG. 2) in bidirectional printing. This synthesizing of groups is done in order to make it possible for error diffusion to be handled in unison, in recognition of the fact that in bidirectional printing, dot patterns formed in the same direction easily shift in unison.

In Step S910b, average diffused error ERavek representing a weighted average of global diffused error ERak, black dot group diffused error ERg1k, ERg2, and yellow dot group diffused error ERg1y, ERg2y is calculated. The group diffused error ERg1k represents diffused error corresponding to the group diffused error ERgk in Embodiment 5. The group diffused error ERg2k represents diffused error diffused in the element group set M13 or the element group set M24. On the other hand, the group diffused error ERg1y represents diffused error corresponding to the group diffused error ERgy in Embodiment 5. The group diffused error ERg2y represents diffused error diffused in the element group set M13 or the element group set M24. In the present embodiment, by way of an example, the weights of the global diffused error ERa, the group diffused error ERg1k, the group diffused error ERg2k, the group diffused error ERg1y, and the group diffused error ERg2y are respectively "4," "1," "1," "2," and "2." The average diffused error ERavek is calculated by adding the value of the global diffused error ERak multiplied by the weight "4," the value of the group diffused error ERgk, ERg2 multiplied by the weight "1," and the value of the group diffused error ERg2k, ERg2y multiplied by the weight "2," and dividing the sum by the total sum of the weights "7" for the black dots.

In Step S970b, in addition to error diffusion by the error diffusion process of Embodiment 5, error diffusion using an error diffusion same-main scan direction group matrix Mg2 (FIG. 53) is additionally carried out. As discussed previously, this is for the purpose of imparting acceptable dispersion to the pixel group sets corresponding to the element group sets M13, M24.

Group error diffusion in relation to the black dots is specifically processed in the following manner. Assuming a tone value difference of "−32" for example, for the pixel neighboring the targeted pixel to the right, a value of "−224/48" (=−32×7/48), equivalent to multiplying by the error diffusion global matrix Ma (FIG. 22) coefficient "7/48" that corresponds to the right neighboring pixel; a value of "0" (=−32× 0), equivalent to multiplying the tone value difference "−32" by the error diffusion same-main scan group matrix Mg1' (FIG. 49) coefficient "0" that corresponds to the right neighboring pixel; and a value of "−256/24" (=−32×8/24), equivalent to multiplying the tone value difference "−32" by the error diffusion same-main scan direction group matrix Mg2 (FIG. 53) coefficient "8/24" that corresponds to the right neighboring pixel will be diffused. Group error diffusion relating to the yellow dots will be processed in similar fashion on the basis of a predetermined state of yellow dot formation, using the error diffusion same-main scan direction group matrix Mg2 (FIG. 53).

In this way, with the error diffusion method of Embodiment 6, image quality in bidirectional printing may be improved by means of additional error diffusion into pixel group sets in which dots are formed in the same main scan direction as the targeted pixel.

The embodiments and modification examples of error diffusion discussed hereinabove involve binarization; however, the invention could also be implemented in an arrangement wherein multivalue quantization is performed through comparisons with multiple threshold values.

E. Modification Examples:

While the invention has been shown hereinabove through certain preferred embodiments, the invention is in no way limited to these particular embodiments, and may be reduced to practice in various other ways without departing from the scope thereof. For example, the invention makes possible optimization of dither matrices for modification examples like the following.

E-1. Modification Example 1: In the preceding embodiments, the graininess index was employed as the evaluation criterion for dither matrices, but it would be possible to instead use RMS granularity, as described later for example. This evaluation criterion can be determined by performing a low-pass filter process using a low-pass filter (FIG. 54) on the dot density values, and then calculating standard deviation using a prescribed computational equation, for the density values subjected to the low-pass filter process (FIG. 55).

Figure 56:
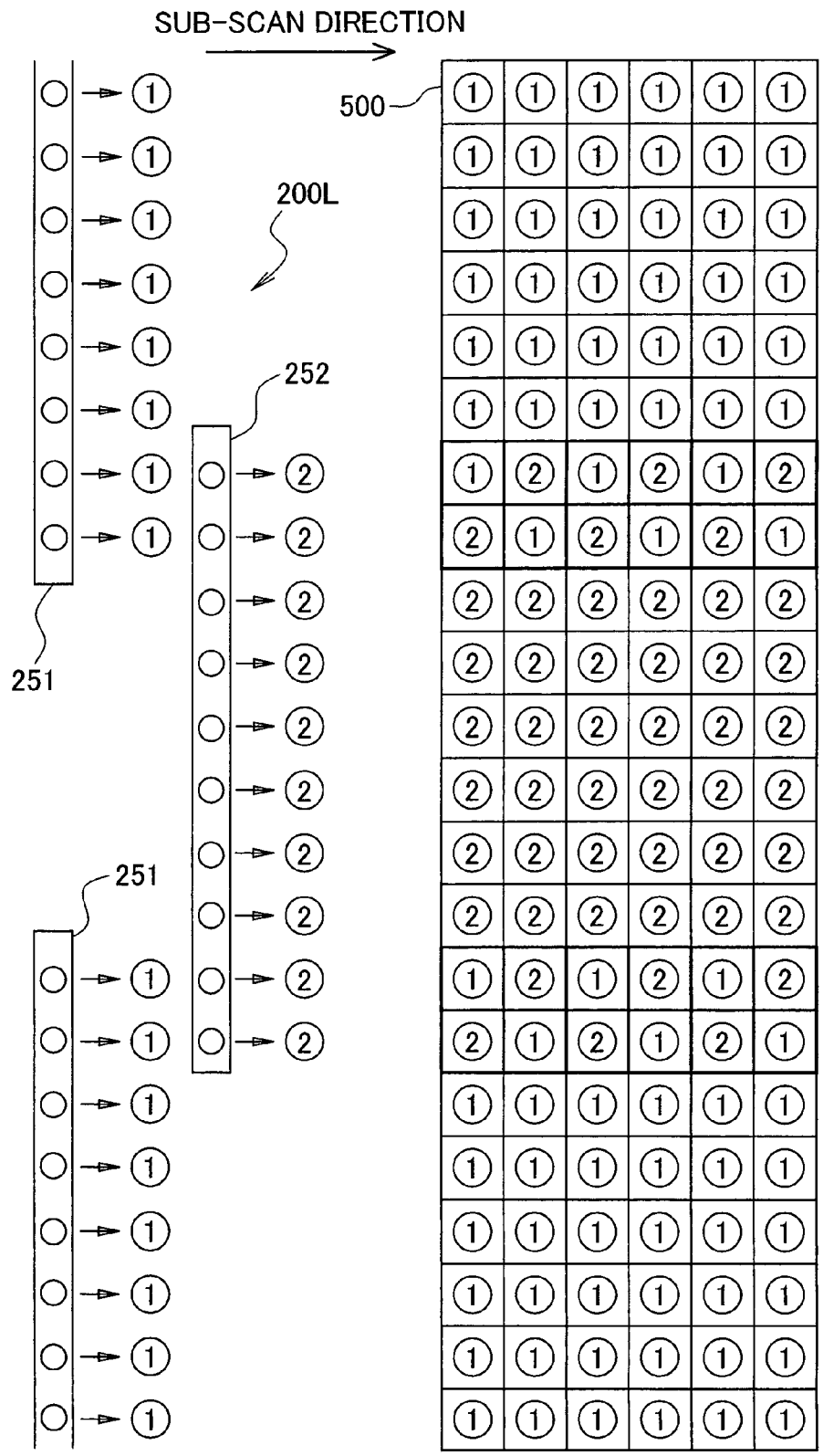
FIG. 56 is an illustration depicting printing condition by a line printer in Modification Example 2.

E2. Modification Example 2: The invention is applicable also to printers having multiple print heads, for example, a line printer such as that depicted in FIG. 56. FIG. 56 is an illustration depicting printing condition by a line printer 200L having multiple print heads 251, 252. A plurality of print heads 251 and print heads 252 are respectively positioned on the upstream end and downstream end. The line printer 200L is a printer that performs sub-scanning only and no main scanning, to output at high speed.

A dot pattern 500 formed by the line printer 200L is shown at right in FIG. 56. The numerals 1 and 2 inside the circles indicate which of the print heads 251, 252 was responsible for forming the dot. Specifically, dots denoted by the circled numerals "1" and "2" are formed by the print head 251 and the print head 252 respectively.

Areas inside the heavy lines in the dot pattern 500 are overlap areas in which dots are formed by both the print head 251 and the print head 252. These overlap areas are provided for the purpose of smoothing the transition between the print head 251 and the print head 252, as well as preventing noticeable error in dot formation position occurring at the either edge of the print heads 251, 252. Since individual production differences among the print heads 251, 252 will be greatest at either edge of the print heads 251, 252 and error in dot formation location will be greater there as well, it is necessary to prevent this from becoming noticeable.

In this case as well, a phenomenon similar to that occurring when error in positional relationship between the print heads 251, 252 results in deviation of formation location between the forward pass and return pass discussed previously; and for this reason it will be possible to improve image quality by means of a process analogous to that in the preceding embodiments, but performed on groups of pixel positions formed by the print head 251 and groups of pixel positions formed by the print head 252. Furthermore, in the case where the print heads 251, 252 have been designed to eject color inks of several colors for example, it will be possible to reduce color mixing and improve image quality by means of a process analogous to that in the preceding embodiments.

Figure 57:
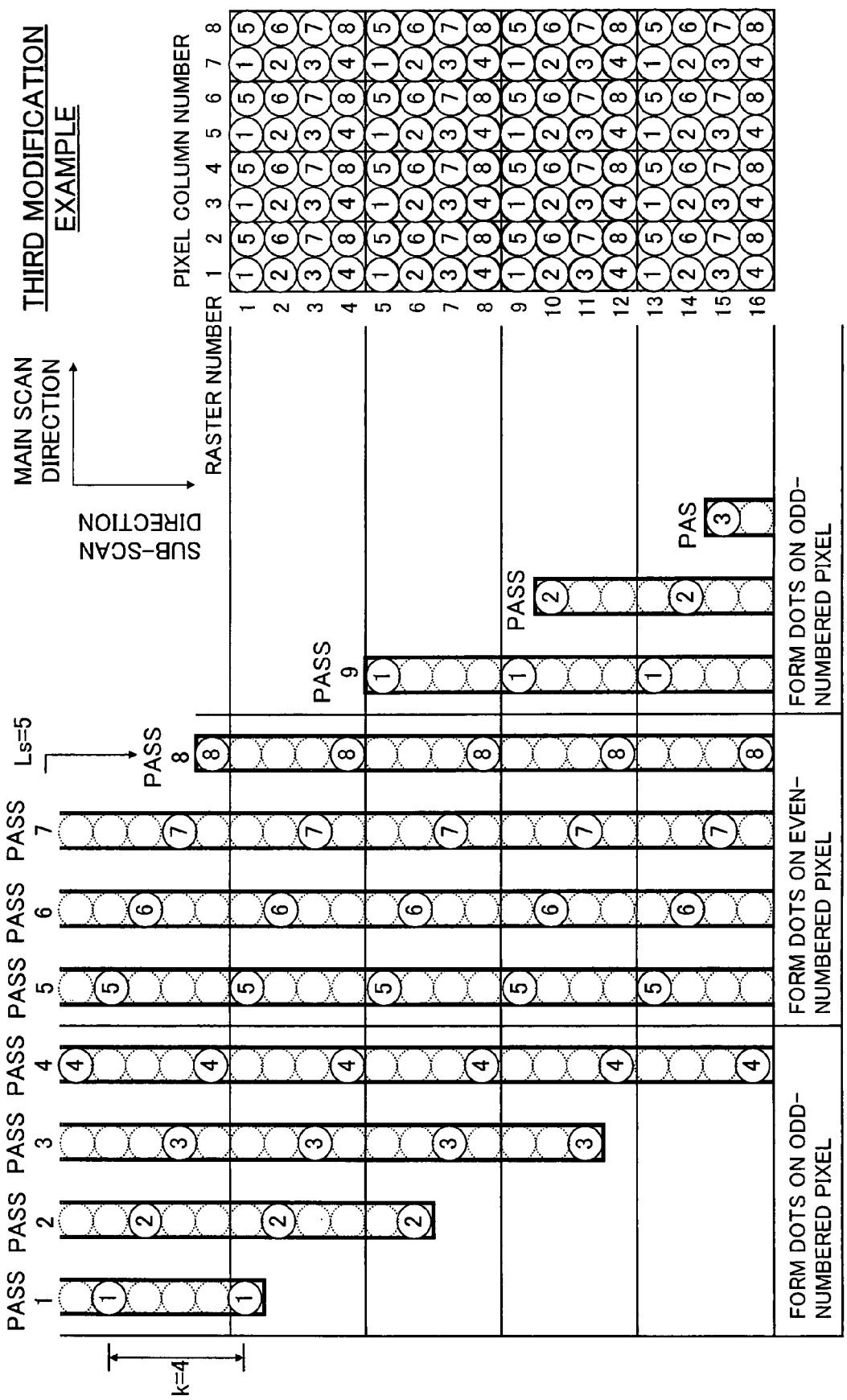
FIG. 57 is an illustration depicting generation of a printed image on a printing medium by means of a dot formation method in Modification Example 3.
Figure 58:
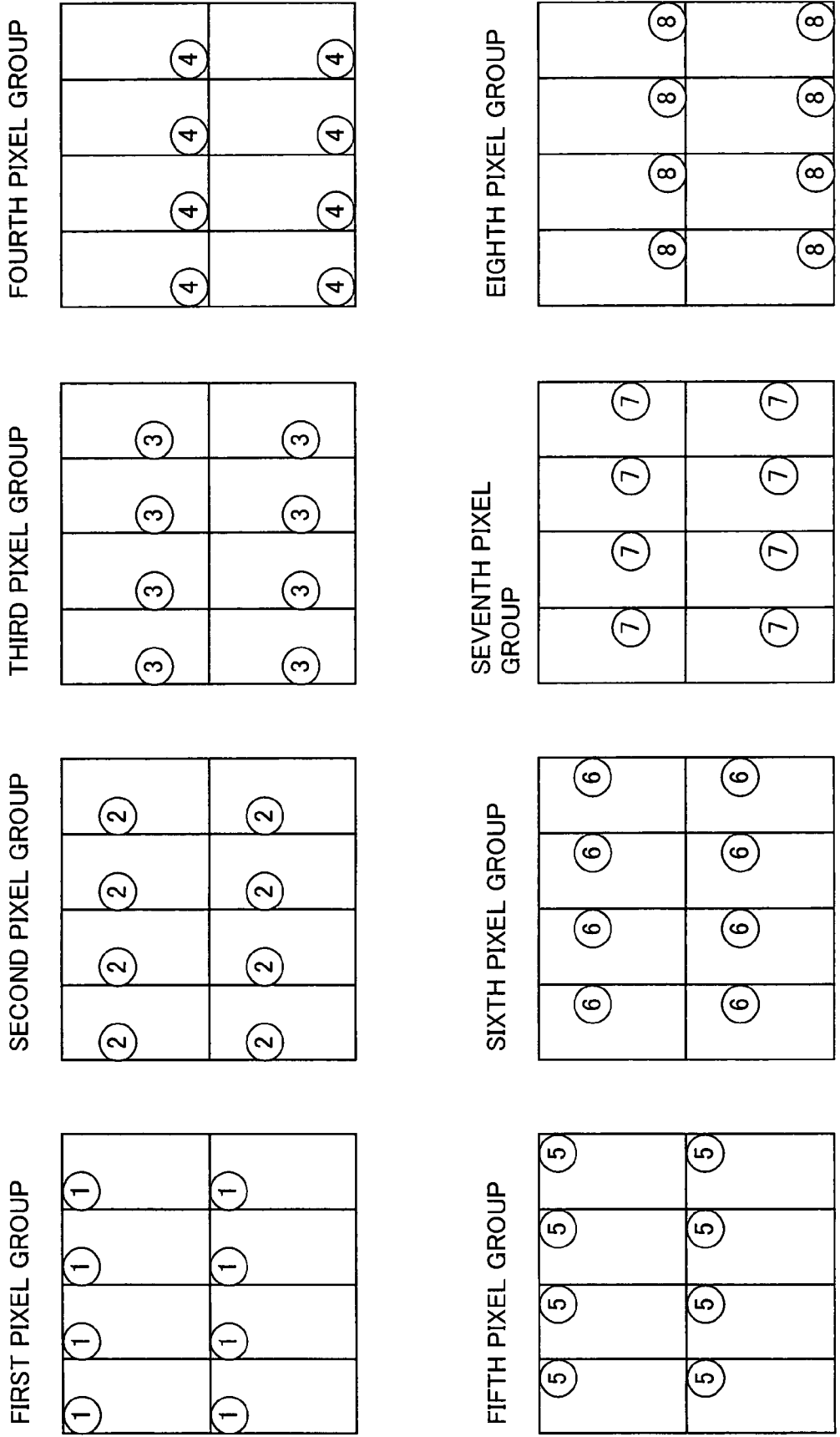
FIG. 58 is an illustration depicting a plurality of pixel groups in Modification Example 3.
Figure 59:
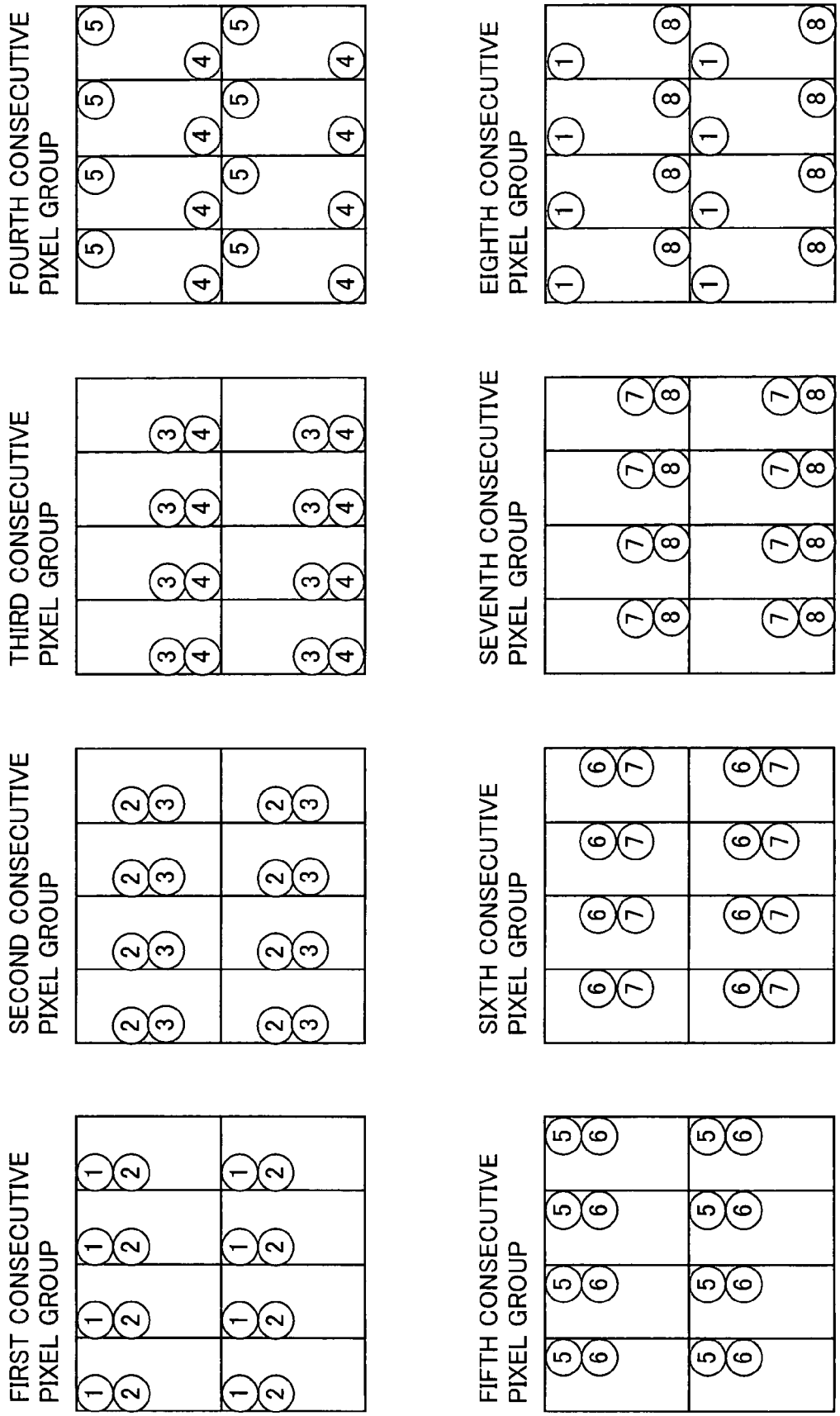
FIG. 59 is an illustration depicting a plurality of consecutive pixel groups in Modification Example 3.

E3. Modification Example 3: In the preceding embodiments, the printed image is formed in cycles of four main scan passes as shown in FIG. 4; however, the invention is applicable as well to printing processes wherein the printed image is formed in cycles of eight main scan passes as shown in FIGS. 57 to 59. The invention is applicable to processes wherein printed images are formed in a constant cycle or variable cycle, while carrying out main scanning and sub-scanning.

E4. Modification Example 4: In the preceding embodiments and modification examples, the evaluation value was calculated using RMS granularity or the graininess index of dot patterns composed of dots of two or more colors among the multiple colors of dots useable by the printer; however, it would also be possible to use a potential method whereby threshold values are stored sequentially in elements corresponding to pixels of low dot density subsequent to a low-pass filter process, for example. Where a low-pass filter is employed, depending on the extent of image quality degradation caused by the effects of color mixing, the range of the low-pass filter can be adjusted in addition to employing the weights discussed previously. For example, in cases where the intention is to emphasize reduction of contact and overlap only rather than to improve dot dispersion, this could be accomplished by adopting a small range of the low-pass filter.

In general, the "matrix evaluation values" here may be an evaluation value calculated using a value that quantifies the extent of contact of dots of two or more specific colors among multiple colors of dots. Furthermore, the value that quantifies the extent of contact of dots of two or more specific colors can take the form of a correlation function between dot patterns composed of dots of two or more specific colors, and the resultant condition of less contact among dots (blue noise characteristics or green noise characteristics).

E-5. In the preceding embodiments, the evaluation process is performed for each individual storage element of a single threshold value; however, the invention is also applicable to cases where storage elements for a number of threshold values are determined simultaneously. As a specific example, in the event that in any of the preceding embodiments, storage elements have been determined for threshold values up through the sixth one, and storage elements for the seventh and eighth threshold values are now being determined, the storage elements could be determined on the basis of the evaluation value obtained where a dot is added to the storage element for the seventh threshold value, and the evaluation value obtained where dots are added respectively to the storage elements for the seventh and eighth threshold values; or only the storage element for the seventh threshold value could be determined.

E-6. In the preceding embodiments, optimality of a dither matrix is evaluated on the basis of the graininess index or RMS granularity, however, another acceptable arrangement would be, for example, to carry out Fourier transformation on a dot pattern as well as evaluating the optimality of a dither matrix using a VTF function. Specifically, an acceptable arrangement would be to apply the evaluation metric used by Dooley et al. of Xerox (Graininess Scale: GS value) to dot patterns and evaluate the optimality of the dither matrix by means of the GS value. Here, the GS value is a graininess evaluation value that can be derived by numerical conversion of the dot pattern carried out by a prescribed process including two-dimensional Fourier transformation, as well as a filter process of multiplying by a visual spatial frequency characteristics VTF followed by integration.

E-7. In the preceding embodiments, storage elements for threshold values are determined in sequence; however, an arrangement whereby, for example, the dither matrix is generated by means of adjusting a dither matrix from an initial state prepared in advance would be acceptable as well. For example, it would be acceptable to generate the dither matrix by preparing a dither matrix with an initial state in which a plurality of threshold values for the purpose of determining dot on/off state of each pixel depending on input tone values are stored in the elements; and to then replace some of the plurality of threshold values stored in the elements with threshold values stored at other elements, by either a random or systematically determined method, adjusting the dither matrix by determining, on the basis of the evaluation values before and after replacement, whether or not to make the replacement.

E-8 In the preceding embodiments, dot on/off states are determined on a pixel-by-pixel basis by comparing the threshold values established in the dither matrix against the tone values of the image data; however, it would be acceptable to instead decide dot on/off states by comparing the sum of threshold values and tone values to a fixed value, for example. Furthermore, it would be acceptable to decide dot on/off states depending on tone values and on data generated in advance on the basis of threshold values, without using the threshold values directly. In general terms, the halftone process of the invention can be any one whereby dot on/off states are decided with reference to tone values of the pixels and to threshold values established at corresponding pixel locations in the dither matrix.

E-9. In the preceding embodiments, it is contemplated to achieve high image quality through improved dispersion of dots formed in consecutive main scan passes (Embodiments 1 and 2), or through improved dispersion of dots formed in the same main scan pass (Embodiments 3 to 6); however, it would also be possible to combine the two approaches. For example, it would be possible to reduce degradation of image quality caused by color mixing that occurs due to contact of dots formed in consecutive main scan passes.

E-10. Modification Example 4: With the print heads 10, 12 of the preceding embodiments and modification examples, the nozzle groups of the colors (i.e. the cyan ink nozzle group C, the magenta ink nozzle group Mz, the yellow ink nozzle group Y, and the black ink nozzle group K) are all positioned overlapping one another at sub-scan positions; however, the invention may also be implemented in a printing device equipped with a print head in which at least some of the nozzle groups are positioned not overlapping one another at sub-scan positions.

Figure 60:
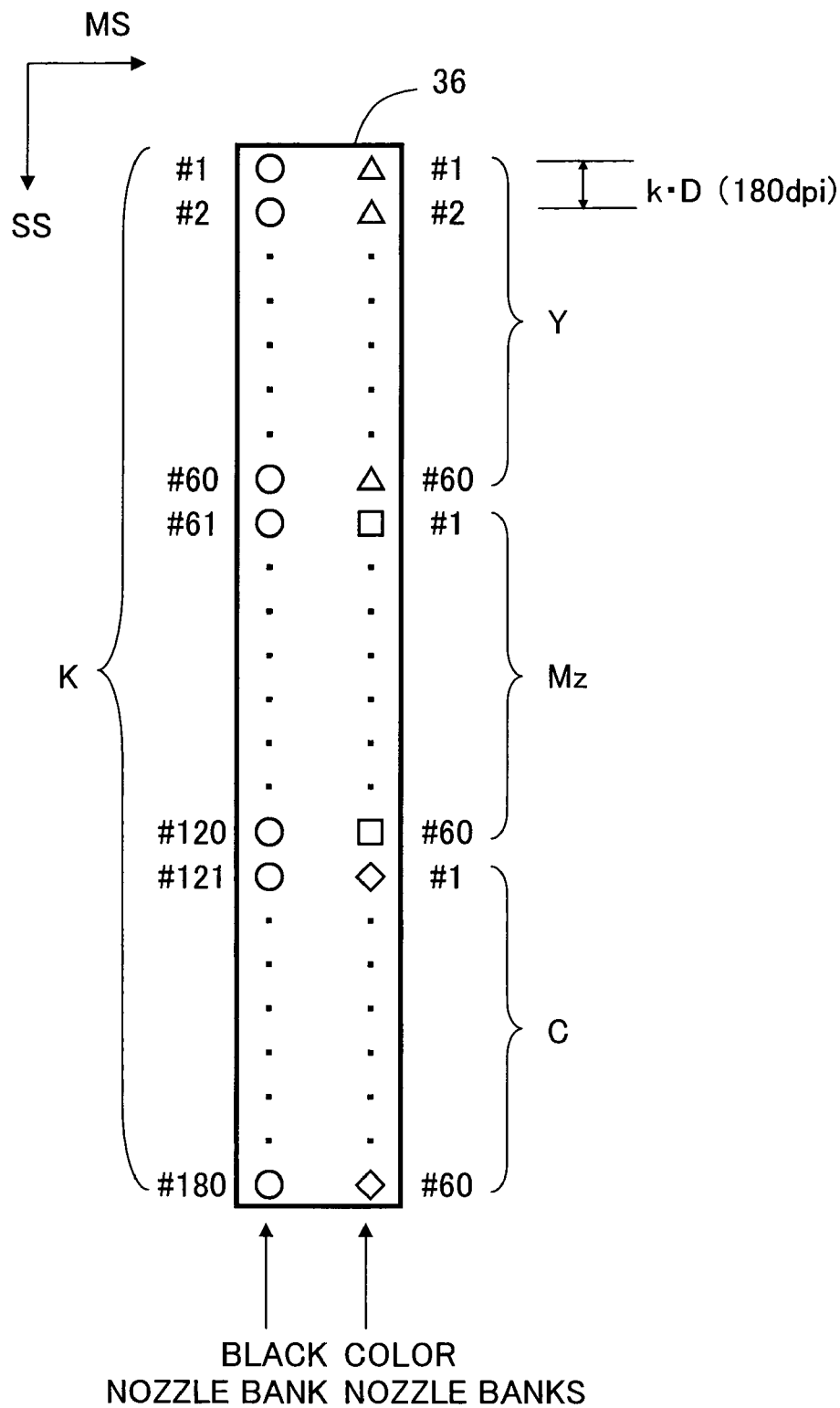
FIG. 60 is an illustration of nozzle groups on the lower face of a print head in Modification Example 4.

FIG. 60 is an illustration of nozzle groups on the lower face of a print head 36 in Modification Example 4. In the print head 36, the color nozzle groups that eject the color inks (the cyan ink nozzle group C, the magenta ink nozzle group Mz, and the yellow ink nozzle group Y) are positioned not overlapping one another at sub-scan positions (vertical array), while the black ink nozzle group K is positioned so as to overlap the color nozzle groups C, Mz, Y at sub-scan positions (horizontal array).

Since the plurality of nozzle groups in the vertical array (vertical-arrayed nozzle groups) are positioned so as to not overlap one another at sub-scan positions, a resultant advantage is that, for the plurality of color inks ejected by the vertical-arrayed nozzle groups, degradation of image quality caused by color mixing due to contact among dots formed in the same main scan can be reduced. However, since dots will be formed over a wide range in the sub-scanning direction during main scans, the problems of "positional deviation among dots of each color," "larger size of the printing device," or "uplift of the printing paper" may occur.

Positional deviation among dots of each color occurs due to the fact that the plurality of vertically-arrayed nozzle groups form dots over a large width in the sub-scanning direction. For example, since sub-scan feed will take place many times before cyan dots and yellow dots are formed in a given printed region, sub-scan feed errors will accumulate, and the problem of skew (advance of the paper inclined on the diagonal) will tend to occur as well. To address this problem, where vertically-arrayed nozzle groups are used, paper feed during sub-scan feed must be more highly accurate than where multiple nozzle groups arrayed on the horizontal (horizontally-arrayed nozzle groups) are used.

Vertically-arrayed nozzle groups form dots a over a wide scan area (=width of dot formation in the sub-scanning direction×main scan distance) due to the fact that a plurality of nozzle groups positioned so as to form dots over a large width in the sub-scanning direction are scanned in the main scanning direction which is perpendicular to the sub-scanning direction, and this results in larger size of the printing device. Furthermore, it is necessary to prevent uplift of the paper over this wide scan area, in order to ensure accurate dot formation locations.

In view of the above, vertically-arrayed nozzle groups have both the advantage of being able to reduce degradation of image quality caused by color mixing due to contact among dots formed in the same main scan, and the disadvantages of resulting in larger size of the printing device, and of necessitating a high degree of mechanical accuracy. On the other hand, a feature of horizontally-arrayed nozzle groups is that they have both the advantage that such degradation of image quality caused by color mixing readily occurs, and the advantage of a small load on the hardware noted earlier.

A notable effect of the invention is the ability, by means of combination with horizontally-arrayed nozzle groups having the above feature, to avoid excessive load on the hardware, and to reduce degradation of image quality caused by color mixing due to contact among dots formed in the same main scan.

In the appended claims, the element of "forming dots in regions mutually overlapping in the sub-scanning direction during the same main scan" does not mean that dots formed by each print head must always be formed in the same main scan line; more broadly, it includes instances where, for example, some of the nozzle groups are arrayed in zigzag pattern. Moreover, in the appended claims, the element of "print heads having a plurality of nozzle groups for ejecting inks of mutually different color" is to be understood in the ordinary sense of including instances in which a plurality of nozzle groups eject black ink for example, i.e. where a plurality of nozzle groups for ejecting ink of the same color are provided.

Finally, the two Japanese patent applications (JP-A-2006-176361 filed on Jun. 27, 2006, and JP-A-2006-349829 filed on Dec. 26, 2006) on which the priority claim of the present application is based are incorporated herein by reference.

What is claimed is:

1. A printing method of printing on a printing medium, comprising:

generating dot data representing a status of dot formation on each of print pixels of a print image to be formed on the print medium, by performing a halftone process on image data representing a input tone value of each of pixels constituting an original image;

providing a print head having a plurality of nozzle groups that eject inks of mutually different colors; and generating the print image by mutually combining dot groups of multiple colors formed in at least one scan in a common print area, by forming each dot group with each of the plurality of nozzle groups during each scan of the print head in response to the dot data, each of the dot groups being mutually different in color, wherein the generating of the dot data includes setting a condition for the halftone process for reducing contact between the dot groups of the at least two specific colors within at least part of tone values, for at least two specific colors of dot groups among the dot groups of multiple colors, the generating of the print image includes generating the print image by mutually combining dot groups of multiple colors formed in each of a plurality of scans in a common print area, and the at least two specific colors of dot groups include a plurality of dot groups of multiple colors formed in a same scan, and a plurality of dot groups of a same color formed by consecutive scans.

2. The method according to claim 1, wherein
the at least two specific colors of dot groups are formed in a single scan while carrying out main scanning of the print head.

3. The method according to claim 1, wherein
the generating the print image comprises forming dots both during a forward pass and a return pass of the print head.

4. The method according to claim 1, wherein
the generating the print image comprises forming multiple sizes of dots, and
the halftone process condition being set exclusively for at least one specific size of dot including a largest size of dots among the multiple sizes of dots, from among the multiple sizes of dots.

5. The method according to claim 1, wherein
the halftone process condition being set such that a prescribed mixed color pattern composed of the at least two specific colors of dot groups has prescribed spatial frequency characteristics.

6. The method according to claim 5, wherein
the halftone process condition being set such that the prescribed mixed color pattern has the prescribed spatial frequency characteristics, assuming that the at least two specific colors of dot groups are mutually different in terms of density only.

7. The method according to claim 5, wherein
the halftone process condition being further set such that overlapping dots formed by overlap of a plurality of dots included in the at least two specific colors of dot groups on the same print pixel have the prescribed spatial frequency characteristics.

8. The method according to claim 5, wherein
the halftone process condition being further set such that each of the at least two specific colors of dot groups on the same print pixel has the prescribed spatial frequency characteristics.

9. The method according to claim 5, wherein
the halftone process condition being further set such that each of a plurality of dot groups constituting the print image has the prescribed spatial frequency characteristics.

10. The method according to claim 5, wherein
the prescribed spatial frequency characteristics have spatial frequency characteristics such that within a prescribed low-frequency range of a millimeter or less per four cycles representing a spatial frequency region in which human visual acuity is relatively high on a printing medium positioned at a 300 mm viewing distance, a frequency band in which a prescribed mixed color pattern composed of the at least two specific colors of dot groups closely approximates a prescribed characteristic of a spatial frequency characteristics of dot patterns of the printed image.

11. The method according to claim 10, wherein
the prescribed characteristic is either one of a graininess index or RMS granularity computed by a calculation process including a low-pass filter process, wherein
the graininess is index computed by calculation process including a Fourier transform process, based on a product of a VTF function determined based on a visual spatial frequency characteristic, and a constant calculated in advance by the Fourier transform process.

12. The method according to claim 1, wherein
the at least part of tone values are tone values contained in a dot density range of from 40% to 60% having a relatively high low-frequency component, assuming uniform placement of dots on the printing medium.

13. The method according to claim 1, wherein
the generating dot data comprises performing the halftone process using a dither matrix configured for at least two specific colors of dot groups among the dot groups of multiple colors, for reducing contact between the dot groups of the at least two specific colors within at least part of tone values.

14. The method according to claim 13, wherein
the dither matrices include a plurality of specific color dither matrices established on a one-to-one basis for each the at least two specific colors of dot groups; and
the generating dot data comprise forming the prescribed mixed color pattern by the halftone process using any of the plurality of specific color dither matrices for each of the at least two specific colors of dot groups.

15. The method according to claim 14, wherein
the plurality of specific color dither matrices include two dither matrices constituted such that an order of a plurality of threshold values are mutually reversed.

16. The method according to claim 14, wherein
the dither matrices include a single basic matrix established in common for the at least two specific colors of dot groups;
the generating dot data comprise performing mutually different halftone processes for each of the at least two specific colors of dot groups with the basic matrix and at least one dither matrix generated by subjecting the basic matrix to a prescribed conversion process, for forming the prescribed mixed color pattern; and
the prescribed conversion process includes at least one conversion process among a process including shifting the basic matrix in a main scan direction, a process including shifting the basic matrix in a sub-scan direction, and a process including rotating the basic matrix.

17. The method according to claim 14, wherein
the dither matrices include a single standard color matrix established for any one of the at least two specific colors of dot groups;
the generating dot data comprise performing mutually different halftone processes for each of the at least two specific colors of dot groups with the standard color matrix, a dither matrix generated by subjecting the standard color matrix to a prescribed conversion process, and a dither matrix generated by subjecting the standard color matrix to a reverse of the prescribed conversion process, for forming the prescribed mixed color pattern; and
the prescribed conversion process includes at least one conversion process among a process including shifting the standard color matrix in a main scan direction, a process including shifting the standard color matrix in a sub-scan direction, and a process including rotating the standard color matrix.

18. A printing apparatus for printing on a printing medium, comprising:
a dot data generator that generates dot data representing a status of dot formation on each of print pixels of a print image to be formed on the print medium, by performing a halftone process on image data representing a input tone value of each of pixels constituting an original image;
a print image generator having a print head having a plurality of nozzle groups that eject inks of mutually different colors and generating the print image by mutually combining dot groups of multiple colors formed in at least one scan in a common print area, by forming each dot group with each of the plurality of nozzle groups during each scan of the print head in response to the dot data, each of the dot groups being mutually different in color, wherein
the dot data generator is configured such that a condition for the halftone process is set for reducing contact between the dot groups of the at least two specific colors within at least part of tone values, for at least two specific colors of dot groups among the dot groups of multiple colors,
the print image generator is configured to generate the print image by mutually combining dot groups of multiple colors formed in each of a plurality of scans in a common print area, and
the at least two specific colors of dot groups include a plurality of dot groups of multiple colors formed in a same scan, and a plurality of dot groups of a same color formed by consecutive scans.

* * * * *